United States Patent
Janky et al.

(10) Patent No.: US 10,234,562 B2
(45) Date of Patent: Mar. 19, 2019

(54) METHOD AND SYSTEM FOR LOCATION-DEPENDENT TIME-SPECIFIC CORRECTION DATA

(75) Inventors: James M. Janky, Los Altos, CA (US); Ulrich Vollath, Ismaning (DE); Nicholas C. Talbot, Victoria (AU)

(73) Assignee: Trimble Inc., Sunnyvale, CA (US)

( * ) Notice: Subject to any disclaimer, the term of this patent is extended or adjusted under 35 U.S.C. 154(b) by 17 days.

(21) Appl. No.: 13/403,775

(22) Filed: Feb. 23, 2012

(65) Prior Publication Data

US 2012/0146847 A1    Jun. 14, 2012

Related U.S. Application Data

(63) Continuation of application No. 12/241,451, filed on Sep. 30, 2008, now Pat. No. 8,134,497.

(51) Int. Cl.
*H04W 24/00* (2009.01)
*G01S 19/07* (2010.01)
*G01S 19/43* (2010.01)

(52) U.S. Cl.
CPC .............. *G01S 19/07* (2013.01); *G01S 19/43* (2013.01)

(58) Field of Classification Search
CPC . G01S 19/07; G01S 19/43; G01S 1/00; B64C 13/00; B64C 13/20; G01V 1/28; H04W 64/00; H04W 88/187; H04W 88/023; H04W 4/02; H04J 3/16; H04M 2250/10
USPC ............ 342/357.24, 357.42, 357.44, 357.03; 455/456.1, 456.2
See application file for complete search history.

(56) References Cited

U.S. PATENT DOCUMENTS

| | | |
|---|---|---|
| 4,445,118 A | 4/1984 | Taylor et al. |
| 5,477,458 A | 12/1995 | Loomis |
| 5,748,891 A | 5/1998 | Fleming et al. |
| 5,828,336 A | 10/1998 | Yunck |
| 6,324,473 B1 * | 11/2001 | Eschenbach ............ G01S 5/009 342/357.44 |
| 6,337,657 B1 | 1/2002 | Zhodzishsky et al. |
| 6,490,524 B1 | 12/2002 | White et al. |
| 6,529,830 B1 | 3/2003 | Eschenbach |
| 6,741,935 B1 | 5/2004 | Eschenbach |
| 6,879,283 B1 | 4/2005 | Bird |

(Continued)

FOREIGN PATENT DOCUMENTS

WO    WO-2008008099 A2 *    1/2008    ............. G01S 19/04

OTHER PUBLICATIONS

Euler, et al., "Comparison of Different Proposals for Reference Station Network Information Distribution Formals", *Proceedings of ION GPS 2002*, Portland, Oregon, (Sep. 24-27, 2011).

(Continued)

*Primary Examiner* — Mahendra Patel
(74) *Attorney, Agent, or Firm* — Kilpatrick Townsend & Stockton LLP

(57) ABSTRACT

A method and system for delivery of location-dependent time-specific corrections. In one embodiment, a first extended-lifetime correction for a first region is generated. A distribution timetable is used to determine a first time interval for transmitting the first extended-lifetime correction to the first region. The first extended-lifetime correction is then transmitted via a wireless communication network to said first region in accordance with said distribution timetable.

33 Claims, 23 Drawing Sheets

(56) References Cited

U.S. PATENT DOCUMENTS

| | | | |
|---|---|---|---|
| 7,277,797 B1* | 10/2007 | Kunitsyn | G01V 1/008 702/15 |
| 7,391,363 B2* | 6/2008 | Dunas | G01S 19/05 342/357.48 |
| 7,432,853 B2 | 10/2008 | Vollath | |
| 7,468,694 B2 | 12/2008 | Shoarinejad | |
| 7,480,511 B2 | 1/2009 | O'Meagher | |
| 7,545,316 B2 | 6/2009 | Gilkes | |
| 7,545,317 B2 | 6/2009 | Han | |
| 7,576,679 B1 | 8/2009 | Orr et al. | |
| 7,576,690 B2 | 8/2009 | Vollath | |
| 7,612,712 B2 | 11/2009 | LaMance et al. | |
| 7,623,897 B1 | 11/2009 | Elliott | |
| 7,633,438 B2* | 12/2009 | Tysowski | G01S 19/258 342/357.64 |
| 7,679,551 B2 | 3/2010 | Petovello et al. | |
| 7,741,994 B2 | 6/2010 | Pande et al. | |
| 7,755,542 B2 | 7/2010 | Chen et al. | |
| 8,212,719 B2* | 7/2012 | Van Diggelen et al. | 342/357.42 |
| 2003/0093187 A1* | 5/2003 | Walker | B64C 13/20 701/1 |
| 2004/0233861 A1* | 11/2004 | Kawai | H04W 88/187 370/312 |
| 2005/0101248 A1* | 5/2005 | Vollath | G01S 19/32 342/357.27 |
| 2007/0182628 A1* | 8/2007 | Pomerantz | G01S 19/06 342/357.43 |
| 2008/0238765 A1 | 10/2008 | Zhang et al. | |
| 2009/0061898 A1* | 3/2009 | Johnson | G01S 19/05 455/456.2 |

OTHER PUBLICATIONS

"Navstar Global Positioning System", *Interface Specification IS-GPS-200D*, (Mar. 2006),88-89 and 163-164.

Landau, Herbert et al., "Virtual Reference Stations Versus Broadcast Solutions in Network RTK-Advantages and Limitations", *GNSS 2003*, Graz, Australia,(2003),1-15.

* cited by examiner

| Region 501 | Region ID 502 | Reference Station ID 503 | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
| Sunnyvale, CA | 1 | x | x | x | x | x | x | | | | | | | | | | | | | | | | | | | | | | | | | | | | | |
| San Francisco, CA | 2 | | | x | x | x | x | x | | | | | | | | | | | | | | | | | | | | | | | | | | | | |
| Santa Rosa, CA | 3 | | | | | x | x | x | x | x | | | | | | | | | | | | | | | | | | | | | | | | | | |
| Sacramento, CA | 4 | | | | | | | x | x | x | x | | | | | | | | | | | | | | | | | | | | | | | | | |
| Los Angeles, CA | 5 | | | | | | | | | | | x | x | x | x | x | | | | | | | | | | | | | | | | | | | | |
| Long Beach, CA | 6 | | | | | | | | | | | | x | x | x | x | | | | | | | | | | | | | | | | | | | | |
| San Diego, CA | 7 | | | | | | | | | | | | | x | x | | x | x | | | | | | | | | | | | | | | | | | |
| Redding, CA | 8 | | | | | | x | x | x | | | | | | | | | | x | x | | | | | | | | | | | | | | | | |
| Medford, OR | 9 | | | | | | | | x | | | | | | | | | | | | x | x | x | | | | | | | | | | | | | |
| Portland, OR | 10 | | | | | | | | | | | | | | | | | | | | | x | x | x | x | | | | | | | | | | | |
| Seattle, WA | 11 | | | | | | | | | | | | | | | | | | | | | | | x | x | x | x | | | | | | | | | |
| Boise, ID | 12 | | | | | | | | x | | | | | | x | | x | | | | | | | | | | | x | x | x | x | | | | | | |
| Las Vegas, NV | 13 | | | | | | | | | | | | | | x | | | | | | | | | | | | | | | | | x | x | x | | | |
| Reno, NV | 14 | | | | | | | x | | x | | | | | | | | | | | | | | | | | | | | | | | | x | x | x | x |

FIG. 5

| Parameters | Distribution Timetable/Region allocation table 600 | | | | | | | | | | | | |
|---|---|---|---|---|---|---|---|---|---|---|---|---|---|
| | Calculation Time 5 seconds 601 | Transmission Time 5 seconds 602 | | Lifetime 5 minutes 603 | Communication Pathway 604 | | | | | | Message Format 605 | | |
| Region 606 | Region ID | Timeslot min/sec after the hour 607 | Next Time Slot 608 | Next Time Slot | Continue | Geo-synch | LEO/ MEO | Cellular | Radio Relay | Server | Pager | CMR | RTCM |
| Sunnyvale, CA | 1 | .01.00 | .06.00 | .11.00 | .16.00 | A | A | X | A | A | A | X | |
| San Francisco, CA | 2 | .01.05 | .06.05 | .11.05 | ...... | A | A | X | A | A | A | X | |
| Santa Rosa, CA | 3 | .01.10 | .06.10 | .11.10 | ...... | A | A | X | A | A | A | X | |
| Sacramento, CA | 4 | .01.15 | .06.15 | .11.15 | ...... | A | A | X | A | A | A | X | |
| Los Angeles, CA | 5 | .01.20 | .06.20 | .11.20 | ...... | A | A | A | A | X | A | X | |
| Long Beach, CA | 6 | .01.25 | .06.25 | .11.25 | ...... | A | A | A | A | A | A | X | |
| San Diego, CA | 7 | .01.30 | .06.30 | .11.30 | ...... | A | A | A | A | A | A | X | |
| Redding, CA | 8 | .01.35 | .06.35 | .11.35 | ...... | A | A | O | X | X | O | | X |
| Medford, OR | 9 | .01.40 | .06.40 | .11.40 | ...... | A | A | O | X | X | O | | X |
| Portland, OR | 10 | .01.45 | .06.45 | .11.45 | ...... | A | A | X | A | A | O | X | |
| Seattle, WA | 11 | .01.50 | .06.50 | .11.50 | ...... | A | A | A | A | A | A | X | |
| Boise, ID | 12 | .01.55 | .06.55 | .11.55 | ...... | A | A | O | A | X | X | X | |
| Las Vegas, NV | 13 | .02.00 | .07.00 | .12.00 | ...... | A | A | X | A | X | O | X | |
| Reno, NV | 14 | .02.05 | .07.05 | .12.05 | ...... | A | A | A | X | X | O | | X |
| Des Moines, IA | 15 | .02.10 | .07.10 | .12.10 | ...... | A | A | A | A | A | O | | X |
| St. Louis, MO | 16 | .02.15 | .07.15 | .12.15 | ...... | A | A | X | A | A | O | X | |
| Chicago, IL | 17 | .02.20 | .07.20 | .12.20 | ...... | A | A | X | A | A | O | X | |
| New Orleans, LA | 18 | .02.25 | .07.25 | .12.25 | ...... | A | A | A | A | A | O | X | |
| Miami, FL | 19 | .02.30 | .07.30 | .12.30 | ...... | A | A | X | A | A | O | X | |
| Washington, DC | 20 | .02.35 | .07.35 | .12.35 | ...... | A | A | X | A | A | O | X | |
| ...continue... | ... | ... | ... | | | | | | | | | | |
| Bangor, ME | 60 | .05.55 | .10.55 | .15.55 | .20.55 | A | X | A | A | A | O | | X |

FIG. 6

| Number of Regions Served v. Extended Lifetime Duration | | | | | |
|---|---|---|---|---|---|
| Corrections Lifetime, sec | Delivery Time, sec | # Regions served | | Delivery Time, sec | # Regions served |
| 60 | 5 | 12 | | 2 | 30 |
| 100 | 5 | 20 | | 2 | 50 |
| 150 | 5 | 30 | | 2 | 75 |
| 200 | 5 | 40 | | 2 | 100 |
| 250 | 5 | 50 | | 2 | 125 |
| 300 | 5 | 60 | | 2 | 150 |
| 400 | 5 | 80 | | 2 | 200 |
| 500 | 5 | 100 | | 2 | 250 |
| 600 | 5 | 120 | | 2 | 300 |

```
┌─────────┐
│  START  │
└────┬────┘
     ▼
┌──────────────────────────────────────────────────┐
│ STORING A COPY OF A DISTRIBUTION TIMETABLE WITHIN│
│          A ROVER STATION IN A FIRST REGION       │
│                        1510                      │
└────────────────────────┬─────────────────────────┘
                         ▼
┌──────────────────────────────────────────────────┐
│ USING THE DISTRIBUTION TIMETABLE TO DETERMINE A  │
│ TIME INTERVAL FOR RECEIVING A CORRECTION WHICH IS│
│ INTENDED FOR THE FIRST REGION AND WHICH IS TO BE │
│  USABLE FOR A PERIOD GREATER THAN ONE SECOND     │
│                        1520                      │
└────────────────────────┬─────────────────────────┘
                         ▼
┌──────────────────────────────────────────────────┐
│   USING THE CORRECTION TO DETERMINE A FIRST      │
│  CORRECTED GEOGRAPHIC POSITION IN THE FIRST      │
│                      REGION                      │
│                        1530                      │
└────────────────────────┬─────────────────────────┘
                         ▼
                   ┌─────────┐
                   │   END   │
                   └─────────┘
```

FIG. 15

METHOD AND SYSTEM FOR LOCATION-DEPENDENT TIME-SPECIFIC CORRECTION DATA

CROSS REFERENCE TO RELATED APPLICATIONS (CONTINUATION)

This application claims priority and is a continuation to U.S. patent application Ser. No. 12/241,451, entitled "Method and System for Location-Dependent Time-Specific Correction Data," by Janky et al., filed on Sep. 30, 2008, now U.S. Pat. No. 8,134,497, the disclosure of which is hereby incorporated herein by reference.

FIELD OF THE INVENTION

Embodiments of the present invention are related to the field of satellite navigation systems.

BACKGROUND

Various types of positioning systems for determining a position based on radio signals are known in the art. For example, satellite navigation systems allow autonomous geospatial positioning with virtually global coverage. Global navigation satellite systems (GNSS) provide GNSS receivers with the capability to determine their location based on positioning signals transmitted from the GNSS satellites in terms of longitude, latitude, and altitude to within a few meters or even centimeters. GNSS based positioning has a wide range of applications including navigation and tracking and automatic positioning.

Generally, for determining its position, a GNSS receiver first determines distances to a plurality of GNSS satellites. Each individual distance measurement made by the receiver to a satellite located in a known orbit position traces the receiver on the surface of a spherical shell at the measured distance from the satellite. By taking several such measurements and determining an intersecting point of the spherical shells, a position fix can be generated. The distance measurements to the satellites are based on a time of flight measurement of positioning signals transmitted by the satellites to the receiver and thus the measurements depend on an exact timing. Normally, three distance measurements to three known satellite positions are sufficient to resolve a receiver position in space, however, with the receiver clock offset from satellite clock time being the fourth unknown in the equations, measurements on four satellites are needed to determine the position of the receiver.

The orbit position of the satellite may be determined based on a data message superimposed on a code that serves as a timing reference. The receiver can compare the time of broadcast at the satellite encoded in the transmission with the time of reception measured by an internal clock at the receiver, thereby measuring the time of flight to the satellite. GNSS systems provide satellite data messages that transmit a code with a timing reference, enabling a receiver to compare a successively delayed internal replica of this code with the received code from the satellite. By progressively delaying the local copy, the two signals become aligned in time. That delay is the time needed for the signal to reach the receiver, and from this the distance from the satellite can be calculated.

The Real-Time Kinematic (RTK) method was developed to provide greatly improved accuracy in position determination, suitable for use in surveying. RTK positioning performs measurements of the carrier phase of the satellite signals and makes estimates of the exact number of carrier frequency wavelengths (19.6 cm) to each satellite. The method is well-known in the GPS/GNSS positioning arts.

Various error sources affect the absolute positioning accuracy. As noted above, the exact time of flight of the signal from the satellite to the receiver station must be measured, which may be in the range of e.g. 0.06 seconds from a satellite directly above a receiver. In order to make the time measurements as accurate as possible, GNSS satellites generally include several atomic clocks providing a highly accurate time reference. However, even atomic clocks suffer from a certain time error that constitutes an error source in the measurements that has to be observed when desiring centimeter level accuracy. Other error sources include propagation delays introduced by the troposphere and ionosphere, errors in the satellite positions as described by the orbital parameters, and other relativistic effects, as are well known in the art.

To improve the accuracy of the estimation, the RTK method provides reference data on the same set of satellite observables from another source to a surveyor's receiver, referred to as a rover receiver. These reference station observables are relayed to the rover via ground based radio transmission, in order to enable the receiver to perform the double-differencing process that removes error contributions. See for example "GPS Satellite Surveying," by Alfred Leick, John Wiley & Sons, ISBN-10: 0471306266, or "Global Positioning System: Signals, Measurements and Performance Second Edition," by Pratap Misra and Per Enge, Ganga-Jamuna Press, ISBN 0-9709544-1-7.

These systems often require strict continuity of data delivery of the correction stream. Typically, the data is delivered on a second-by-second basis to provide continuity of the correction stream. Thus, an interruption of the correction stream can cause delays in performing the desired survey activity, as the interruption can necessitate a resynchronization of correction and data reception in the rover, sometimes taking many minutes where the rover cannot be moved. Further, the effects of the ionosphere and troposphere are not homogeneous over areas much larger than 60-100 km, thus limiting the range of applicability of the network of reference stations.

SUMMARY

A method and system for delivery of location-dependent time-specific corrections. In one embodiment, a first extended-lifetime correction for a first region is generated. A distribution timetable is used to determine a first time interval for transmitting the first extended-lifetime correction to the first region. The first extended-lifetime correction is then transmitted via a wireless communication network to said first region in accordance with said distribution timetable.

BRIEF DESCRIPTION OF THE DRAWINGS

The accompanying drawings, which are incorporated in and form a part of this specification, illustrate and serve to explain the principles of various embodiments in conjunction with the description. Unless specifically noted, the drawings referred to in this description should be understood as not being drawn to scale.

FIG. 5 is an example spreadsheet of reference regions and corresponding reference stations in accordance with one embodiment.

FIG. 6 is an example region allocation table for extended-lifetime corrections in accordance with one embodiment.

FIG. 7 is a comparison showing the number of regions which can receive an extended-lifetime correction in accordance with one embodiment.

FIG. 15 is a flowchart of a method for delivery of extended-lifetime corrections in accordance with one embodiment.

DESCRIPTION OF EMBODIMENTS

Figure 1A:
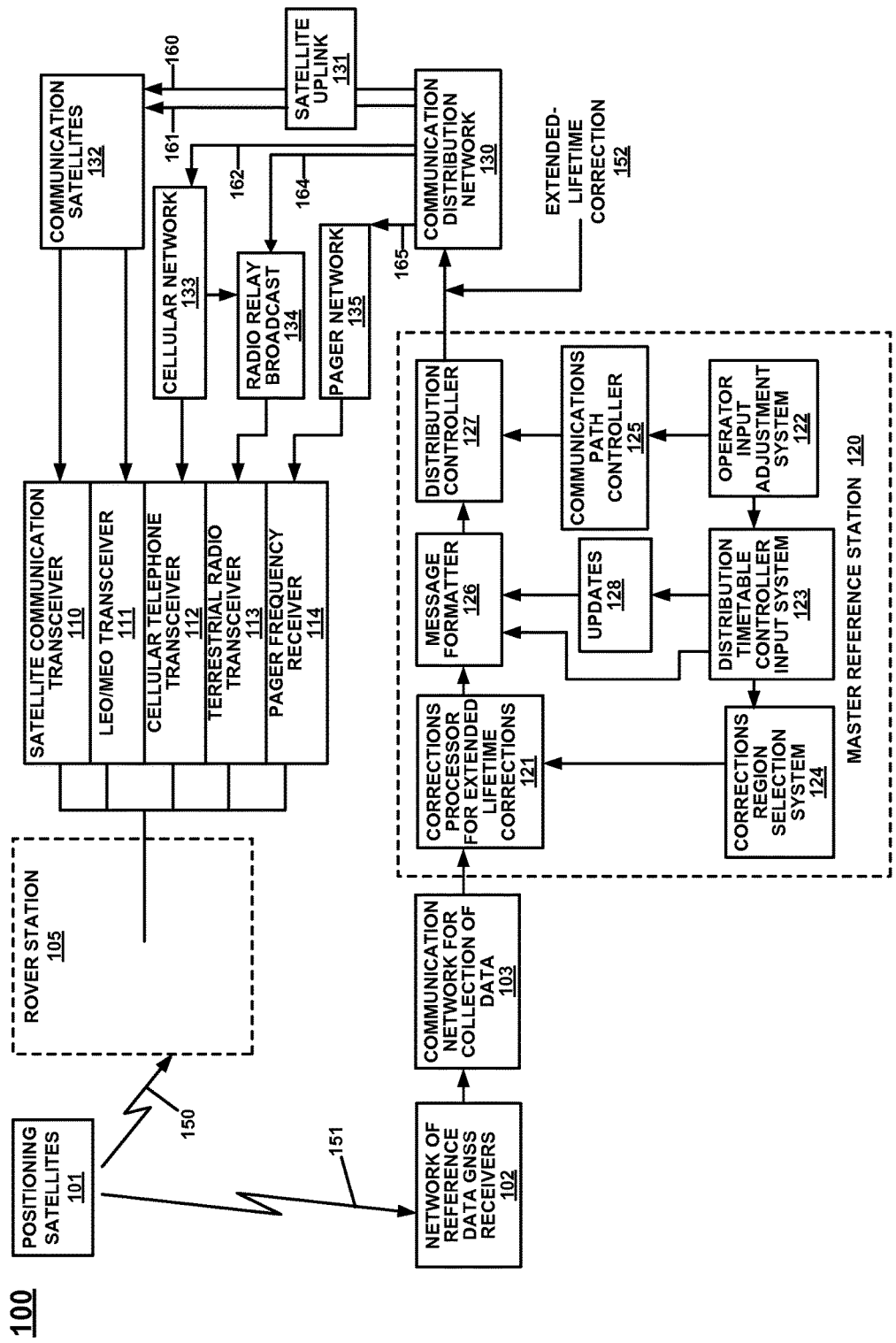
FIG. 1A, is a block diagram of a system for delivery of location-dependent time-specific corrections in accordance with one embodiment.

Reference will now be made in detail to various embodiments, examples of which are illustrated in the accompanying drawings. While the subject matter will be described in conjunction with these embodiments, it will be understood that they are not intended to limit the subject matter to these embodiments. Furthermore, in the following description, numerous specific details are set forth in order to provide a thorough understanding of the subject matter. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present discussions terms such as "generating," "accessing," "transmitting," "conveying," "creating," "using," or the like, refer to the actions and processes of a computer system (such as computer system 1000 of FIG. 10), or similar electronic computing device. Computer system 1000 or a similar electronic computing device manipulates and transforms data represented as physical (electronic) quantities within the computer system's registers and memories into other data similarly represented as physical quantities within the computer system memories or registers or other such information storage, transmission, or display devices.

The subject matter discussed herein may be described in the general context of computer-executable instructions, such as modules, which are executed or executable by a computer. Generally, these modules include routines, programs, objects, components, data structures, etc., that perform or implement particular tasks or abstract data types.

Overview of Discussion

A discussion of Global Satellite Navigation Systems (GNSS) and selected positioning techniques will be presented to set the stage for further discussion. A block diagram of a system for delivery of location-dependent time-specific corrections in accordance with one embodiment will presented and discussed. A master reference station will then be described. An example block diagram of systems for delivery of location-dependent, time-specific correction data in accordance with one embodiment will then be presented and described.

Global Navigation Satellite Systems

A Global Navigation Satellite System (GNSS) is a navigation system that makes use of a constellation of satellites orbiting the earth to provide signals to a receiver that estimates its position relative to the earth from those signals. Examples of such satellite systems are the NAVSTAR Global Positioning System (GPS) deployed and maintained by the United States, the GLObal NAvigation Satellite System (GLONASS) deployed by the Soviet Union and maintained by the Russian Federation, and the Galileo system currently being deployed by the European Union (EU).

Each GPS satellite transmits continuously using two radio frequencies in the L-band, referred to as L1 and L2, at respective frequencies of 1575.41 MHz and 1227.60 MHz. Two signals are transmitted on L1, one for civil users and the other for users authorized by the United States Department of Defense (DoD). One signal is transmitted on L2, intended only for DoD-authorized users. Each GPS signal has a carrier at the L1 and L2 frequencies, a pseudo-random number (PRN) code, and satellite navigation data. Two different PRN codes are transmitted by each satellite: A coarse acquisition (C/A) code and a precision (P/Y) code which is encrypted for use by authorized users. A GPS receiver designed for precision positioning contains multiple channels, each of which can track the signals on both L1 and L2 frequencies from a GPS satellite in view above the horizon at the receiver antenna. From these, the GPS receiver computes the observables for that satellite comprising the L1 pseudorange, possibly the L2 pseudorange and the coherent L1 and L2 carrier phases. Coherent phase tracking implies that the carrier phases from two channels assigned to the same satellite and frequency will differ only by an integer number of cycles.

Each GLONASS satellite transmits continuously using two radio frequency bands in the L-band, also referred to as L1 and L2. Each satellite transmits on one of multiple frequencies within the L1 and L2 bands respectively centered at frequencies of 1602.0 MHz and 1246.0 MHz. The code and carrier signal structure is similar to that of NAVSTAR. Each Galileo satellite transmits continuously using an E1 band, an E5 band, and an E6 band respectively centered at 1575.42 MHz, 1191.76 MHz, and 1278.75 MHz. A GNSS receiver designed for precision positioning contains multiple channels each of which can track the signals from GPS, GLONASS, and Galileo satellites on their respective L1, L2, E1, E5, and E6 frequencies, and generate pseudorange and carrier phase observables from these. Future generations of GNSS receivers will include the ability to track signals from all deployed GNSS.

Virtual Reference Stations

To achieve very accurate positioning (to several centimeters or less) of a terrestrial mobile platform, relative or differential positioning methods are commonly employed. These methods use a GNSS reference receiver located at a known position, in addition to the data from a GNSS receiver on the mobile platform, to compute the estimated position of the mobile platform relative to the reference receiver. The most accurate known method uses relative GNSS carrier phase interferometry between the GNSS rover receiver and GNSS reference receiver antennas plus resolution of integer wavelength ambiguities in the differential phases to achieve centimeter-level positioning accuracies. These differential GNSS methods are predicated on the near exact correlation of several common errors in the rover and reference observables. They include ionosphere and troposphere signal delay errors, satellite orbit and clock errors, and receiver clock errors.

When the baseline length between the mobile platform and the reference receiver does not exceed 10 kilometers, which is normally considered a short baseline condition, the ionosphere and troposphere signal delay errors in the observables from the rover and reference receivers are almost exactly the same. These atmospheric delay errors therefore cancel in the rover/reference differential GNSS observables and the carrier phase ambiguity resolution process required for achieving centimeter-level relative positioning accuracy is not affected by them. If the baseline length increases beyond 10 kilometers (considered a long baseline condition), the differences between the errors at the rover and reference receiver antennas increase in magnitude. As a result, the rover/reference differential GNSS observables and their influence on the ambiguity resolution process increases. Ambiguity resolution on single rover-reference receiver baselines beyond 10 kilometers thus becomes increasingly unreliable. This attribute limits the precise resolution of a mobile platform with respect to a single reference receiver, and essentially makes it unusable on a mobile mapping platform that covers large distances as part of its mission, such as an aircraft.

A network GNSS method computes the estimated position of a rover receiver using reference observables from three or more reference receivers that approximately surround the rover receiver position. This implies that the rover receiver position is mostly contained by a polygon whose vertices are the reference receiver antennas. The rover receiver can move a few kilometers outside this polygon, or a line between two of the reference receivers, without significant loss of positioning accuracy. A network GNSS algorithm calibrates the ionosphere and troposphere signal delays at each reference receiver position and then interpolates and possibly extrapolates these to the rover position to achieve better signal delay cancellation on long baselines than could be had with a single reference receiver. Various methods of signal processing can be used, however they all yield essentially the same performance improvement on long baselines.

Kinematic ambiguity resolution (KAR) satellite navigation is a technique used in numerous applications requiring high position accuracy. KAR is based on the use of carrier phase measurements of satellite positioning system signals, where a single reference station provides the real-time corrections with high accuracy. KAR combines the L1 and L2 carrier phases from the rover and reference receivers so as to establish a relative phase interferometry position of the rover antenna with respect to the reference antenna. A coherent L1 or L2 carrier phase observable can be represented as a precise pseudorange scaled by the carrier wavelength and biased by an integer number of unknown cycles known as cycle ambiguities. Differential combinations of carrier phases from the rover and reference receivers result in the cancellation of all common mode range errors except the integer ambiguities. An ambiguity resolution algorithm uses redundant carrier phase observables from the rover and reference receivers, and the known reference antenna position, to estimate and thereby resolve these ambiguities.

Once the integer cycle ambiguities are known, the rover receiver can compute its antenna position with accuracies generally on the order of a few centimeters, provided that the rover and reference antennas are not separated by more than 10 kilometers. This method of precise positioning performed in real-time is commonly referred to as real-time kinematic (RTK) positioning.

The reason for the rover/reference separation constraint is that KAR positioning relies on near exact correlation of atmospheric signal delay errors between the rover and reference receiver observables, so that they cancel in the rover-reference observables combinations (for example, differences between rover and reference observables per satellite). The largest error in carrier-phase positioning solutions is introduced by the ionosphere. When the signals radiated from the satellites penetrate the ionosphere on their way to the ground-based receivers, they experience delays in their signal travel times and shifts in their carrier phases. A second significant source of error is the troposphere delay. When the signals radiated from the satellites penetrate the troposphere on their way to the ground-based receivers, they experience delays in their signal travel times that are dependent on the temperature, pressure and humidity of the atmosphere along the signal paths. Fast and reliable positioning requires good models of the spatio-temporal correlations of the ionosphere and troposphere to correct for these non-geometric influences.

Network GNSS methods using multiple reference stations of known location allow correction terms to be extracted from the signal measurements. Those corrections can be interpolated to all locations within the network. Network KAR is a technique that can achieve centimeter-level positioning accuracy on large project areas using a network of reference GNSS receivers. This technique operated in real-time is commonly referred to as network RTK. The network KAR algorithm combines the pseudorange and carrier phase observables from the reference receivers as well as their known positions to compute calibrated spatial and temporal models of the ionosphere and troposphere signal delays over the project area. These calibrated models provide corrections to the observables from the rover receiver, so that the rover receiver can perform reliable ambiguity resolution on combinations of carrier phase observables from the rover and some or all reference receivers. The number of reference receivers required to instrument a large project area is significantly less than what would be required to compute reliable single baseline KAR solutions at any point in the project area. See, for example, U.S. Pat. No. 5,477,458, "Network for Carrier Phase Differential GPS Corrections," and U.S. Pat. No. 5,899,957, "Carrier Phase Differential GPS Corrections Network". See also Liwen Dai et al., "Comparison of Interpolation Algorithms in Network-Based GPS Techniques," Journal of the Institute of Navigation, Vol. 50, No. 4 (Winter 2003-2004) for a comparison of different network GNSS implementations and comparisons of their respective performances.

A virtual reference station (VRS) network method is a particular implementation of a network GNSS method that is characterized by the method by which it computes corrective data for the purpose of rover position accuracy improvement. A VRS network method comprises a VRS corrections generator and a single-baseline differential GNSS position generator such as a GNSS receiver with differential GNSS capability. The VRS corrections generator has as input data the pseudorange and carrier phase observables on two or more frequencies from N reference receivers, each tracking signals from M GNSS satellites. The VRS corrections generator outputs a single set of M pseudorange and carrier phase observables that appear to originate from a virtual reference receiver at a specified position (hereafter called the VRS position) within the boundaries of the network defined by a polygon (or projected polygon) having all or some of the N reference receivers as vertices. The dominant observables errors comprising a receiver clock error, satellite clock errors, ionosphere and troposphere signal delay errors and noise all appear to be consistent with the VRS position. The single-baseline differential GNSS position generator implements a single-baseline differential GNSS position algorithm, of which numerous examples have been described in the literature. B. Hofmann-Wellenhof et al., Global Positioning System Theory and Practice, 5th Edition, 2001 (hereinafter "Hofmann-Wellenhof [2001]"), gives comprehensive descriptions of different methods of differential GNSS position computation, ranging in accuracies from one meter to a few centimeters. The single-baseline differential GNSS position algorithm typically computes differences between the rover and reference receiver observables to cancel atmospheric delay errors and other common mode errors such as orbital and satellite clock errors. The VRS position is usually specified to be close to or the same as the roving receiver's estimated position so that the actual atmospheric errors in the roving receiver's observables approximately cancel the estimated atmospheric errors in the VRS observables in the rover-reference observables differences.

The VRS corrections generator computes the synthetic observables at each sampling epoch (typically once per second) from the geometric ranges between the VRS position and the M satellite positions as computed using well-known algorithms such as given in "Naystar GPS Space Segment/Navigation User Interface," ICD-GPS-200C-005R1, 14 Jan. 2003 (hereinafter "ICD-GPS-200"). It estimates the typical pseudorange and phase errors comprising receiver clock error, satellite clock errors, ionospheric and tropospheric signal delay errors and noise, applicable at the VRS position from the N sets of M observables generated by the reference receivers, and adds these to the synthetic observables.

A network RTK system operated in real time requires each GNSS reference receiver to transmit its observables to a network server computer that computes and transmits the corrections and other relevant data to the GNSS rover receiver. The GNSS reference receivers, plus hardware to assemble and broadcast observables, are typically designed for this purpose and are installed specifically for the purpose of implementing the network. Consequently, those receivers are called dedicated (network) reference receivers.

An example of a VRS network is designed and manufactured by Trimble Navigation Limited, of Sunnyvale, Calif. The VRS network as delivered by Trimble includes a number of dedicated reference stations, a VRS server, multiple server-reference receiver bi-directional communication channels, and multiple server-rover bi-directional data communication channels. Each server-rover bi-directional communication channel serves one rover. The reference stations provide their observables to the VRS server via the server-reference receiver bi-directional communication channels. These channels can be implemented by a public network such as the Internet. The bi-directional server-rover communication channels can be radio modems or cellular telephone links, depending on the location of the server with respect to the rover.

The VRS server combines the observables from the dedicated reference receivers to compute a set of synthetic observables at the VRS position and broadcasts these plus the VRS position in a standard differential GNSS (DGNSS) message format, such as one of the RTCM (Radio Technical Commission for Maritime Services) formats, an RTCA (Radio Technical Commission for Aeronautics) format or a proprietary format such as the CMR (Compact Measurement Report) or CMR+ format which are messaging system communication formats employed by Trimble Navigation Limited. Descriptions for numerous of such formats are widely available. For example, RTCM Standard 10403.1 for DGNSS Services—Version 3, published Oct. 26, 2006 (and Amendment 2 to the same, published Aug. 31, 2007) is available from the Radio Technical Commission for Maritime Services, 1800 N. Kent St., Suite 1060, Arlington, Va. 22209. The synthetic observables are the observables that a reference receiver located at the VRS position would measure. The VRS position is selected to be close to the rover's estimated position so that the rover-VRS separation is less than a maximum separation considered acceptable for the application. Consequently, the rover receiver must periodically transmit its approximate position to the VRS server. The main reason for this particular implementation of a real-time network RTK system is compatibility with RTK survey GNSS receivers that are designed to operate with a single reference receiver. Descriptions of the VRS technique are well known in the positioning arts.

The term "VRS", as used henceforth in this document, is used as shorthand to refer to any system or technique which has the characteristics and functionality of VRS described or referenced herein and is not necessarily limited to a system from Trimble Navigation Ltd. Hence, the term "VRS" is used in this document merely to facilitate description and is used without derogation to any trademark rights of Trimble Navigation Ltd. or any subsidiary thereof or other related entity.

Example Reference Station Network

FIG. 1A is a block diagram of system for delivery of location-dependent time-specific corrections in accordance with one embodiment. In FIG. 1A, a plurality of positioning satellites 101 broadcasts positioning signals (e.g., 150 and 151) for use in determining the position of a signal receiver. In FIG. 1A, a rover station 105 receives positioning signals 150 from positioning satellites 101, for example of a global navigation satellite system (GNSS) system. Positioning signals 150 preferably are received from at least four positioning satellites, enabling the rover station 105 to determine its position on the earth surface, e.g. in terms of longitude, latitude and altitude. Generally, the rover station 105 employs any technique to receive and process positioning signals from the positioning satellites 101, including signals of GPS, GLONASS, Compass, Galileo, IRNSS, or as used in any other GNSS. For determining its position, the rover station 105 measures distances to a plurality of satellites 101 based on a time of flight of radio signals from the satellites 101 to the rover station 105.

For measuring the time of flight of a radio signal from a satellite 101 to the rover station 105, the rover station 105 may compare a bit sequence received from the satellite, or directly from the carrier signal, so called carrier phase processing, received from the satellite 101 with an internally generated version thereof. By comparing the rising and trailing edges of the bit transitions of the successively delayed internal version of the signal with the signal 150 from the satellite 101, ultimately a match can be found and the amount of time shift of the locally generated version of the bit sequence necessary constitutes the time delay, and thus time of flight, of signal 150 thus allowing rover station 105 to obtain a distance to the satellite which transmitted a particular signal 150. By a similar procedure a phase shift can be determined in carrier phase applications such as RTK and/or VRS.

Generally, the positioning signals from the satellites 101 are transmitted at known instances in time and may be provided with a time tag, both being determined on the basis of highly accurate clocks at the satellites. For measuring the time of flight of a signal traveling at this speed of light, very precise clocks are required. As an example, a radio signal from a GNSS satellite 101 may travel to a receiver on the earth's surface in about 0.06 seconds, and any error in the measurement of the time of flight translates into a position error by multiplication with the speed of light. GNSS satellites typically carry at least one highly accurate atomic clock for timing a transmission of the positioning signals. In order to measure the time of flight, the rover station 105 is also is required to provide timing signals that are usually generated on the basis of an internal rover unit clock, e.g. a quartz clock or any other kind of timing device. Both clocks, at the satellite(s) 101 and at the rover station 105, however, are of limited accuracy and the time deviations introduced by the respective clocks translates into a range error. Conceivably, with the short times of flight of radio signals from the satellite(s) 101 to the rover station 105, the slightest clock errors translate into comparatively large positioning errors. It is noted that even though the atomic clocks at the satellite(s) 101 are highly accurate, they still suffer from a random drift. Additionally, various error sources negatively affect the accuracy of the position determination at the rover station 105. The error sources include clock errors, ionosphere effects, ephemeris or orbit errors, multi path distortion, relativistic effects and troposphere effects, as generally known in the art.

Associated positioning errors can be efficiently removed, e.g. based on correction data in an RTK and/or VRS system that is made available by a reference station or reference station network and/or using single differencing or double differencing techniques, according to which multiple measurements affected by the same error sources are subtracted from one another to remove the errors. In FIG. 1A, a network of reference data GNSS receivers 102, hereinafter referred to as "reference station network 102," receives positioning signals 151 from positioning satellites 101. Each reference station (not shown) of reference station network 102 is located at an exactly known position and able to make measurements based on the positioning signals 151 from the satellites for comparison of the detected position with the known reference station position. Reference station networks may be provided based on a grid with a spacing of e.g. 20 km or 100 km. Also systems with spacings of up to 1000 km are conceivable. In the example of FIG. 1, reference station network 102 comprises at least one reference station in a polygon region in which rover station 105 is located. However, there is no requirement for rover station 105 to be within the polygon region bounded by the reference stations of reference station network 102.

In general, errors in determining the position of reference stations of reference station network 102, based on the positioning signals 151 from the satellites 101, will suffer from the same error based on the positioning signals 150 received by rover station 105. As the exact position(s) of the reference station(s) of reference station network 102 are known, the measurement at these locations is be used to derive correction data which is comparable the clock error attributed to the satellite clock drift at the rover station. Therefore, if the correction data is made available to rover station 105, rover station 105 can more accurately determine its position based on the positioning signals from the satellites 101 and the correction data. It is noted that other errors apart from a clock error, such as errors introduced by signals traveling through the troposphere and errors introduced by deviations of the satellite orbits, can also be derived based upon positioning signals measured by reference station network 102. Additionally, errors introduced by the signals traveling through the ionosphere can be also removed directly at the rover station 105, if the rover station 105 performs measurements of positioning signals in different frequencies as ionospheric errors are frequency dependent.

A reference station is a GPS station or point whose location coordinates are accurately known; determination of the baseline between any other point, such as a rover GPS station or user, and the reference station establishes the location of that other point. A reference station can supply unprocessed, partly processed or fully processed carrier phase data to a rover station.

In one embodiment, to implement MLIAR algorithms, rover station computes single-difference or double-difference Accumulated Delta Range (ADR) residuals for each GPS satellite. One ADR residual is the difference between the measured, cumulative carrier phase (CCP) and the computed or theoretical range ("theorange"). The ADR includes a range to the satellite and, optionally, ionospheric and/or tropospheric signal propagation time delay, satellite and GPS receiver clock offsets and clock errors, and orbit and atmospheric modeling errors.

A single-difference ADR is the difference between GPS signal values for a rover station and a reference station (fixed at the end of a baseline), where the same satellite is used for both stations. Forming single-differences removes the effects of errors common to two receivers over long distances, including satellite clock errors and much of the residual error in an atmospheric time delay model. A double-difference is the difference between two single-differences, referenced to two different satellites and a single station. Forming a double-difference removes errors common to two, or to all, satellites, including the differential clock offset between two receivers on a baseline.

If a single reference station is used, the GPS information transmitted by that station can be unprocessed cumulative carrier phase (CCP) measurements or processed CCP residuals. One advantage of transmission of CCP residuals or corrections is that the dynamic range of the residuals is much smaller than the dynamic range of the measurements themselves. However, use of CCP residuals requires that the orbit data used by a reference station and a rover station are coordinated; the reference station sends out ephemeris adjustments for rover stations that do not promptly communicate with the reference station. If raw ADR measurement information is transmitted, the rover station constructs the double-difference values using its own orbit data, and coordination is not required.

In one embodiment, a network of reference stations transmits GPS information that allows the rover station to reconstruct the GPS information ("virtual data") that would have been sent from a (virtual) reference station, located near or next to the rover station. This virtual data may be either unprocessed CCP measurement information or ADR residuals, depending upon rover station requirements. CCP information can be sent directly to the rover station by a data link, to be combined therein to provide virtual data. An alternative method with lower bandwidth requirements assembles the GPS information from all reference stations at a master reference station, then combines this information to form a parametric model from which virtual data can be computed anywhere in a given region. In either instance, the rover station must provide an initial estimate of its own location.

In one embodiment, each reference station performs its own signal processing and issues its own data signals for use by a GPS rover station. The location coordinates of each of the reference stations are known with high accuracy, either by use of a survey or by some other means. A reference station receives the data signals from three or more satellites, determines its own pseudorange corrections and resolves its own carrier phase integer ambiguities, and sends this information to any rover stations within about 100-200 km of this reference station. A rover station located near this reference station receives this information and determines its own pseudorange corrections and resolves its own carrier phase ambiguities based on the information this rover station receives from nearby reference stations.

In another embodiment, the reference stations receive GPS signals from the satellites, perform some initial processing (or no processing) and send reference output signals directly or indirectly to a master reference station for further signal processing and determination of parameters to be used for a region-wide model for pseudorange corrections of the GPS signals. The master reference station includes a reference signal antenna and receiver and a computer for processing and analyzing the signals from the reference stations. Each of the other reference stations functions as a slave reference station (SFS) and sends signals received at that other reference station to the master reference station by a low speed data link LS (e.g., once every 15-1200 sec) or by a high speed data link. Alternatively, each reference station can send its information directly to the master reference station. The master reference station receives an update of carrier phase data from all reference stations, in processed, partly processed or unprocessed form, from the or from all reference stations at least once in every, time interval of length 15-1200 sec (preferably once every 0.1-15 sec). Typical updated carrier phase data received by the master reference station include the following information:

(a) time of observation or measurement;
(b) satellite identification number (pseudorandom noise number for GPS);
(c) code phase data (for both L1 and L2 carriers, if available);
(d) carrier phase data (for both L1 and L2 carriers, if available);
(e) Doppler shift data (for both L1 and L2 carriers, if available);
(f) cycle lock counter (for both L1 and L2 carriers, if available).

Information transmitted by a reference station to the master reference station, by a reference station to a rover station, and/or by a master reference station to a rover station can, optionally, be compressed before transmission and decompressed at the central station, using data compression techniques such as run length encoding, the JPEG standards or any other suitable data compression algorithm.

The measurement time may be the same for all satellite measurements in a single epoch. Doppler shift data are derived from closely-spaced carrier phase data and are used principally for small realignments of this data. These realignments may be omitted if the reference station receiver/processors are already synchronized to within a few microseconds and the data have been propagated with the same time tag. The cycle slip counter is incremented if an uncorrected cycle slip occurs during carrier tracking, which requires a new resolution of the integer ambiguities associated with use of carrier phase data.

In FIG. 1A, a communication network 103 is used to convey the data collected by the reference stations of reference station network 102 to a master reference station 120. Communication network 103 can be a wired or wireless, communication network, or can use a combination thereof. In one embodiment, the data conveyed by communication network 103 comprises the raw observables of positioning signals 151 from at least one reference station in reference station network 102. Alternatively, processed, or partially processed, data from one or more of the reference stations comprising reference station network may be conveyed to master reference station 120.

In one embodiment, network 103 is partially based on the paradigm of more accurately determining the satellite positions (i.e., correcting GPS errors of the second type), the same paradigm employed by "reverse" GPS. However, rather than instantaneously determining the "true" positions of the satellites based on the known positions of a network of ground stations, network 103 may utilize a complex orbital model to predict the orbital position of the satellites. This model contains corrections for orbit distortions caused by tidal forces, solar pressure, and other forces acting upon the satellites. However, the end result is more than a simple orbital model. Positional determinations are made by the network of ground stations as in "reverse" GPS. These data are then combined with the modeled orbital position through a Kalman-type sequential filter/smoother to generate a dynamic orbital model that combines the features of orbital mechanics and "reverse" GPS. In actual practice the satellite positions provided are significantly more accurate than the satellite positional information ordinarily supplied by the GPS system. By improving the accuracy of the satellite position information, error in determining the position of the satellite is considerably reduced.

The same system, just described, that reduces error in determining the position of the satellite also yields improvements for determining the pseudorange from a navigation satellite to a reference receiver. These errors are those that impact the measurement of apparent distance (pseudorange) between the receiver and the satellites. These errors are caused either by variations in the rate at which the signals travel from the transmitter to the receiver or by variations in the clocks used to measure the rate of signal travel. The variation of signal transmission through the ionosphere is largely corrected by use of dual frequency observables (i.e., the combination between data from carrier frequency L1 (1.57542 GHz) and L2 (1.2276 GHz).

In practice this L1/L2 corrected pseudorange is measured at one-second intervals, which results in data with a noise of more than one meter. However, carrier wave phase data is also measured at a one-second interval. This data has, as explained above, an arbitrary bias (i.e., the exact integer value of whole wavelengths is unknown), but is measured with great precision. A smoothing procedure can be employed in which the carrier phase data is used to constrain and smooth the pseudorange data so that noise is rapidly reduced to less than 10-20 cm.

Once an improved orbit model is constructed that includes the pseudorange measurements, overall corrections to the potential clock errors can also be computed. It is known that the satellite clocks are highly stable however they suffer from both short-term and long term errors that are not completely predicatable. The satellites report the offsets between their on-board clocks and a system-wide GPS clock. However, it is relatively simple to equip the network of stations taking GPS data with a stable and accurate clock to provide network time. This network time exactly tracks GPS time, but there is an initially unknown offset between network time and GPS time.

When the orbital solutions are complete, the precise distance from a satellite to a receiver at a known position becomes a known quantity. The offset between the receiver station and network time is known, as well as the offset reported by the satellite between the satellite's clock and GPS time. It is possible, then, to calculate how much the satellite clock was offset from network time during the pseudorange measurement to produce the correct distance (i.e., the modeled distance). The calculated satellite clock offset includes the clock variations arising naturally from instability of the GPS satellite oscillators.

In one embodiment, the GIPSY-OASIS II software system developed by the Jet Propulsion Laboratory is used to perform the orbital modeling, Kalman-type filtering and clock corrections, and accurate dynamic modeling of GPS orbital position. While this software system is routinely used in a batch process rather than a real-time mode, and while it contains many functions not required to perform the above processes, it does represent a well-known, well-tested software device that can provide many important functions.

The GIPSY-OASIS-II software system is well known to those of ordinary skill in the art. This software system consists of a number of separate software modules that are linked together by the user to produce the desired results.

The GIPSY-OASIS II software system will be described only briefly and in relation to its use in one embodiment of network 103.

It had been previously assumed that the dynamic orbit determination techniques, such as those employed by GIPSY-OASIS II, are applicable only in a postprocessing mode to calculate orbits after the fact. However, GIPSY-OASIS II has been used successfully to dynamically determine orbits in a real-time process to constantly provide correction data to greatly improve the accuracy of GPS determinations.

One feature of the system is the separation of orbit and clock corrections. In actual operation the system produces a "slow" and a "fast" update or correction to GPS parameters. Since the satellite orbits and the long-term clock behavior are stable, these factors form the slow update which is broadcast every five minutes. One reason for this relatively frequent update is that it allows any newly-arrived system user to obtain full corrections within a maximum of five minutes. However, since atmospheric conditions and short-term satellite clock behavior can change rapidly, these factors are transmitted every six seconds as the fast update. The general idea is that the system provides a slowly updated orbit correction and then uses a fast pseudorange correction to remove remaining satellite clock errors.

With this system, a dynamical orbit solution may reduce the ephemeris error from about 10 m to about 30-50 cm by effectively replacing the GPS broadcast orbit. However, the fast pseudorange determination, which is made with more recent data than that which went into the orbit solutions, still contains a residual component of ephemeris error which will be partly common to users. That is, the fast correction for each satellite is obtained from the data from multiple ground stations, and thus contains a sort of average ephemeris error over the sites used to compute the correction. When applied to user data, this fast correction will scale down the new ephemeris error, but this effect is more pronounced over local areas than over wide areas.

As an example, pseudorange and carrier phase data, arrives from ground stations by means of special phone and data lines or by data links (i.e. by communication satellite). The number and location of the ground stations influences the overall accuracy of the system as well as the geographical region over which users can obtain correction information.

The ground stations continually report complete GPS data from the currently visible GPS satellites This includes pseudorange data (one-second update) at each of the two GPS frequencies (L1 and L2), carrier phase data representing each of the two carrier frequencies (one-second update), the current ground station clock value, the satellite clock (from the received GPS data), as well as the reported satellite position and reported satellite clock offset from the master GPS clock (reported as part of a navigation message modulated on the GPS carrier frequencies). These data are received by a real-time data retrieval module. The data retrieval module demodulates the data as necessary and arranges the incoming data into a format for further processing. The arranged data are accepted by a data validation and editing module.

The validation and editing module detects outlier, missing and/or corrupted or clearly erroneous data and automatically excises these data from the data set. At the same time, error messages are generated to warn of possible system or component failures. The validated data are then fed to a data compression module. Although the orbital modeling calculations are updated at five-minute intervals, the pseudorange and carrier phase data are available at one-second intervals. As already mentioned, the phase data are used to smooth the pseudorange data in a carrier-aided smoothing or compression process in the data compression module compressing five minutes' worth of data into a single data set.

Carrier-aided smoothing averages the point-by-point difference between the continuous phase measurements with their high precision and arbitrary bias and the simultaneously acquired pseudorange measurements which are noisy but unbiased, thereby smoothing down the pseudorange noise over the averaging period and producing a precise estimate of phase bias. By adding back this precise bias estimate to phase data points, it is possible to produce pseudorange measurements that are far more precise than the original data.

In a real-time application, the carrier-aided smoothing is carried out recursively to maintain a running current estimate of precise pseudorange, an estimate that will improve with time as more and more points are averaged. So long as phase is continuously counted, there is no error growth from continuously propagating the current averaged pseudorange forward in this way. This smoothing can, therefore, be carried out indefinitely while continuous phase lock is maintained. Should phase continuity be broken, the smoothing process may have to be restarted.

There are several ways to employ this type of carrier-aided smoothing in real-time. For the slow update process being described here, one can replace all one-second pseudo-ranges acquired over the update interval (say, 300 measurements over five minutes) with the single smoothed pseudorange produced at the end of the interval. The smoothing operation is then restarted for the next update. This greatly reduces the data rate and the required processing time in direct proportion with no net loss of information, since the long-term correction has no high frequency components (i.e., neither orbits nor atomic clocks are expected to change rapidly), and with no loss of precision, since all acquired pseudorange measurements go into the smoothed result.

Since the accurate coordinate position of each ground station is known (and essentially unchanging), the GPS data can be reduced to an accurate distance from the station to a given GPS satellite. Because there is an overlapping network of ground stations it is possible to calculate a coordinate position for each satellite. Of course, this position falls prone to all of the possible errors discussed above. However, the system uses a recursive smoothing and averaging system (Kalman-type filter) to eliminate noise and errors and converge on an accurate answer.

The system converges on a more and more accurate answer. These more accurate answers are updated and combined with the incoming compressed data and the resulting "improved" satellite positions are used by an orbital prediction system to constantly compute, project and refine the satellite orbital positions. Any small glitches are smoothed out while the output gradually adjusts to overcome systemic biases. One of the fundamental paradigms for this process is the notion that satellite orbits cannot rapidly depart from their predicted forms. Any sudden changes are most likely to represent instrument errors or intentional satellite maneuvers, and in those instances such changes are readily detected in the affected data and would not be used for positioning or timing calculations.

In FIG. 1A, a corrections processor 121 of master reference station 120 generates an extended-lifetime correction 152 which is sent to rover station 105. In accordance with one embodiment, the master reference station 120 derives extended-lifetime correction data on the basis of measurements taken by the reference stations in the region in which rover station 105 is located using the positioning signals from the plurality of satellites 101, as indicated by the arrow 151. Again, it is noted that there is no requirement for rover station 105 to be within the polygon region bounded by the reference stations of reference station network 102. The extended-lifetime correction data are transmitted to the rover station 105, as indicated by the arrow 152.

In one embodiment, master reference station 120 is configured to receive measurements taken by reference stations of a plurality of regions and to generate a respective extended-lifetime correction 152 for each of the regions to which it is communicatively coupled. In one embodiment, corrections region selection system 124 accesses a spreadsheet which defines the reference stations used to collect GNSS observables for a particular reference station region and conveys this information to corrections processor 121. As will be described in greater detail below, corrections processor 121 is configured to receive the raw observables processed, or partially processed, data from one or more of the reference stations comprising a first reference station network of a first region and to generate a first extended-lifetime correction 152 for that region. Corrections processor 121 can then receive the raw observables processed, or partially processed, data from one or more of the reference stations comprising a second reference station network of a second region and to generate a second extended-lifetime correction 152 for the second region. It is noted that the extended-lifetime correction data 152 generated by master reference station 120 may be based upon measurements taken by at least one reference station in reference station network 102, or by master reference station 120 itself in accordance with one embodiment.

When it has generated an extended-lifetime correction 152 for a particular reference station region, corrections processor 121 sends it to a message formatter 126. Message formatter 126 is for formatting a VRS corrections message into an appropriate message format. In one embodiment, message formatter 126 accesses a timetable (e.g., 600 of FIG. 6) which defines the message format used to convey VRS corrections in the extended-lifetime correction 152.

Message formatter 126 then sends the extended-lifetime correction 152 to a distribution controller 127. In one embodiment, distribution controller 127 is configured to selectively couple master reference station 120 with communication distribution network 130 in a manner which allows a customer to tailor the delivery of extended-lifetime correction 152 based upon the equipment, communication networks available, communication costs, or other variables. In one embodiment, communications path controller 125 accesses timetable 600 of FIG. 6 which defines the communication pathway used to convey extended-lifetime correction 152 to rover station 105. Communications path controller 125 then causes distribution controller 127 to selectively couple master reference station 120 with communication distribution network 130.

Examples of components usable as distribution controller 127 include, but are not limited to, data routers or switches which are commercially available from Cisco Systems Inc. of San Jose, Calif. and from General Signal Corporation of Stamford, Conn. Distribution controller 127 can be configured for circuit switching or packet switching, with suitable data demodulators at the communications path inputs if packet switching is used. This facilitates conveying extended-lifetime correction 152, as configured by the message formatter 126, to the rover station 105 in that same format. In other words, the modulations, packetizing, and other message configuration of extended-lifetime correction 152 is transparent to the user of rover station 105. It is noted that in one embodiment, distribution controller 127 can be configured such that extended-lifetime correction 152 can be conveyed via a plurality of communication pathways simultaneously. In other words, extended-lifetime correction 152 can be sent via communication pathways 160, 161, 162, 164, 165, or a combination thereof.

Operator input adjustment system 122 facilitates allowing a user to configure the selection or reference station regions, reference receivers for a particular reference station region, the format of a VRS correction of extended-lifetime correction 152, a communication pathway used to convey extended-lifetime correction 152, the scheduling of delivery of extended-lifetime correction 152. As will be discussed in greater detail below, operator input adjustment system 122 can generate data (e.g., reference region spreadsheet 500 of FIG. 5 and timetable 600 of FIG. 6) which are used to control the above mentioned functions.

Various techniques are known to resolve clock errors, most notably single or double differencing techniques including multiple measurements to the same or different satellites and on the basis of correction data transmitted from a reference station to the rover station 105. The measurements taken by the reference station(s) allow elimination of most error sources for example by single differencing or double differencing, as noted above. For example, single difference techniques, forming a difference between measurements to two satellites, allows removal of satellite clock errors, and double difference techniques generally allow to remove clock errors at a rover station 105 and reference stations. As described above, the RTK and VRS systems are used to generate corrections data which are used to account for the clock errors, ionosphere effects, ephemeris or orbit errors, multi path distortion, relativistic effects and troposphere effects described above.

For the purposes of the present application, the term "extended-lifetime correction" refers to a correction (e.g., extended-lifetime correction 152) which is used in correcting the determination of a geographic position and which is usable for a period greater than one second. Because extended-lifetime correction 152 is usable for a period greater than one second, it can be used in situations when an interruption of the correction data stream occurs. As a result, extended-lifetime correction 152 facilitates a correction delivery method in which correction data can be provided to rover station 105 periodically rather than continuously.

Conventionally generated correction streams typically generate correction data on a second-by second basis. In other words, the data used in conventionally generated correction streams is only intended to be usable for a time period of one second. If the transmission of the correction stream becomes interrupted, it will lead to a progressively increasing error in the position determination at the rover station over time. Furthermore, conventionally generated correction streams do not include data which can be used to infer future signal errors from positioning satellites. More specifically, the correction data sent by a conventional VRS or RTK reference station typically does not include an explicit quantification of the respective errors introduced by the individual error sources, these values are only implicitly contained in the correction data as any measurements made at the reference station and at the rover station are subjected to approximately the same error sources. The correction data may only include range corrections for each of the plurality of satellites, i.e. a specification of the range corrections to be applied when determining a position of the rover station.

The extended-lifetime correction 152 transmitted from the master reference station 120 to the rover station 105 may be in the form of raw observations or measurements taken by the master reference station 120 or taken in reference station network 102, or may have been processed to reduce an amount of data to be transmitted, e.g. to provide positioning errors in terms of Cartesian coordinates or in terms of longitude, latitude and altitude to be expected at the rover station 105. In contrast to conventionally generated correction streams, extended-lifetime correction 152 further comprises parameters for running a correction feature at rover station 105 that predicts future clock errors, satellite orbit errors, and atmosphere induced errors for a given time period in the future. Rover station 105 can use the parameters conveyed in extended-lifetime correction 152 to precisely determine its position based upon position signals 150 which are received later. As a result, there is not a requirement for a continuous data stream which conveys second-by-second correction data to rover station 105.

In one embodiment, the error data conveyed in extended-lifetime correction 152 comprises an error description of the clock error for each of the clocks of satellites 101 such as clock drift. It is noted that besides error data specifying a satellite clock drift at the individual positioning satellites 101, further information on clock errors of the satellite clocks may be included, such as an absolute deviation of the satellite clocks from the reference time. Moreover, the error data received at the rover station 105 may include information on an orbit error, troposphere induced errors, and ionosphere induced errors. Thus, in one embodiment, extended-lifetime correction 152 comprises error data which facilitates rover station 105 in determining a corrected position at a later instance of time based upon previously received corrections and error data (e.g., extended-lifetime correction 152) and positioning signals received from satellites 101 at a second instance of time. As a result, it is not necessary to receive a correction for the second instance of time because rover station 105 can extrapolate a correction for the second instance of time based upon extended-lifetime correction 152.

Accordingly, during normal operation of the described embodiment, the rover station 105 performs a positioning determination based on positioning signals 150 received from the plurality of satellites 101 and based on the extended-lifetime correction 152 from the master reference station 120. In one embodiment, the use of extended-lifetime correction 152 facilitates using master reference station 120 to generate a respective extended-lifetime correction 152 for each of the regions from which measurements of positioning signal data are received from reference stations. Thus, master reference station 120 can be used to generate a plurality of extended-lifetime corrections 152 for a plurality of respective regions in which rover stations are located.

In FIG. 1A, extended-lifetime correction 152 is conveyed via a communication distribution network 130 to rover station 105. The communicative coupling between master reference station 120 and communication distribution network 130 may comprise a wired, wireless, optical, and/or network coupling, or a combination thereof for conveying extended-lifetime correction 152 to a transmitter. As shown in FIG. 1A, communication distribution network 130 can use one of a plurality of communication methods for delivering extended-lifetime correction 152 to rover station 105. For example, a communication satellite(s) can be used to convey extended-lifetime correction 152 to rover station 105. In one embodiment, communication distribution network 130 uses a satellite uplink 131 from a satellite control station (not shown) to send extended-lifetime correction 152 to one or more communication satellites. The communication satellites can be geostationary satellites, geosynchronous satellites, low earth orbit satellites (LEOs), medium earth orbit satellites (MEOs), or the like for re-broadcasting a signal.

In one embodiment, a first satellite uplink 160 is used to convey extended-lifetime correction 152 to a geosynchronous communication satellite 132. In one embodiment, a geostationary satellite system operated by Inmarsat PLC of London, England is used to convey extended-lifetime correction 152 to rover station 105. In another embodiment, a second satellite uplink 161 is used to convey extended-lifetime correction 152 to a LEO or MEO satellite. For example, extended-lifetime correction 152 can be conveyed by a LEO operated by Iridium Satellite LLC of Bethesda, Md. Another LEO system which can be used to convey extended-lifetime correction 152 is operated by Globalstar Inc. of Milpitas, Calif.

In another embodiment, communication distribution network 130 uses a communication link 162 to a cellular telephone network 133 to convey extended-lifetime correction 152 to rover station 105. In one embodiment, cellular telephone network 133 sends and receives message using the Short Message Service (SMS). However, cellular telephone network 133 is well suited to utilize other message formats as well such as the Global System for Mobile Communications (GSM) specification, the Global Packet Radio Service (GPRS) specification, the Code Division Multiple Access (CDMA) communication standard, or a variant thereof. Variants of the CDMA standard include, but are not limited to the CDMA-2000 standard, the WCDMA standard, the HSPDA standard, the TD-CDMA standard, and the cdmaOne standard. In another embodiment, cellular telephone network 133 is compliant with the Time Division Multiple Access (TDMA) standard. In another embodiment, cellular telephone network 133 is compliant with the Integrated Digital Enhanced Network (iDEN) specification. Thus, cellular telephone transceiver 112 is compliant with the International Telecommunication Union (ITU) standards under the International Mobile Telecommunication program (IMT-2000) in one embodiment. Additionally, one embodiment is well suited to implement potential 4G networks such as the Worldwide Interoperability for Microwave Access (WiMax) technology and the 3rd Generation Partnership Project (3GPP) Long Term Evolution (LTE) technology.

In another embodiment, communication distribution network 130 uses a communication link 164 to a radio relay broadcast system (e.g., 134) to convey extended-lifetime correction 152 to rover station 105. The use of radio broadcasts to convey RTK corrections data to a rover station is well known in the art. In one embodiment, extended-lifetime correction 152 is conveyed to a radio relay broadcast 134 via cellular telephone network 134. In one embodiment, radio relay broadcast 134 uses spread spectrum, ultra high frequency (UHF), 450 megahertz, 35 megahertz, 900 megahertz, 2.4 gigahertz (GHz), and 5.8 gigahertz, radio frequencies. Radio relay broadcast 134 typically uses a part of the radio spectrum that is allocated by the FCC on an unlicensed basis, such as 900 megahertz, 2.4 GHz, or 5.8 GHz, but is not limited to unlicensed radio frequencies alone. In one embodiment, radio relay broadcast 134 uses 2.4 gigahertz. Further radio relay broadcast 134 can use time division multiple access (TDMA) broadcast methods well known in the arts.

In another embodiment, communication distribution network 130 uses a communication link 165 to a pager network 135 to convey extended-lifetime correction 152 to rover station 105. In one embodiment, extended-lifetime correction 152 is transmitted from master reference station 120 to a lowband paging facility (not shown) of pager network 135. The paging facility contains an exciter that modulates extended-lifetime correction 152 onto a lowband RF carrier. The processing of extended-lifetime correction 152 for transmission is similar to that typically used at conventional bands (e.g., 150 to 174 MHz in the VHF band), but additional signal processing may be required to achieve an adequate data rate at lowband VHF.

The exciter may use digital modulation techniques that allow 10,000 to 16,000 bits per second to be broadcast within a 20 kHz paging channel while using a fully-saturated nonlinear amplifier. The paging facility may be configured as a statutory paging system using one-way paging.

The lowband paging facility amplifies the RF signal and transmits it through an antenna. Data may be transmitted on multiple RF carriers (either sequentially or simultaneously) to improve immunity to interference. The RF signal is received by the pager frequency receiver 114 and decoded to provide the rover station 105 with extended-lifetime correction 152.

In one embodiment, a paging system controller combines the functions of a paging terminal and system controller. The paging system controller can be coupled with a WAN, PSTN, the Internet, and a link network which is further coupled with transmitter site(s). The extended-lifetime correction 152 is provided to the paging system controller, and may be formatted by master reference station 120, the paging system controller, or both. Formatting may include encryption, compression, and error control coding as prescribed by various SATPS data and paging protocols. As will be discussed in greater detail, formatting of extended-lifetime correction may further comprise formatting VRS corrections (e.g., 240 of FIG. 2) to be compliant with implementations of the CMR or RTCM formats.

The paging system controller may combine messages from traditional sources such as a WAN, PSTN, and the Internet, with extended-lifetime correction 152 for transmission to a user. The paging system controller may manage the information flow to each rover station 105 based upon user account specifications for data type, coverage area, update frequency and other parameters.

For paging systems operating in low-band VHF with narrow broadcast channels (e.g., 20 kHz bandwidth), digital signal processing may be used to improve the effective data rate. The digital processing techniques may include filtering and modulation, and adaptive noise cancellation. Synchronized data communications and multiple frequency operation may also be used to enhance the data rate. Such improvements may be implemented on a systematic basis in both transmitter and receiver.

Examples of hardware that may be used to implement digital signal processing are the Texas Instruments TMS320VC5509 processor, Analog Devices AD9235 A/D converter, Analog Devices AD9857 upconverter, and Analog Devices AD6624 processor.

In one embodiment, rover stations using one-way paging may be provided a priori with the information needed to select a paging channel based upon location. A single transmitter site may broadcast over several channels with each reference station region having a dedicated channel, or a single frequency may be used to transmit data to different reference station regions alternatively (time multiplexed).

In FIG. 1A, rover station 105 is communicatively coupled with a satellite communication transceiver 110, a LEO/MEO transceiver 111, a cellular telephone transceiver 112, a terrestrial radio transceiver 113, and a pager frequency receiver 114. It is noted that while FIG. 1A shows satellite communication transceiver 110, LEO/MEO transceiver 111, cellular telephone transceiver 112, terrestrial radio transceiver 113, and pager frequency receiver 114 coupled with a common input line to rover receiver 105, it can be understood that each wireless receiver will have a separate data input, port, or receiving unit on rover station 105 and that a combination of the wireless receivers listed above can be used in various embodiments.

Satellite communication transceiver 110 can comprise any of a number of satellite communication receivers and/or data modems, depending upon the communication satellite that communications are to be received from. Additionally, in one embodiment satellite communication transceiver 110 is a transceiver device which enables two-way communication between terrestrial GNSS rover station 105 and a communication satellite, such as a communication satellite 132. Some examples of devices which can be used as satellite communication transceiver 110 include, but are not limited to, the Thrane and Thrane Explorer®100/110 mobile satellite transceiver, the Thrane and Thrane Explorer®300 mobile satellite transceiver, the Thrane and Thrane Explorer®500 mobile satellite transceiver, the Thrane and Thrane Explorer®600 mobile satellite transceiver, and the Thrane and Thrane Capsat®Messenger mobile satellite data terminal. In one embodiment satellite communication transceiver 110 receives an extended-lifetime correction 152 from a communication satellite, such as communication satellite 132, and provides the extended-lifetime correction 152 (or all or a portion of its contents) to rover station 105 as an input. Satellite communication transceiver 110 can also receive and provide other signals to rover station 105. For example, in one embodiment signals used by the previously referenced Enge-Talbot method are received and provided to rover station 105.

LEO/MEO transceiver 111 can comprise any of a number of LEO/MEO receivers and/or data modems, depending upon the LEO/MEO satellite that communications are to be received from. Typically, LEO/MEO transceiver 111 utilizes an omni-directional antenna to communicate with a LEO/MEO satellite as the satellite moves across the sky. Additionally, in one embodiment LEO/MEO transceiver 111 is a transceiver device which enables two-way communication between terrestrial GNSS rover station 105 and a LEO/MEO satellite, such as a satellite 132. Some examples of devices which can be used as LEO/MEO transceiver 111 include: an Iridium satellite telephone (e.g. the Motorola Iridium 9505A Portable Satellite Phone which includes a serial data port for communicative coupling with other devices during the reception of data); an Iridium satellite system compatible modem (e.g., the Iridium 9522A modem, the Iridium 9601 short burst data modem; and the RST600 Beam data modem); a Globalstar satellite phone (e.g., the Qualcomm GSP1600 and GSP 1600 satellite phones which each include a data port for communicative coupling with other devices during the reception of data); and a Globalstar compatible modem (e.g., Globalstar Duplex Modem or GSP-1620 Satellite Data Modem). In one embodiment LEO/MEO transceiver 111 receives an extended-lifetime correction 152 from a LEO/MEO satellite, such as satellite 132, and provides the extended-lifetime correction 152 (or all or a portion of its contents) to rover station 105 as an input. LEO/MEO satellite transceiver 111 can also receive and provide other signals to rover station 105. For example, in one embodiment signals used by the previously referenced Enge-Talbot method are received and provided to rover station 105.

Cellular telephone transceiver 112 sends and receives message using the Short Message Service (SMS) in one embodiment. However, cellular telephone transceiver 113 is well suited to utilize other message formats as well such as the Global System for Mobile Communications (GSM) specification, the Global Packet Radio Service (GPRS) specification, the Code Division Multiple Access (CDMA) communication standard, or a variant thereof. Variants of the CDMA standard include, but are not limited to the CDMA-2000 standard, the WCDMA standard, the HSPDA standard, the TD-CDMA standard, and the cdmaOne standard. In another embodiment, cellular telephone transceiver 113 is compliant with the Time Division Multiple Access (TDMA) standard. In another embodiment, cellular telephone transceiver 113 is compliant with the Integrated Digital Enhanced Network (iDEN) specification. Thus, cellular telephone transceiver 112 is compliant with the International Telecommunication Union (ITU) standards under the International Mobile Telecommunication program (IMT-2000) in one embodiment.

Figure 1B:
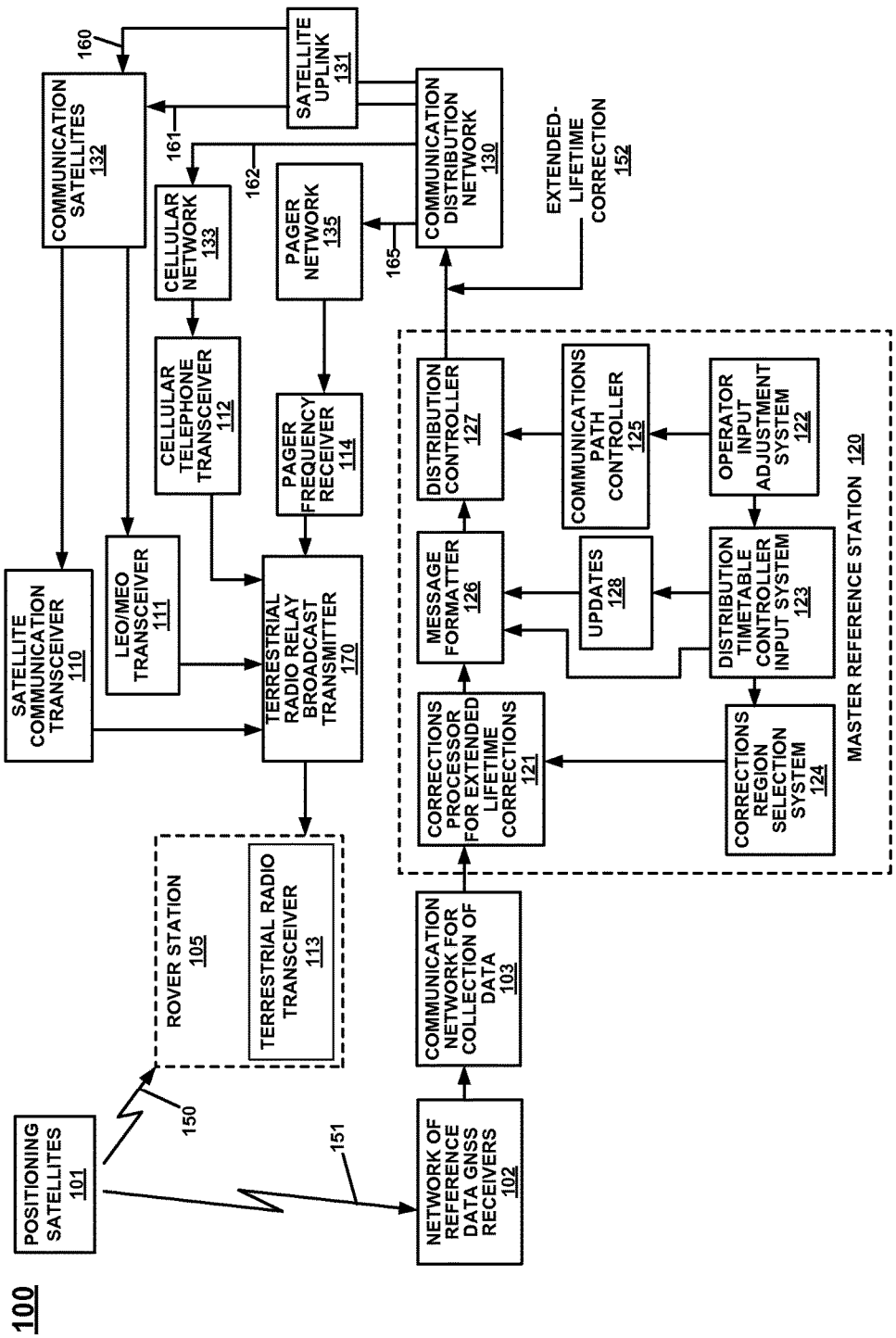
FIG. 1B, is a block diagram of a system for delivery of location-dependent time-specific corrections in accordance with one embodiment.

In one embodiment, terrestrial radio transceiver 113 uses spread spectrum, ultra high frequency (UHF), 450 megahertz, 35 megahertz, 900 megahertz, 2.4 gigahertz (GHz), and 5.8 gigahertz, radio frequencies. Terrestrial radio transceiver 113 typically uses a part of the radio spectrum that is allocated by the FCC on an unlicensed basis, such as 900 megahertz, 2.4 GHz, or 5.8 GHz, but is not limited to unlicensed radio frequencies alone. In one embodiment, terrestrial radio transceiver 113 uses 2.4 gigahertz. Further terrestrial radio transceiver 113 can use time division multiple access (TDMA) broadcast methods well known in the arts FIG. 1B is a block diagram of system for delivery of location-dependent time-specific corrections in accordance with another embodiment. For the purpose of brevity, the description of FIG. 1B is directed to the variation in delivering extended-lifetime correction 152 from master reference station 120 to rover station 105. In FIG. 1B, communication distribution network 130 again utilizes communication links 160, 161, 162 and 165 to convey extended-lifetime correction 152 to a geostationary communication satellite, a LEO/MEO communication satellite, a cellular telephone network, and/or a pager network respectively. In FIG. 1B, these communication channels are directed to a terrestrial radio relay broadcast transmitter 170. Thus, satellite communication transceiver 110, LEO/MEO transceiver 111, cellular telephone transceiver 112, and pager frequency receiver 114 are communicatively coupled with terrestrial radio relay broadcast transmitter 170 which then conveys extended-lifetime correction 152 to rover station 105 in a radio frequency broadcast. Terrestrial radio transceiver 113 receives extended-lifetime correction 152 for use by rover station 105.

As discussed above, existing implementations of RTK and VRS systems convey the corrections data stream to the rover station using radio broadcasts. However, in regions where the use of radio broadcasts from master reference station 120 to a radio relay station may be impractical due to distance or terrain, the use of communication satellites 132 to convey extended-lifetime correction 152 to terrestrial radio relay broadcast transmitter 170 may be desired. This permits using the existing terrestrial radio receiver (e.g., 113) on the rover station 105 to receive extended-lifetime correction 152 without the necessity of purchasing additional equipment or reconfiguring rover station 105. Furthermore, based upon the cost of using a given communication network, a user may prefer one communication system to convey extended-lifetime correction 152 to terrestrial radio relay broadcast transmitter 170. For example, if it is less expensive to use pager network 135 in comparison withy cellular network 133, a user can designate that pager network 135 is to be used to convey extended-lifetime correction 152 to terrestrial radio relay broadcast transmitter 170. Furthermore, in the event that one communication pathway becomes disabled, a user can simply select another pathway for conveying to convey extended-lifetime correction 152 to terrestrial radio relay broadcast transmitter 170.

In one embodiment, the use of terrestrial radio relay broadcast transmitter 170 with a cellular telephone transceiver 112 is set as a default condition for conveying extended-lifetime correction 152 to rover station 105. Typically, cellular communications devices (e.g., 112) can communicate farther and at higher baud rates than non-cellular communications devices such as terrestrial radio relay broadcast transmitter 170. However, a non-cellular communication device is typically more rugged and less expensive than cellular communications device. Further, non-cellular communications device can be used practically any where in the world while cellular communications devices are limited by their coverage areas and are already used to broadcast RTK and VRS corrections. By using cellular communications between terrestrial radio relay broadcast transmitter 170 and master reference station 120, and non-cellular communications between terrestrial radio relay broadcast transmitter 170 and rover station 105, the rover stations without cellular coverage (e.g., 105) and master reference station 120 can communicate can communicate over greater distances. Furthermore, it can be less expensive to associate non-cellular communications devices with most of the rover stations in a region, or by only using one cellular communication device to forward position requests and extended-lifetime correction 152 via radio relay broadcast transmitter 170.

Figure 1C:
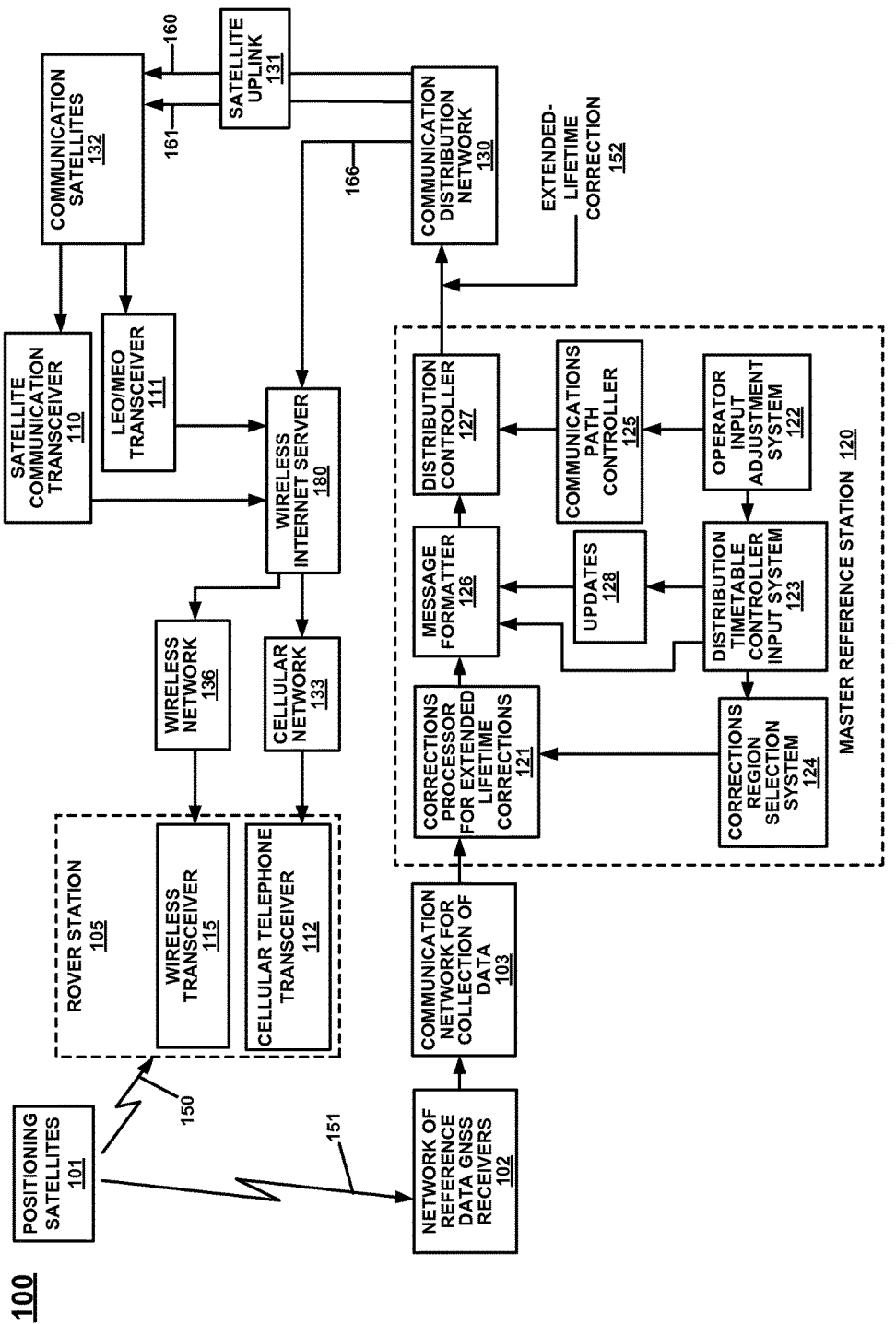
FIG. 1C, is a block diagram of a system for delivery of location-dependent time-specific corrections in accordance with one embodiment.

FIG. 1C is a block diagram of system for delivery of location-dependent time-specific corrections in accordance with another embodiment. For the purpose of brevity, the description of FIG. 1C is directed to the variation in delivering extended-lifetime correction 152 from master reference station 120 to rover station 105. In FIG. 1C, communication distribution network 130 again utilizes communication links 160, 161, 162 as well as a communication link 166 to convey extended-lifetime correction 152 to a geostationary communication satellite, a LEO/MEO communication satellite, and/or a wired network connection respectively. It is noted that wireless Internet server 180 can also be communicatively coupled with communication distribution network 130 via a cellular network and/or a pager network (e.g., 133 and 135 respectively of FIG. 1A).

In FIG. 1C, these communication channels are directed to a wireless Internet server 180. It is noted that wireless Internet server 180 can also be communicatively coupled with communication distribution network 130 via a cellular network and/or a pager network (e.g., 133 and 135 respectively of FIG. 1A). In the embodiment of FIG. 1C, rover station 105 receives extended-lifetime correction 152 via a cellular telephone transceiver 112 and/or a wireless receiver 115. As described above, cellular telephone receive 112 is compliant with the IMT-2000 standards (also referred to as the "3G" family of standards which facilitate greater network capacity and services such as, but not limited to, telephone, video call, broadband wireless data, Internet connectivity etc. In one embodiment, wireless Internet server 180 is configured to convey extended-lifetime correction 152 to rover station 105 using cellular network 133 and cellular telephone transceiver 112. In another embodiment, wireless Internet server 180 is configured to convey extended-lifetime correction 152 to rover station 105 via a wireless network 136 and a wireless receiver 115 communicatively coupled with rover station 105. In one embodiment, wireless network 136 is compliant with the 802.11 family of standards for wireless local area network communication. However, wireless network 136 is not limited to the 802.11 standard alone. In general, wireless receiver 115 is configured to implement packet-switched communications with wireless Internet server 180 via wireless network 136.

Example of Generation of Extended-Lifetime Corrections

Figure 2:
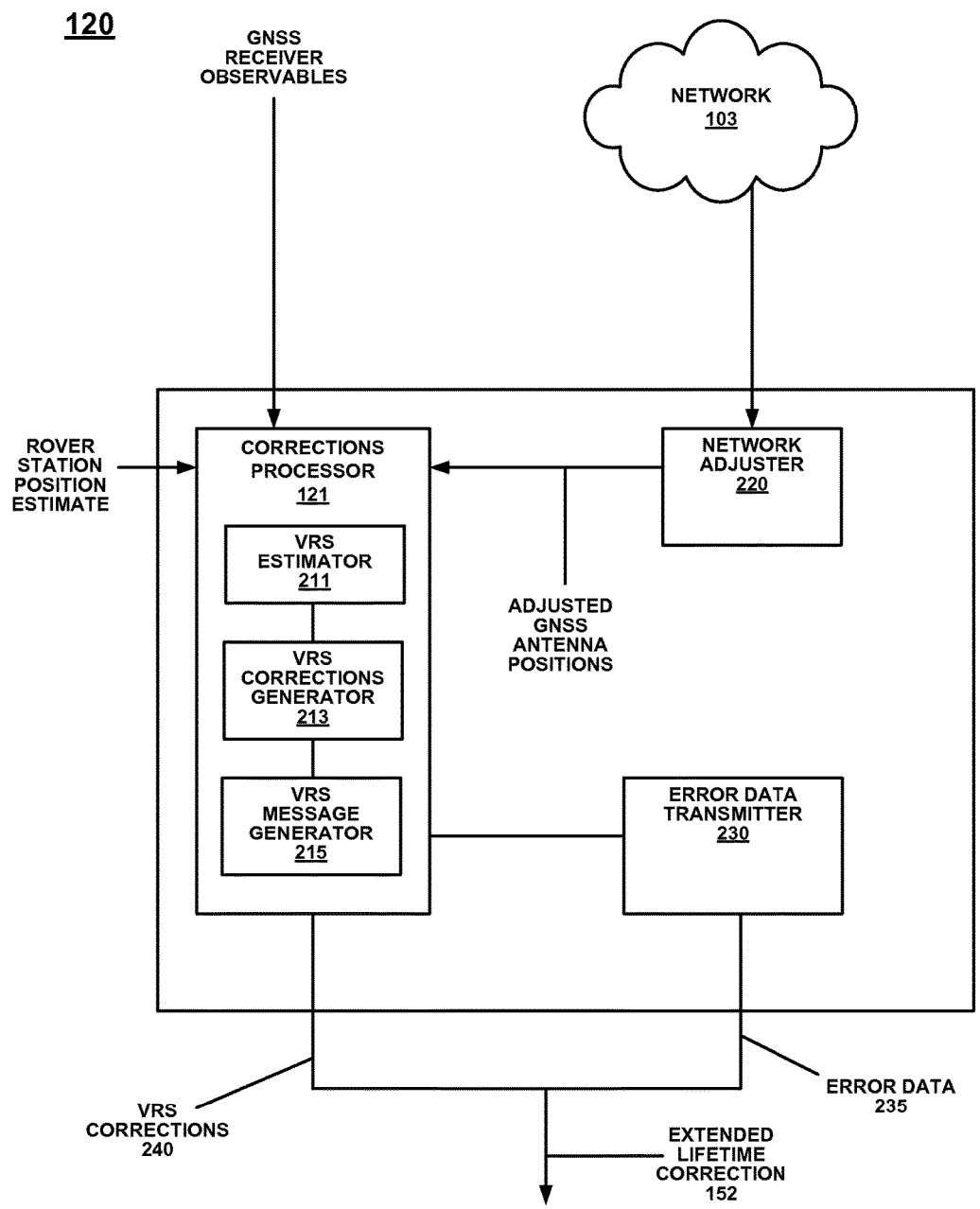
FIG. 2 is a block diagram of components of an example master reference station which produces extended-lifetime corrections in accordance with one embodiment.

FIG. 2 is a block diagram of components of an example master reference station 120 which produces extended-lifetime correction 152 for a particular position estimate, such as a first position estimate from a rover station 105, from inputs which include GNSS observables measured by a network of a plurality of GNSS reference receivers of reference station network 102. As shown in FIG. 2, in one embodiment, master reference station 120 includes a corrections processor for extended-lifetime corrections 121, hereinafter referred to as "corrections processor 121," and a network adjuster 220. It is appreciated that in some embodiments, network adjuster 220 is not included or is separate from master reference station 120.

Figure 11:
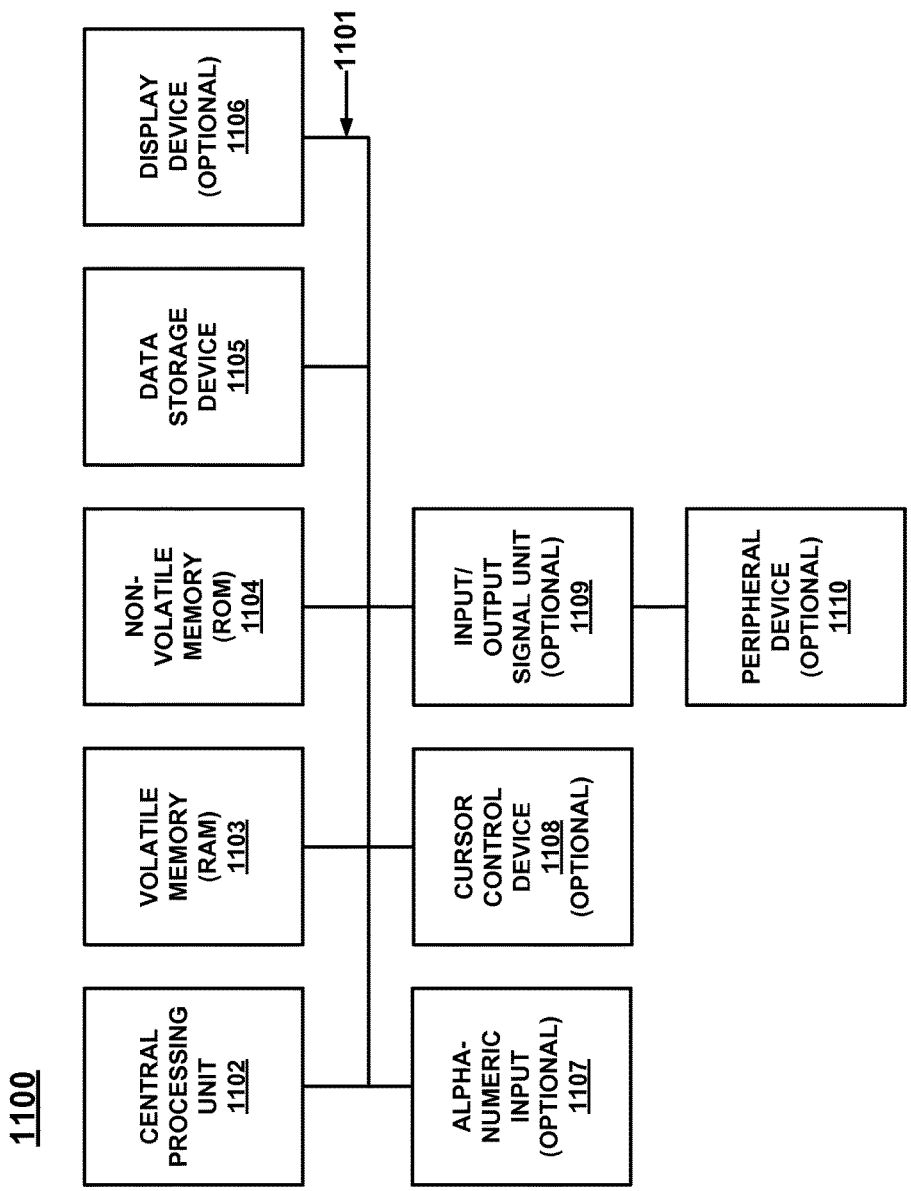
FIG. 11 is a block diagram of an example computer system used in accordance with one embodiment.

Network adjuster 220 can be (or operate within), for example, a personal computer or server-class computer that runs network adjustment software. Computer system 1100 of FIG. 11 provides an example of a computer system which is configurable to perform the operations of network adjuster 220. The network adjustment software evaluates and possibly corrects the published antenna positions for selected GNSS reference receivers of reference station network 102, which may be permanent and/or dedicated reference receivers. The network adjustment software inputs network GNSS data which includes an array of files of GNSS reference receiver observables. Such network GNSS data may be downloaded from a publicly accessible source over communication network 103 of FIG. 1A or the Internet. Based on the network GNSS data, the network adjustment software computes the relative positions of the antennas of the reference receivers and stores these positions in a file, or transmits the positions to corrections processor 121. To accomplish this, the network adjustment software can implement any one of a number of well-known, conventional algorithms currently used for network adjustment of static GNSS receivers. In addition to adjusted antenna positions, in some embodiments, network adjuster 220 provides corrections processor 121 with an assessment of data quality that a network adjustment typically generates.

In the technique introduced herein, corrections processor 121 receives and uses reference GNSS observables from multiple fixed-location GNSS reference receivers (e.g., all or some subset of GNSS reference receivers of reference station network 102 of FIG. 1A), distributed around a mission area, such as a region around or adjacent to the location of rover station 105. In one embodiment, the reference receivers that are used form a polygon which encompasses the location of the rover station position estimate received from rover station 105. However, in another embodiment, rover station 105 can be located outside of an area bounded by the reference receivers of reference station network 102. For example, the best prediction of VRS corrections at the location of rover station 105 typically occurs when rover station 105 is within a region bounded by the reference receivers of reference station network 102. However, an acceptable level of precision for determining the location of rover station 105 can be realized if rover station 105 is within a given distance from reference station network 102, or with a given distance from one of reference receivers of reference station network 102. Typically, the level of precision for determining VRS corrections for the location of rover station decreases as rover station 105 is located further from reference station network 102. However, this decrease in precision may still be within acceptable limits of accuracy in some situations. For example, an acceptable level of precision for determining VRS corrections for the location of rover station 105 may be realized if rover station 105 is within a 50 km radius of at least one of the reference receivers of reference station network 102. It is further noted that in embodiment, master reference station 120 may base corrections for the location of rover station 105 on the observables recorded at one reference receiver of reference station network 102.

In one embodiment, corrections processor 121 processes observables received from a plurality of GNSS reference receivers to generate VRS corrections for a position estimate, such as the first position estimate, determined by a GNSS receiver of rover station 105. In some instances observables may be received from a GNSS receiver at previously established virtual reference station and/or from one or more other GNSS receivers in a mission area. Corrections processor 121 can, for example, implement the VRS technique described by Eschenbach and O'Meagher (mentioned above). Note that VRS software which implements that technique can operate with any set of reference receiver observables, including permanent reference receiver observables.

Corrections processor 121 is essentially a network KAR subsystem. Corrections processor 121 receives as input the adjusted antenna positions as well as the reference GNSS data (e.g. observables) measured by a plurality of GNSS reference receivers and the position estimate (and in some instances observables information) that are provided by a GNSS receiver of rover station 105 during data acquisition. Corrections processor 121 uses these inputs to compute and output a set of VRS corrections 240 to generate a transmittable extended-lifetime correction 152 that contains all, or some portion of, VRS corrections 240.

Corrections processor 121 includes VRS software to compute a set of "synthetic" observables, i.e., observables for a virtual reference station (VRS). In certain embodiments, the position of the virtual reference station is taken as the geographic center of the project area. Note that the receiver position estimate for rover station 105 (such as the first position estimate), and in some instances other information collected by rover station 105, can be used by corrections processor 121 to allow it to interpolate appropriate atmospheric delays and other errors to the approximate position estimate (e.g., the first position estimate) determined by rover station 105 and apply those delays in an appropriate manner to generate the synthetic VRS observables for the position estimate provided by rover station 105.

In one embodiment, corrections processor 121 computes a set of VRS corrections 240, which is a file of synthetic VRS observables and the VRS antenna position (i.e., the GNSS observables and antenna position of a virtual reference station located at the position of rover station 105).

Corrections processor 121, in one embodiment, includes a VRS estimator 211, a VRS corrections generator 213, and a VRS message generator 215. VRS estimator 211 implements a VRS estimation algorithm that estimates the parameters required to construct the correlated errors in the VRS observables. According to one embodiment, the VRS estimation algorithm utilized by VRS estimator 211 is an implementation of the FAMCAR algorithm described in Ulrich Vollath, *The Factorized Multi-Carrier Ambiguity Resolution (FAMCAR) Approach for Efficient Carrier Phase Ambiguity Estimation*, Proceedings of ION GNSS 2004, Long Beach Calif., 21-24 Sep., 2004 (hereinafter "Vollath [2004]"). VRS corrections generator 213 inputs the estimated parameters, in the form of an output data set received from VRS estimator 211, and implements a VRS corrections data generation algorithm that computes the synthetic observables at the VRS position. In one embodiment, the VRS position is chosen to be at or near the rover station 105 position estimate (e.g., the first position estimate) that is provided as an input and the atmospheric error model. These synthetic observables form VRS corrections 240.

In one example of the FAMCAR method, decentralized estimation of carrier-phase ambiguities employs a geometry filter which processes a minimum-error carrier-phase combination to estimate a single (combined) ambiguity term for each satellite, plus position states for the receiver. The geometry filter is a classical float solution using the minimum-error carrier-phase combination. The float solution can include a state for tropospheric residual error modeling. This is a well-known standard technique for high precision satellite navigation system positioning using ambiguity resolution. The float solution can be formulated in single or double differences. In the former case, the double difference operator is applied before passing the results on to the combination operation. In embodiments of the invention, modeling of the correlated errors in the minimum-error carrier-phase combination is done by the state augmentation technique or, in the absence of significant noise, by the whitening-of-noise technique.

A bank of ionosphere filters are used to estimate the ionospheric bias on the satellite signals using a minimum-error ionospheric carrier-phase combination.

At least one bank of Quintessence filters is used to process a geometry-free and ionosphere-free carrier-phase combination to estimate carrier-phase ambiguities directly. The number of Quintessence filter banks is two less than the number n of carrier frequencies of the GNSS signal data set, as two combinations are used by the geometry filter and the ionosphere-filter bank. For example, a single bank of Quintessence filters is provided for a GNSS system having three carrier frequencies, and two banks of Quintessence filters are provided for a GNSS system having four carrier frequencies. At least one combined code filter bank is provided; if desired, a plurality of code filter banks may be provided up to the number n of carrier frequencies of the GNSS signal data set. For example, any number from one to three code filter banks is provided for a GNSS system having three carrier frequencies, and any number from one to four code filter banks is provided for a GNSS system having four carrier frequencies.

One or more banks of code filters, up to one bank for each code band, are used to process phase combinations formed such that their ionospheric bias is equal to or near to that of the code.

In one example, geometry-free filters are used for the ionosphere, Quintessence and code filter banks. They implement estimating the ambiguity of a given geometry-free observable combination accounting for uncorrelated noise and correlated noise with a given correlation time. A geometry-free filter may be implemented as a Kalman filter with two states. The first state is the ambiguity state to be estimated. The second state models the time-correlated error component with an exponential time-correlation (Gauss-Markov (1) process). Geometry-free filters are implemented as banks of ns filters, one filter per satellite tracked.

The result of a geometry-free filter is determined by differencing to a specified reference satellite, usually highest elevation or lowest error. See discussion of reference satellite above. The choice of reference satellite does not influence the results. The results are given as double differences to the chosen reference satellite. Geometry-free filters are implemented as banks of ns filters, one filter per satellite tracked.

When multiple reference stations are processed at once, the most computationally-efficient approach is to implement a separate block of filters for each reference station. That is, a geometry filter, an ionosphere filter bank, one or more Quintessence filter banks, and one or more code filter banks . . . . Code filter banks may be duplicated for each of a multiplicity of reference stations if desired for computational efficiency. The output from the bank of filters is combined, in a minimum error sense, whenever estimates of the carrier phase ambiguities are required. Normally this would be done every measurement update epoch (say once per second), but if the processing platform has limited throughput, a slower update range can be used to propagate the filters and perform the combination. When multiple reference stations are involved, each reference station data stream can be multiplexed into the estimator to help reduce the computational load.

In operation, a GNSS signal data set is a set of observations obtained by receiving signals of multiple satellites at a receiver. The data set is supplied to an element which prepares the data for filtering, and the resulting prepared data is then supplied to an element which applies a fully-factorized carrier-ambiguity-resolution (CAR) filter to the prepared data.

The result of applying filter element to the prepared data is an array of ambiguity estimates for all carrier-phase observations and associated statistical information for all transmitters (e.g. for all observed GNSS satellites and/or pseudolites). The array of ambiguity estimates produced by the sub-filters are supplied to a combiner which provides a combined array of ambiguity estimates for all carrier phase observations with associated statistical information. The combined array is then supplied to an element for position computation of the position of a rover for the time of the observations. This can be performed by, for example, applying an integer least squares process to the array of ambiguity estimates and applying a validation process.

In some embodiments, VRS message generator 215 takes the synthetic observables (VRS corrections 240) as an input and formats some portion, or all of them, into a transmittable extended-lifetime correction 152 message, or messages, which can be transmitted, for example, to rover station 105. Such formatting may include encoding and/or compressing the VRS corrections 240. In some embodiments, VRS message generator 215 or its functionality can be implemented separately from corrections processor 121 and/or master reference station 120.

According to one embodiment, therefore, in order to avoid or mitigate the negative effects of an interruption of correction data, an error data transmitter 230 is provided that prepares information on the error sources, including a satellite clock drift associated with each of the positioning satellites 101, and transmits the error data 235 on the satellite clock drifts to the rover station 105, in addition to the VRS corrections 240, as extended-lifetime correction 152. More specifically, error data 235 comprises data on error sources which can diminish the precision of determining the position of rover station 105. Upon analyzing the influences of the respective error sources, i.e. satellite clock drifts, orbit errors and tropospheric errors that usually are corrected on the basis of the broadcast correction data from the master reference station 120, it can be noted that the satellite clock drift accounts for a large portion of the associated positioning error during an interruption of correction data from master reference station 120. During an interruption of correction data, orbit errors and troposphere based errors also contribute to positioning errors, but to a lesser degree.

It is noted that in one embodiment, extended-lifetime correction 152 may be conveyed to rover station 101 using one or more messages. In other words, in one embodiment, extended-lifetime correction 152 comprises VRS corrections 240 which are applied to the estimated position of rover station 105 as well as the error data (e.g., 235) used to extrapolate future corrections to the position of rover station 105. In another embodiment, the VRS correction 240 is sent in a first message and the error data 235 is sent in another message. The satellite clock drifts of the clocks at the positioning satellites may be specified in terms of two absolute time measurements per clock, in terms of a time difference or deviation per clock, or the clock drifts may be specified otherwise.

The error data 235 conveyed in extended-lifetime correction 152 enables the rover station 105 to explicitly obtain the individual satellite clock drifts and thus enables the rover station 105 to appropriately correct the positioning determination results at the rover station 105 in the absence of correction data for a second instance of time. In other words, with the exact amount of satellite clock error known at the rover station 105, the determination results of a position based on positioning signals from the plurality of satellites 101 at a second instance of time (in the absence of correction data for the second instance of time) can be corrected on the basis of the known satellite clock errors. For example, for the correction process information on the satellite clock difference between a first instance in time and a second instance in time can be used.

Thus, the error data 235 for a current point in time, e.g. specifying the needed clock difference between the previous instance in time and a current instance in time, can be used together with the positioning signals of the current point in time and, as the correction data is unavailable, with the correction data from a previous point in time were the correction data was still available.

More precisely, the error data 235 can be used to estimate the corrected data for the current point in time and the corrected data can be used for the positioning determination. Alternatively, the error data 235 can be used to correct the calculation of the position determined on the basis of the positioning signals, i.e. time error of the positioning signals from the positioning satellites can be corrected on the basis of the error data 235 and the corrected positioning signals together with the latest available correction data (e.g., VRS correction 240) can be used for determining a position of a current point in time with the correction data unavailable. Finally, a delta phase method may be employed, for example in an RTK positioning system, the delta phase method being used to compute a position correction vector on the basis of the error data 235 and by adding the correction vector to a last position determination result with the correction data available.

In an alternative, the error data 235 does not only include satellite clocks error data, but also information on an orbit error of each of the plurality of positioning satellites 101. As the positions of the reference stations of the reference station network 102 are exactly known, master reference station 120 may quantify an orbit error of each of the plurality of positioning satellites 101 by comparing measurement results with an expected orbit position of each of the positioning satellites 101. Information on the individual satellite orbit errors may thus be determined and included into the error data 235 transmitted from the error data transmitter 230 to the rover station 105. The orbit error may be specified in terms of Cartesian coordinates such as WGS84, or in terms of longitude, latitude and altitude, e.g. as a corresponding difference vector or in any other coordinate system, or any other form.

Additionally, the Earth's atmosphere, particularly the troposphere affects the propagation of radio signals from the positioning satellites 101 to the rover station 105. The error data 235 transmitted from the master reference station 120 to rover station 105 may thus additionally include error data on the error introduced by the Earth's troposphere. Again, as the positions of the reference stations of reference station network 102 are exactly known, this error can also be quantified at the reference stations, e.g. as an additional delay for signals from the positioning satellites, or as a position error introduced by this delay, e.g. in terms of longitude, latitude and altitude or any other quantity. It is noted that error data regarding other atmosphere induced errors, such as ionosphere induced error, may also be conveyed to rover station 105 by master reference station 120.

Accordingly, rover station 105 obtains error data 235 at least including satellite clocks error data from the error data transmitter 230 and determines a current position of the rover station 105 on the basis of the positioning signals from the plurality of positioning satellites 101 at the current point in time, the latest available correction data (e.g., 240), and the satellite clocks error data 235 of the current point in time or other error data of the current point in time.

The above described embodiment enables an accurate positioning estimation in the absence of correction data normally received from master reference station 120 or reference station network 102, by estimating the position of rover station 105 on the basis of the positioning signals received from the plurality of satellites 101, VRS corrections 240, and error data 235 received from an error data transmitter 230, at least including satellite clocks error data.

Example VRS Corrections Data Algorithm

VRS corrections generator 213 employs a VRS corrections data algorithm to generate observables for an initial position estimate, such as a position estimate (e.g. the first position estimate) determined by rover station 105. The VRS corrections data algorithm employed by VRS corrections generator 213 can be an implementation of one of several different ambiguity resolution algorithms that have been described in public domain publications. For example, in one embodiment, the VRS corrections data algorithm employed by VRS corrections generator 213 is an implementation of the LAMBDA algorithm described in P. Teunisson, *The Least-Squares Ambiguity Decorrelation Adjustment*, Journal of Geodesy 70, 1-2, 1995, and generates integer least-squares estimates of the ambiguities.

Figure 3:
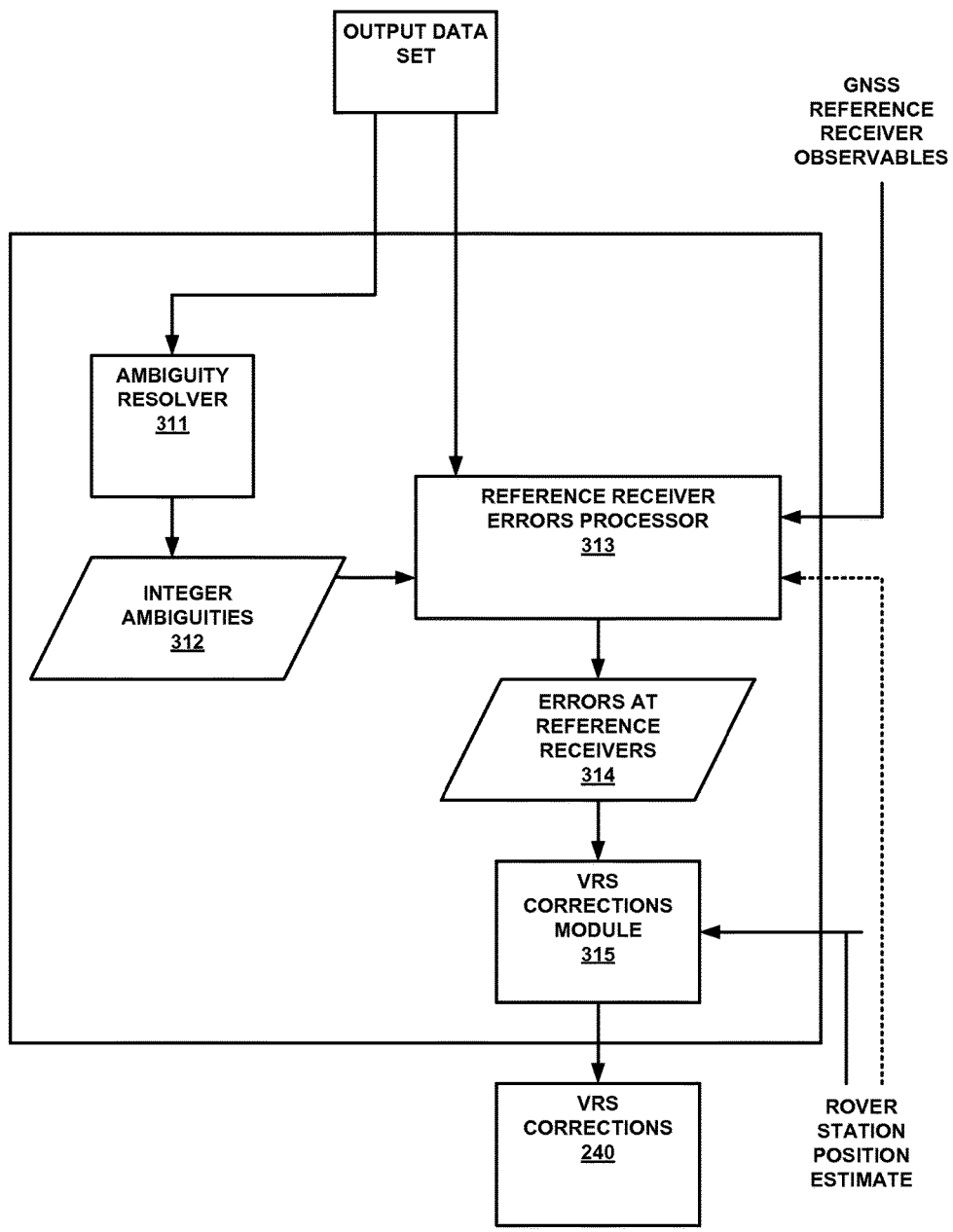
FIG. 3 shows an example VRS corrections data algorithm, used by a VRS corrections generator in accordance with one embodiment.

With reference to FIG. 3, an example VRS corrections data algorithm, used by VRS corrections generator 213 in one embodiment, will now be described. It is appreciated that in some embodiments variations to this example algorithm or the presented example equations are possible and that other and/or additional algorithms using different or additional inputs or other equations may be used. The algorithm operates on the observables data of the output data set of VRS estimator 211. The floated ambiguities plus estimation statistics generated by the Kalman filter are directed to the ambiguity resolution module 311. The fixed integer ambiguities 312 along with the observables from the N reference receivers and the previously generated parameters of output data set of VRS estimator 211 are provided to reference receiver errors processor 313, which combines these inputs to compute the ionosphere and troposphere signal delay errors 314 at each of the N reference receivers to the M satellites being used in the network solution. In some embodiments, reference receiver errors processor 313 also receives an initial position estimate of rover station 105 (e.g., the first position estimate) and/or associated receiver observables from rover station 105 as inputs.

VRS corrections module 315 generates the observables at the VRS position in two stages. VRS corrections module 315 first estimates the correlated atmospheric and environment errors at the position of rover station 105, which in this case is the initial position estimate (e.g. the first position estimate) of rover station 105. VRS corrections module 315 then generates pseudorange and carrier phase observables that are geometrically referenced at the VRS position and exhibit correlated atmospheric and environment errors occurring at the rover position (in this case, the approximate position of rover station 105 as represented by the initial position estimate). Either of the following two methods, or other methods, of estimation and VRS observables generation can be used.

In one embodiment, VRS corrections module 315 in FIG. 3 computes the correlated atmospheric and environment errors at the rover position using a precise VRS estimation process. This process runs the respective ionosphere filters and the geometry filter with reduced state vectors that exclude the floated ambiguity states, since these are now assumed to be known with no uncertainty. These are called the precise ionosphere filters and the precise geometry filter because they use precise carrier phase data to formulate their respective estimations.

The resulting estimated state elements provide troposphere scale factors at the N reference receiver positions at a level of accuracy consistent with a fixed integer ambiguity position solution. These are used to construct the troposphere delay error at any position in the network using a linear spatial interpolation model.

The VRS observables (VRS corrections 240) are then computed as follows. A master reference receiver R is identified from among the N reference receivers of the reference station network 102 of the region in which rover station 105 is located, typically the reference receiver that is closest to the VRS position (the initial position estimate of rover station 105). The observables comprise pseudoranges and dual-frequency carrier phases. The VRS observables used comprise the master reference receiver observables with applicable troposphere and ionosphere delay errors at the position of rover station 105.

These VRS observables have the same receiver clock offset, satellite clock errors, multipath errors and observables noises as the master reference receiver. They have the approximately same troposphere and ionosphere delay errors as the rover station 105. Consequently, single differences between rover station 105 and VRS observables will result in the approximate cancellation of applicable troposphere and ionosphere delay errors as well as exact cancellation of satellite clock errors.

In another embodiment, VRS corrections module 315 in FIG. 3 computes the correlated atmospheric and environment errors in the carrier phases at the position of rover station 105 using interpolation of the carrier phase residuals. This method is predicated on the assumption that correlated atmospheric delay errors in the double-differenced carrier phase residuals conform to an approximate linear spatial model. Double differencing effects the cancellation of common mode errors between satellites and between receivers, notably the receiver clock offsets, satellite clock offsets and orbital errors.

The VRS observables (VRS corrections 240) are then computed as follows. A master reference receiver R is identified from among the N reference receivers of the reference station network 102 of the region in which rover station 105 is located, typically the reference receiver that is closest to the VRS position (the rover station 105 position estimate). The VRS pseudoranges are then computed. The VRS corrections 240 comprise observables (or corrections to observables) which have the same receiver clock offset, satellite clock errors, multipath errors and observables noises as the master reference receiver. They have the approximately same troposphere and ionosphere delay errors as the rover station 105. Consequently, single differences between rover station 105 and VRS observables will result in the approximate cancellation of troposphere and ionosphere delay errors as well as exact cancellation of satellite clock errors.

Overview of Operation of System for Delivery of Location-Dependent Time-Specific Corrections In one embodiment, master reference station 120 generates an extended-lifetime correction 152 for a particular region and transmits that extended-lifetime correction 152 to that region at a particular time. Master reference station 120 then selects a second region, generates an extended-lifetime correction 152 for that region and transmits the extended-lifetime correction 152 to that region at a particular time. Thus, in one embodiment, master reference station 120 generates extended-lifetime corrections 152 for a plurality of regions.

Because master reference station 120 is sequentially generating corrections for a plurality of regions, it may not always be possible for master reference station 120 to generate a continuous stream of correction data. As described above, conventional systems transmit corrections on a second-by-second basis. As a result, an interruption in the data stream results in decreased precision in determining the location of a GNSS receiver as the length of interruption increases. In one embodiment, the use of extended-lifetime correction 152 facilitates using master reference station 120 to sequentially transmit correction data to GNSS receivers without the necessity of a continuous corrections data stream. In other words, master reference station 120 will send an extended-lifetime correction 152 to a first region at a particular time and then send a second extended-lifetime correction 152 to a second region at a second time. After sending extended-lifetime corrections to a plurality of regions, master reference station 120 generates a new extended-lifetime correction 152 for the first region and sends the new extended-lifetime correction 152 to that region.

It is noted that the regions served are not limited to one nation in a region. As an example, a master reference station 120 can serve multiple countries as permitted by service agreements, laws, and regulations which apply. Thus, master reference station 120 can generate extended-lifetime corrections 152 for regions of Europe, Asia, Africa, South America, Canada, the United States or other parts of North America where a network of reference data GNSS receivers (e.g., 102 of FIG. 1A) is located and which is communicatively coupled via a communication network 103. In other words, a single master reference station 120 can service a plurality of reference station regions which can extend across regional, national, or trans-national boundaries.

Figure 1D:
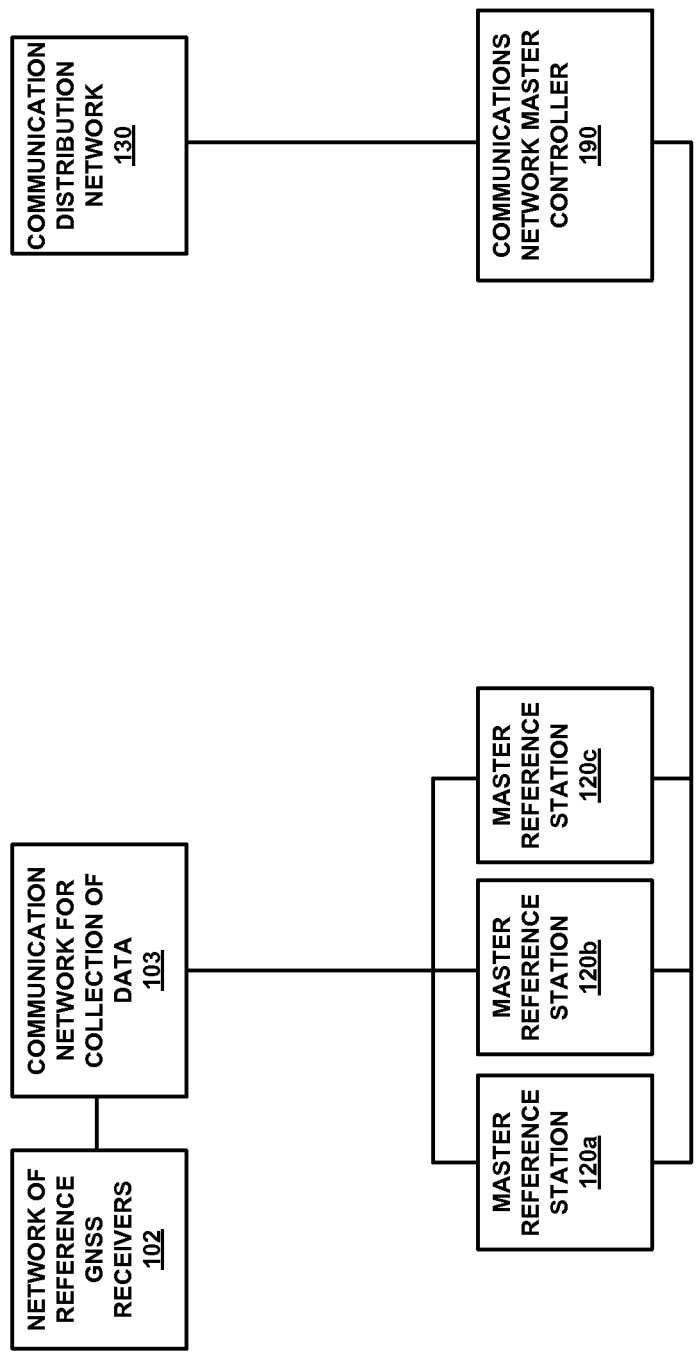
FIG. 1D is a block diagram of a system for delivery of location-dependent time-specific corrections in accordance with one embodiment.

In another embodiment, multiple master reference stations 120 can be used to deliver extended-lifetime corrections 152 for a selected reference station region. Additionally, a plurality of master reference stations 120 can be communicatively coupled in a network for providing location-dependent time-specific corrections. FIG. 1D is a block diagram of a system for delivery of location-dependent time-specific corrections in accordance with one embodiment. It is noted that components described above with reference to FIGS. 1A, 1B, and 1C are omitted from the discussion of FIG. 1D for the sake of brevity. In FIG. 1D, the network of reference data GNSS receivers 102 is communicatively coupled with communication network 103 which in turn is communicatively coupled with a plurality of master reference stations (e.g., master reference stations 120a, 120b, and 120c of FIG. 1D). Master reference stations 120a, 120b, and 120c are communicatively coupled with communications network master controller 190 which is in turn communicatively coupled with communication distribution network 130. In the embodiment of FIG. 1D, communication distribution network 130 is communicatively coupled with satellite uplink 131, cellular network 133, radio relay broadcast 134, pager network 135, and/or wireless Internet server 180. In one embodiment, the system shown in FIG. 1D can be replicated on a regional, national, or trans-national level. It is further noted that the functionality of communications network master controller 190 can be performed in a geographically distributed manner utilizing the distribution controllers 127 which respectively comprise the master reference stations 120a, 120b, and 120c.

The use of master reference stations 120a, 120b, and 120c effectively distributes the function of a single master reference station (e.g., 120 of FIG. 1A) among a plurality of master reference stations 120a, 120b, and 120c. Thus, master reference station 120a can be used to generate extended-lifetime corrections 152 for one or more reference station regions. Similarly, master reference stations 120b and 120c are used to generate extended-lifetime corrections 152 for respective assigned reference station regions. In one embodiment, each of master reference stations 120a, 120b, and 120c are separately configured with a respective message formatter 126. In another embodiment, communications network master controller 190 is configured with a message formatter 126. In one embodiment, each of master reference stations 120a, 120b, and 120c is configured to deliver its respective extended-lifetime corrections 152 to communications network master controller 190 at a specified time so that the extended-lifetime correction 152 can be conveyed to the appropriate reference station region at a selected time.

In one embodiment, communications network master controller 190 accesses a timetable (e.g., 600 of FIG. 6) to determine which communication network is to be used to convey extended-lifetime correction 152 to a selected region. Communications network master controller 190 then selectively couples the master reference station with communication distribution network 130. In one embodiment, the timetable 600 used by communications network master controller 190 comprises a column which defines the master reference station (e.g., 120a of FIG. 1D) from which an extended-lifetime correction 152 will be received for sending to an associated reference station region and optionally define the time which that extended-lifetime is to be received from that particular master reference station. This can be beneficial, for example, in situations in which the time needed to generate an extended-lifetime correction 152 exceeds the time needed to convey the extended-lifetime correction 152 to its respective reference station region. As an example, for regions in which there is a relatively greater number of reference stations used to generate GNSS observables, it will typically take longer for master reference station 120 to generate an extended-lifetime correction 152 in comparison with regions with a relatively lower number of reference stations. In other words, it may take longer to generate an extended-lifetime correction 152 than the usable lifespan of the correction. By using multiple master reference stations 120a, 120b, and 120c, each master reference station can generate extended-lifetime corrections 152 for a selected number of reference station regions in a manner which accounts for the time to process the data and generate an extended-lifetime correction. Thus, master reference station 120a can be used to generate an extended-lifetime correction 152 for a selected reference station region at a first time interval. Master reference station 120b can be used to generate a second extended-lifetime correction 152 for the same reference station region at a second time interval. Additionally, master reference station 120b can initiate generating the second extended-lifetime correction 152 while master reference station 120a is generating, or sending, the extended-lifetime correction 152 for the first time interval.

In one embodiment, the use of multiple master reference stations facilitates using the master reference station which is closest to a selected reference station region for generating extended-lifetime correction 152. For example, master reference station 120a may be located in a different country than a selected reference station region, but is closer than master reference station 120b which is located in the same country. In one embodiment, master reference station 120a can be used to generate the extended-lifetime correction 152 for the selected reference station region based upon its proximity to that selected reference station region.

During the period in which master reference station 120 is sending extended-lifetime corrections 152 to other regions, rover station(s) 105 in the first region can continue to precisely determine their location using extended-lifetime correction 152. Thus, there is less degradation in the precision of determining the location of rover station 105 when using extended-lifetime correction 152.

In one embodiment, the delivery of extended-lifetime correction 152 is in accordance with a distribution timetable which defines when an extended-lifetime correction 152 for a particular region will be delivered. In one embodiment, a rover station 105 in that region only processes the extended-lifetime correction 152 which is received at the defined time period for delivery of the extended-lifetime correction 152 for that region. In another embodiment, the extended-lifetime correction 152 for a particular region is broadcast in a manner which only permits rover station(s) 105 in that region to receive the extended-lifetime correction 152. In another embodiment, all extended-lifetime corrections 152 for all regions are broadcast in a manner which permits a rover station 105 in another region to also receive the extended-lifetime corrections 152 for other regions. However, the rover station 105 only processes the extended-lifetime correction 152 received during the time period defined for the region in which the rover station 105 is currently located.

In one embodiment, an operator can define which communication pathway to use to deliver an extended-lifetime correction 152 to a rover station 105 in a given region. For example, a default condition may be that the extended-lifetime correction 152 is conveyed to a terrestrial radio relay broadcast transmitter 170 via a cellular network 133. The terrestrial radio relay broadcast transmitter 170 then conveys the extended-lifetime correction 152 to the rover station 105 via a radio broadcast. However, the user may wish to use another method for conveying the extended-lifetime correction 152 based upon network availability, performance, or cost issues. For example, in regions in which a cellular telephone network does not exist, it may be more beneficial to use a radio relay broadcast, or to use a communication satellite, to convey extended-lifetime correction 152 directly to the rover station 105 in that region.

Figure 4A:
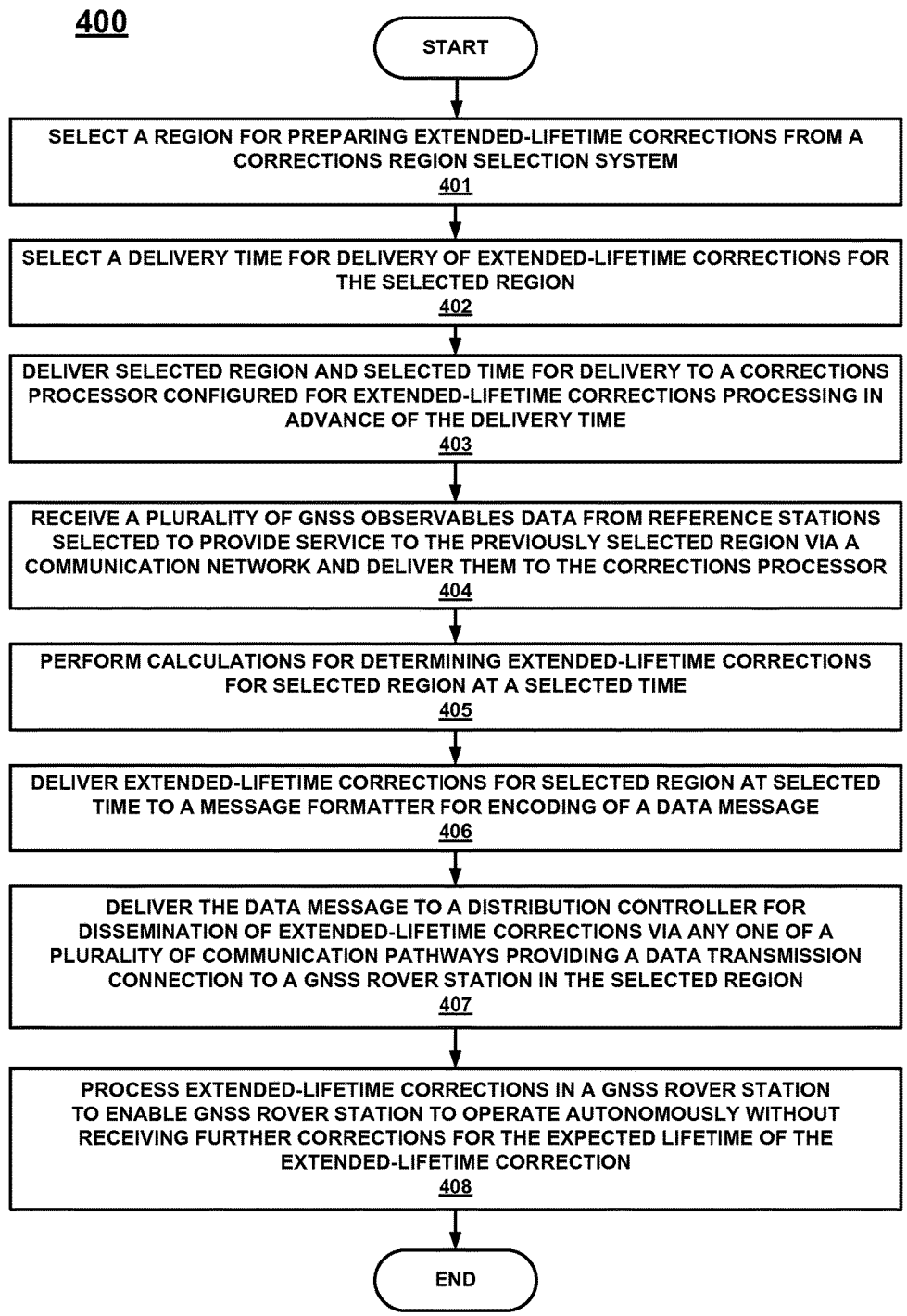
FIG. 4A is a flowchart of a method for delivery of location-dependent time-specific corrections of a rover station for determining a position in accordance with one embodiment.

FIG. 4A is a flowchart of a method 400 for delivery of location-dependent time-specific corrections of a rover station for determining a position in accordance with one embodiment. In operation 401 of FIG. 4A, a region is selected for preparing extended-lifetime corrections from a corrections region selection system. FIG. 5 shows an example spreadsheet 500 of reference regions and corresponding reference stations in accordance with one embodiment. In one embodiment, corrections region selection system 124 accesses spreadsheet 500 to determine which reference station receivers will be used to collect GNSS observables used to generate an extended-lifetime correction 152 for a selected reference station region. In FIG. 5, a plurality of reference station regions are shown in the region field 501 on the left side of the spreadsheet followed by a column 502 showing an associated region identification number. In FIG. 5, a field 503 shows a plurality of reference station identification numbers. In FIG. 5, based upon which reference station region is selected, one or more associated reference stations listed in field 503 are indicated. For example, for the Sunnyvale reference station region, reference stations 1, 2, 3, 4, 5, and 6 are selected. In other words, VRS correction data is generated by master reference station 120 based upon GNSS observables from one or more of reference stations 1-6 which are located in, or proximate to, the Sunnyvale reference station region. Similarly, the San Francisco reference station region utilizes GNSS observables from reference stations 3, 4, 5, and 6 which are located in, or proximate to, the San Francisco reference station region. It is noted that it is not required to use GNSS observable data from each reference station associated with a reference station region. Alternatively, observable data can be used from other reference stations besides those specifically associated with a given reference station region. For example, in addition to using GNSS observable data from reference stations 1-6, master reference station 120 can also utilize GNSS observable data from reference stations 7-35, or a combination thereof, to generate a VRS correction and/or extended-lifetime correction 152.

In operation 402 of FIG. 4A, a delivery time is selected for delivery of the extended-lifetime corrections for the selected region. As discussed above, a distribution timetable is used which defines when extended-lifetime correction 152 is to be sent to a particular reference station region. Referring now to FIG. 6, an example region allocation table and distribution timetable 600 for extended-lifetime correction 152 in accordance with one embodiment. In one embodiment, master reference station 120 uses timetable 600 in determining when to access GNSS observable data from a reference station region, generate an extended-lifetime correction 152 for that reference station region, and send the extended-lifetime correction 152 via a selected communication pathway for broadcast in the reference station region. More specifically, timetable 600 can be accessed by corrections region selection system 124 to determine when to prepare an extended-lifetime correction 152 for a given region. For example, if it is determined that an extended-lifetime correction 152 for a reference station region is to be delivered at the first minute after the hour, corrections region selection system can use this information to select reference receivers in that reference station region for use to generate extended-lifetime correction 152 by corrections processor 121. Additionally, communications path controller 125 can use timetable 600 to selectively couple master reference station 120 with communication distribution network 130 so that extended-lifetime correction 152 will be conveyed to rover station 105 in a manner defined by a user of system 100.

In FIG. 6, a time of 5 seconds is used for generating an extended-lifetime correction 152 for a given reference station region. Furthermore, FIG. 6 shows that it takes 5 seconds to transmit an extended-lifetime correction 152 via a selected communication pathway. Additionally, as shown in FIG. 6 it is shown that an extended-lifetime correction 152 for a given reference station region has a usable lifetime of 5 minutes. In other words, it is estimated that rover station 105 can use extended-lifetime correction 152 to autonomously determine its geographic position with an acceptable level of precision for a period of 5 minutes after receiving extended-lifetime correction 152. It is noted that the estimated lifetime of 5 minutes is for purposes of explanation and that extended-lifetime correction 152 can be generated more or less frequently as desired.

In FIG. 6, a region field 606 identifies which reference station region is receiving an extended-lifetime correction 152. A field 607 identifies the timeslot, in minutes and seconds after the hour, in which extended-lifetime correction(s) 152 for that particular reference station region are broadcast to that reference station region. For example, an extended-lifetime correction 152 is broadcast for the Sunnyvale reference station region (region ID 1) starting at the first minute after the hour. It is noted that the generation of extended-lifetime correction 152 accounts for the amount of time to process GNSS observables from reference receivers in a given reference station region, format an extended-lifetime correction 152 and convey it via a communication pathway so that the broadcast of extended-lifetime correction 152 for a given reference station region is delivered according to timetable 600.

After an extended-lifetime correction 152 is broadcast to the Sunnyvale reference station region, a subsequent extended-lifetime correction 152 is broadcast for the San Francisco reference station region beginning one minute and five seconds after the hour. In other words, because it takes 5 seconds to broadcast each extended-lifetime correction 152, the broadcast of extended-lifetime corrections 152 to other reference station regions follow at five second intervals. Master reference station 120 is configured to cycle through the list of reference station regions assigned to it and to generate extended-lifetime corrections 152 for each of these regions. As shown in FIG. 6, it takes 5 minutes to generate a corresponding extended-lifetime correction 152 for each of the regions assigned to master reference station 120 shown in FIG. 6. After generating and sending an extended-lifetime correction 152 for the Bangor, Me. reference station region, master reference station 120 again accesses the GNSS observables from the Sunnyvale reference station region and generates a new extended-lifetime correction 152 for the Sunnyvale reference station region. According to timetable 600, the new extended-lifetime correction 152 is to be broadcast at the nest time slot defined in field 608. In the example of FIG. 6, the next time slot for delivery of an extended-lifetime correction 152 for the Sunnyvale reference station region begins at the sixth minute after the hour. Again, after the 5 second transmission of an extended-lifetime correction 152 for the Sunnyvale reference station region, a new extended-lifetime correction 152 is broadcast for the San Francisco reference station region. Master reference station 120 again cycles through the timetable 600 and generates extended-lifetime corrections 152 for its assigned reference station regions.

In one embodiment, the extended-lifetime corrections 152 for a given reference station region are only broadcast in the region for which those extended-lifetime corrections 152 are intended. Thus, the extended-lifetime corrections 152 intended for the Sunnyvale reference station region are only broadcast in the Sunnyvale reference station region. In another embodiment, the extended-lifetime corrections 152 for each region are broadcast among a plurality of the reference station regions assigned to master reference station 120. As an example, the extended-lifetime corrections 152 intended for the Sunnyvale reference station region are broadcast to all of the reference station regions assigned to master reference station 120 as shown in FIG. 6.

In one embodiment, each rover station 105 is configured to access a copy (e.g., 903a of FIG. 9) of a distribution timetable (e.g., 600). The distribution timetable accessed by the rover station 105 can be stored upon rover station 105, or accessed via a wireless communication pathway. In one embodiment, upon generating an initial position fix of its location, the rover station accesses a look-up table (not shown) which defines the coordinates of the reference station regions. Upon determining the reference station region in which it is located, the rover station 105 uses distribution timetable 600 to determine which broadcast of extended-lifetime correction 152 to use. For example, a rover station 105 generates an initial position fix and determines that it is located in the Sunnyvale reference station region. The rover station 105 then accesses distribution timetable 600 and determines that an extended-lifetime correction 152 intended for the Sunnyvale reference station region is broadcast at the first minute after the hour. The rover station 105 receives the extended-lifetime correction 152. The rover station 105 then uses the extended-lifetime correction 152 to generate a more precise determination of its geographic position using the GNSS observables used to generate its initial position fix and the data conveyed in extended-lifetime correction 152. For the next five minutes until a new extended-lifetime correction 152 intended for the Sunnyvale reference station region is received, rover station 105 will use the data conveyed in extended-lifetime correction 152 to autonomously determine its geographic position.

After receiving the extended-lifetime correction 152 intended for the Sunnyvale reference station region, the rover station 105 is configured to disregard other extended-lifetime corrections 152 received in other time slots which are intended for other reference station regions. Thus, the rover station 105 disregards other extended-lifetime corrections 152 it receives until the sixth minute after the hour. Rover station 105 then uses the extended-lifetime correction 152 received at the sixth minute after the hour to generate a more precise determination of its geographic position for the next five minutes.

In another embodiment, master reference station 120 is configured to receive an initial position estimate of the geographic position of rover station 105, determine the reference station region in which rover station 105 is located, and to generate an extended-lifetime correction 152 as described above for transmission to rover station 105. Alternatively, rover station 105 can determine the reference station region in which it is located based upon an initial position fix. Rover station 105 can then convey the reference station network in which it is currently located to master reference station 120 which generates an extended-lifetime correction 152 as described above based upon the reference station region in which rover station 105 is located and convey the extended-lifetime correction 152 to rover station 105.

In operation 403 of FIG. 4A, the selected region and selected time are delivered to a corrections processor configured for extended-lifetime corrections processing in advance of the delivery time. Referring again to FIG. 6, timetable 600 has a column on the left hand side which lists a plurality of reference station regions and their corresponding region identification number. Timetable 600 also has a field 601 which indicates a calculation time of 5 seconds to generate an extended-lifetime correction 152. Field 602 of timetable 600 indicates that it takes 5 seconds to transmit the entire extended-lifetime correction 152. Field 603 of timetable 600 indicates that extended-lifetime correction 152 has a usable lifetime of 5 minutes before it should be updated with a subsequent extended-lifetime correction 152 for a given region. Field 604 of timetable 600 lists a plurality of communication pathways which can be used to convey extended-lifetime correction 152 to rover station 105. For example, the column Geo-synch identifies using a geo-synchronous communication satellite 132 to convey extended-lifetime correction 152 to a satellite communication receiver 110. As described above with reference to FIGS. 1A, 1B, and 1C, satellite communication transceiver 110 can communicatively coupled with rover station 105, terrestrial radio relay broadcast transmitter 170, and/or wireless Internet server 180 which then convey extended-lifetime correction 152 to rover station 105.

Similarly, the column titled LEO/MEO identifies using a Low Earth Orbit (LEO) or Medium Earth Orbit (MEO) communication satellite to convey extended-lifetime correction 152 to rover station 105. As described above with reference to FIGS. 1A, 1B, and 1C, LEO/MEO transceiver 111 can communicatively coupled with rover station 105, terrestrial radio relay broadcast transmitter 170, and/or wireless Internet server 180 which then convey extended-lifetime correction 152 to rover station 105.

The column titled cellular identifies using a cellular network (133) to convey extended-lifetime correction 152 to rover station 105. As described above with reference to FIGS. 1A, 1B, and 1C, cellular telephone transceiver 112 can communicatively coupled with rover station 105, terrestrial radio relay broadcast transceiver 170, and/or wireless Internet server 180 which then convey extended-lifetime correction 152 to rover station 105.

The column titled radio relay identifies using a radio relay broadcast 134 to convey extended-lifetime correction 152 to rover station 105. As described above with reference to FIG. 1A, terrestrial radio receiver 113 can be communicatively coupled with rover station 105 to convey extended-lifetime correction 152 via radio relay broadcast 134.

The column titled pager identifies using a pager network 135 to convey extended-lifetime correction 152 to rover station 105. As described above with reference to FIG. 1A, pager frequency receiver 114 can be communicatively coupled with rover station 105 to convey extended-lifetime correction 152 via pager network 135. Alternatively, pager frequency receiver 114 can be communicatively coupled with terrestrial radio relay broadcast transceiver 170 which in turn conveys extended-lifetime correction 152 to rover station 105.

As is shown in FIG. 6, a preferred communication pathway is indicated with an X in the appropriate column. In one embodiment, communications path controller 125 accesses timetable 600 to determine which communication pathway is to be used to convey extended-lifetime correction 152 to a selected reference station region. Communications path controller 125 then causes distribution controller 127 to selectively couple master reference station 120 with communication distribution network 130 in accordance with timetable 600. For example, for the Sunnyvale reference station region, the preferred communication pathway is via a cellular telephone network (e.g., 133). This can either be via a cellular telephone receiver 112 which is coupled with rover station 105, or via a cellular telephone receiver 112 which is communicatively coupled with terrestrial radio relay broadcast transceiver 170. Also shown in FIG. 6 are alternative choices for communication pathways for conveying extended-lifetime correction 152 when rover station 105 is in the Sunnyvale reference station region. Thus, the use of a geo-synchronous communication satellite, a LEO/MEO communication satellite, a radio relay broadcast, and a pager frequency network are all indicated as alternative communication pathways for the Sunnyvale reference station region. For the Redding CA reference station region, the O in the cellular column indicates that a cellular network 133 is not to be used to convey extended-lifetime correction 152 to rover station(s) 105 in the Redding reference station region. This may be due to incomplete cellular network coverage in the Redding reference station region, or some other reason which makes using cellular network 133 less desirable as a communication pathway for conveying extended-lifetime correction 152. It is noted that the indication of a preferred communication pathway as shown in FIG. 6 is meant as an illustration of one embodiment of a region allocation table. In another embodiment, a numerical ranking of the preference of communication pathways may be implemented.

Also shown in FIG. 6, is a message format field 605. Message format field 605 is for indicating the format of the VRS corrections (e.g., 240 of FIG. 2) which are sent in extended-lifetime correction 152. In one embodiment, message formatter 126 is configured to format VRS corrections 240 in a variety of message formats including, but not limited to, the Compact Measurement Report (CMR) and CMR+ formats. Message formatter 126 is also configured to format VRS corrections 240 to be compliant with the Radio Technical Commission for Maritime Services Special Committee 104 (RTCM SC-104) published standards for use in GNSS data transmission. Versions of the RTCM format usable by message formatter 126 include, but are not limited to the Differential Naystar GPS service Version 2.0, and Version 2.1, Differential GNSS version 2.2, Version 2.3, and Version 3.0, and the Ntrip Version 1.0 standards. In one embodiment, based upon an indication in message format field 605, the VRS corrections 240 of extended-lifetime correction 152 is formatted in an appropriate message format. It is noted that while in FIG. 6, only one message format is selected based upon the associated reference station region, in another embodiment a message format is selected depending upon which communication pathway is used to convey extended-lifetime correction 152.

In operation 404 of FIG. 4A, a plurality of GNSS observables data are received from reference stations selected to provide service to the previously selected region via a communication network and deliver them to the corrections processor. As described above, reference station spreadsheet 500 defines which reference stations are used to collect GNSS data for a particular reference station region. For example, when it is desired to generate an extended-lifetime correction 152 for the Sunnyvale reference station region, corrections region selection system 124 of master reference station 120 accesses spreadsheet 500 and determines which reference stations are used to generate an extended-lifetime correction 152 for the Sunnyvale reference station region. In the example of FIG. 5, reference stations 1-6 are to be used to generate extended-lifetime correction 152 for the Sunnyvale reference station region. In other words, correction region selection system 124 causes correction processor 121 to use the GNSS observable data from one or more of reference stations 1-6 to generate an extended-lifetime correction 152 for the Sunnyvale reference station region. Again, embodiments are not limited to using GNSS observable data from reference stations in a given reference station region in order to generate an extended-lifetime correction 152 for that region. Thus, master reference station can additionally use GNSS observable data from reference stations 7-35 in addition to the one or more of reference stations 1-6 in generating extended-lifetime correction 152.

In operation 405 of FIG. 4A, calculations are performed for determining extended-lifetime corrections for a selected region at a selected time. As described above with reference to FIGS. 2 and 3, corrections processor 121 of master reference station 120 generates an extended-lifetime correction 152 for a reference station region based upon the GNSS observables for at least one reference station in, or near the reference station network, or proximate to the rover station 105.

In operation 406 of FIG. 4A, the extended-lifetime corrections for the selected region at the selected time are delivered to a message formatter for encoding of a data message. As described above with reference to FIG. 6, master reference station 120 uses timetable 600 to determine which message format is to be used to convey VRS corrections 240 in extended-lifetime correction 152. For example, in FIG. 6, distribution timetable controller input system 123 accesses region allocation timetable 600 and determines from field 605 that the CMR format, or a variant thereof such as the CMR+ format, is to be used to convey VRS corrections 240 in the Sunnyvale reference station region. Again, the selection of which format is used to convey VRS corrections 240 may depend upon which region is receiving extended-lifetime correction 152, which communication pathway is used to convey extended-lifetime correction 152, or another parameter.

In operation 407 of FIG. 4A, the data message is delivered to a distribution controller for dissemination of the extended-lifetime corrections via any one of a plurality of communication pathways providing a data transmission connection to a GNSS rover station in the selected region. As described above, distribution controller 127 is configured to selectively couple master reference station 120 with communication distribution network 130 such that extended-lifetime correction 152 is conveyed to rover station 105 in accordance with timetable 600. More specifically, communications path controller 125 accesses timetable 600 and determines which communication pathway(s) are to be used to convey extended-lifetime correction 152 to rover station 105.

In operation 408 of FIG. 4A, the extended-lifetime corrections are processed in a GNSS rover station to enable the GNSS rover station to operate autonomously without receiving further corrections for the expected lifetime of the extended-lifetime correction. After extended-lifetime correction 152 has been received by rover station 105, it is used to more precisely determine the geographic coordinates of the rover station. As described above, extended-lifetime correction 152 comprises VRS corrections 240 which are used to more precisely determine the position of rover station 105. Additionally, extended-lifetime correction 152 comprises error data 235 which can be used by rover station 105 to more precisely determine its position based upon future GNSS observables received by rover station 105, VRS corrections 240, and the error data 235.

Figure 4B:
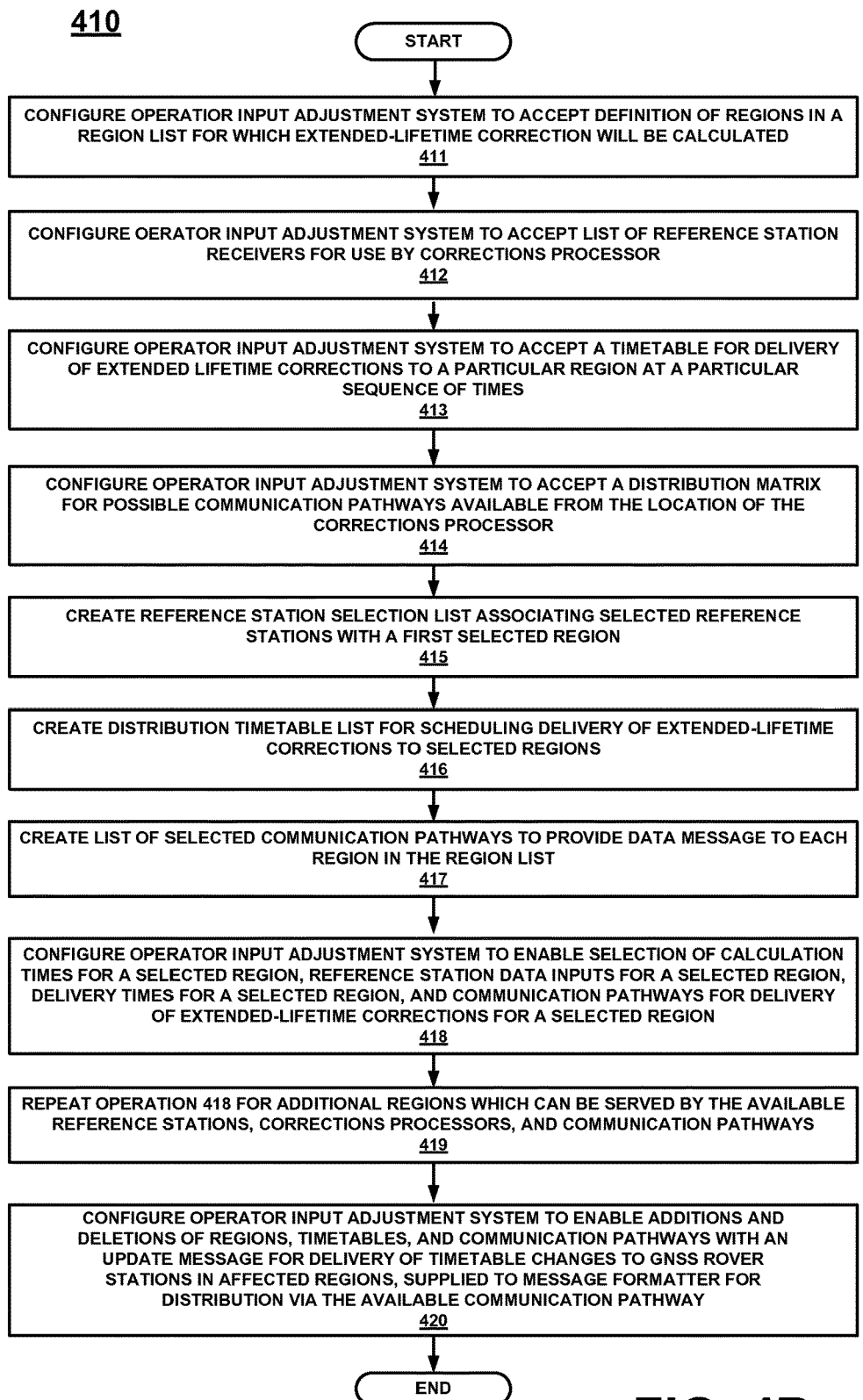
FIG. 4B is a flowchart of a method for utilizing an operator adjustment system of a master reference station in accordance with one embodiment.

FIG. 4B is a flowchart of a method 410 for utilizing an operator adjustment system of a master reference station in accordance with one embodiment. In operation 411 of FIG. 4B, an operator input adjustment system is configured to accept the definition of regions in a region list for which the extended-lifetime correction will be calculated. In one embodiment, operator input adjustment system 122 accepts a definition of regions in a region list such as spreadsheet 500 of FIG. 5. In one embodiment, the definition of reference station regions includes a description of boundaries of the reference station region. In other words, the geographic coordinates which describe a polygonal area comprising the reference station region can also be included in the description of the reference station regions. Referring again to FIG. 5, operator input adjustment system 122 accepts the spreadsheet 500 of reference regions shown in field 501. Similarly, timetable 600 of FIG. 6 shows a region field 606 which lists reference station regions for which corresponding extended-lifetime corrections 152 will be calculated.

In operation 412 of FIG. 4B, the operator input adjustment system is configured to accept a list of reference station receivers for use by the corrections processor. Referring again to FIG. 5, spreadsheet 500 comprises a listing of reference receivers (e.g., reference station IDs 1-35) and an indication of which reference stations are to be used to generate extended-lifetime correction 152. In the example of FIG. 5, reference stations 1-6 are used to collect GNSS observables which are used to generate an extended-lifetime correction 152 for the Sunnyvale reference station region. While the reference stations in, or proximate to, a reference station region are typically used to generate the extended-lifetime correction 152 for that reference station region, corrections processor 121 can be configured to use data from the other reference stations (e.g., 7-35 of FIG. 5) to generate the extended-lifetime correction 152 for the Sunnyvale reference station region.

In operation 413 of FIG. 4B, the operator input adjustment system is configured to accept a timetable for delivery of extended-lifetime corrections to a particular region at a particular sequence of times. Referring again to FIG. 6, operator input adjustment system 122 is configured to accept timetable 600 which defines the times at which an extended-lifetime correction 152 for a particular reference station region is to be delivered to that reference station region. For example, field 607 of FIG. 6 shows that the Sunnyvale reference station region is scheduled to receive a first extended-lifetime correction 152 at one minute after the hour. The Sunnyvale reference station region is then scheduled to receive a second extended-lifetime correction 152 beginning at six minutes after the hour and a third extended-lifetime correction 152 beginning at eleven minutes after the hour. It is noted that in one embodiment, operation 413 may also comprise accepting a timetable 600 which further defines which master reference station (e.g., 120a, 120b, or 120c of FIG. 1D) from which an extended-lifetime correction 152 will be received. In this instance, timetable 600 is used by a communications network master controller (e.g., 190 of FIG. 1D) to determine which reference station region will receive a given extended-lifetime correction 152 at a particular time.

In operation 414 of FIG. 4B, the operator input adjustment system is configured to accept a distribution matrix for possible communication pathways available from the location of the corrections processor. Referring again to FIG. 6, timetable 600 also defines at least one communication pathway which is to be used to convey an extended-lifetime correction 152 to a given reference station region. The communication pathways which are listed in timetable 600 are further described above with reference to FIGS. 1A, 1B, and 1C.

In operation 415 of FIG. 4B, a reference station selection list is created which associates a selected reference station with a first selected region. Referring again to FIG. 5, spreadsheet 500 defines which reference stations are used to generate an extended-lifetime correction 152 for a corresponding reference station region. For example, the Sunnyvale reference station region is associated with reference receivers 1-6, the San Francisco reference station region is associated with reference receivers 3-6, the Santa Rosa reference station region is associated with reference receivers 5-9, etc.

In operation 416 of FIG. 4B, a distribution timetable list is created for scheduling delivery of extended-lifetime corrections to selected regions. In one embodiment, in response to accepting a timetable for delivery of extended-lifetime corrections to a particular region at a particular sequence of times (e.g., operation 413 of FIG. 4B), operator input adjustment system 122 creates timetable 600 which defines when an extended-lifetime correction 152 for a particular reference station region is to be delivered to that reference station region.

In operation 417 of FIG. 4B, a list of selected communication pathways to provide a data message to each region in the region list is created. As described above, timetable 600 of FIG. 6 also comprises a definition of the communication pathway used to convey extended-lifetime correction 152 to a selected reference station region. In one embodiment, all communication pathways are open to provide redundant communication channels to a rover station 105. In another embodiment, the default communication comprises conveying extended-lifetime correction 152 via a cellular telephone network (e.g., 133 of FIG. 1B) to a terrestrial radio relay broadcast transmitter (e.g., 170 of FIG. 1B). The terrestrial radio relay broadcast transmitter then conveys extended-lifetime correction 152 to the reference station region in which a rover station 105 is located in a radio frequency broadcast. In another embodiment, a particular communication pathway can be defined as the preferred method of conveying extended-lifetime correction 152 to a reference station region. In one embodiment, a ranking of the preference of communication pathways can be created in timetable 600. This can be beneficial if an interruption of one or more of the communication pathways occurs.

In operation 418 of FIG. 4B, the operator input adjustment system is configured to enable selection of calculation times for a selected region, reference station data inputs for a selected region, delivery times for a selected region, and communication pathways for delivery of extended-lifetime corrections for a selected region. As described above, operator input adjustment system 122 is configured to enable selection of parameters for generating and delivering an extended-lifetime correction 152 to one or more reference station regions. This can include, but is not limited to, selection of calculation times for a selected region, reference station data inputs used for generating an extended-lifetime correction 152 for the selected region, delivery times for sending the extended-lifetime correction 152 to the selected region, and communication pathways used for delivery of extended-lifetime correction 152 to the selected region. Spreadsheet 500 shows the selection of reference stations 1-6 for the Sunnyvale reference station region. Again, it is noted that GNSS observables from reference stations 7-35 can also be used for generating an extended-lifetime correction 152 for the Sunnyvale reference station region. Timetable 600 of FIG. 6 shows the selection of calculation times (e.g., 5 seconds) for a selected reference station region. Thus, in order to deliver extended-lifetime correction 152 for a selected reference station region as defined in timetable 600, master reference station 120 takes into account the latency in conveying the extended-lifetime correction 152 to the selected reference station region via the selected communication pathway as well as the time to calculate the extended-lifetime correction 152. Timetable 600 also defines the communication pathway(s) used to convey the extended-lifetime correction 152 to the selected reference station region as well as the times when the extended-lifetime correction 152 is conveyed to the corresponding reference station region.

In operation 419 of FIG. 4B, operation 418 is repeated for additional regions which can be served the available reference stations, corrections processors and communication pathways. As described above, after generating an extended-lifetime correction 152 for a first reference station region, master reference station 120 is configured to generate a second extended-lifetime correction 152 for a second reference station region. Referring to FIG. 6, master reference station 120 will cycle through the list of reference station regions listed in field 606 and deliver those extended-lifetime corrections 152 to their corresponding reference station regions as defined in timeslot field 607. Thus, after generating and sending an extended-lifetime correction 152 for the Bangor, Maine reference station region, master reference station 120 will generate a new extended-lifetime correction 152 for the Sunnyvale reference station region for delivery as defined in the next time slot field 608.

In operation 420 of FIG. 4B, the operator input adjustment system is configured to enable additions and deletions of regions, timetables, and communication pathways with an update message for delivery of timetable changes to GNSS rover stations in affected regions, supplied to message formatter for distribution via the available communication pathway. In one embodiment, operator input adjustment system 122 is configured to accept the addition or deletion of reference station regions for spreadsheet 500 and/or timetable 600. For example, if a new reference station region is to be added to timetable 600 to provide additional coverage, distribution timetable controller input system 123 will generate an update (e.g., 128 of FIGS. 1A, 1B, and 1C) which is used by master reference station 120 and is distributed to rover station(s) 105 located in reference station regions served by master reference station 120. Alternatively, the time for calculating an extended-lifetime correction 152, or the usable lifetime of extended-lifetime correction 152 may change according to changing conditions with new reference stations being added, or deleted, as the case may be. Thus, it may become necessary to extend or shorten the intervals for delivery of successive extended-lifetime corrections 152 for one or more reference station regions served by master reference station 120.

In one embodiment, a timeslot is reserved for administrative messages from master reference station 120. In one embodiment, all rover stations in reference station regions served by master reference station 120 monitor this timeslot as well as the timeslots defined for receiving extended-lifetime corrections 152. In another embodiment, a special message format is used which indicates to a rover station 105 that update 128 is being broadcast, or will be broadcast, which is to be use to update the timetable 600 used by the rover station 105.

As an example, master reference station 120 can generate an administrative message with a special field which indicates to rover station(s) 105 that the data in the message is an update 128 for a timetable 600. In another embodiment, the administrative message can indicate that a second message to follow will comprise an update 128 for timetable 600. The first message may indicate a time when the update 128 will be sent to reference station regions served by master reference station 120, and/or information which identifies the data of update 128. For example, a special sequence of numbers, letters, characters, etc. may uniquely identify the update 128 to prevent using unauthorized data to update timetable 600.0.

Upon receiving update 128, rover station(s) 105 will update their copy 903*a* of timetable 600 which is stored locally. Rover station(s) 105 will then use the updated timetable 600 to determine when extended-lifetime corrections 152 which are received are intended for the reference station region in which the rover station 105 is currently located.

Figure 4C:
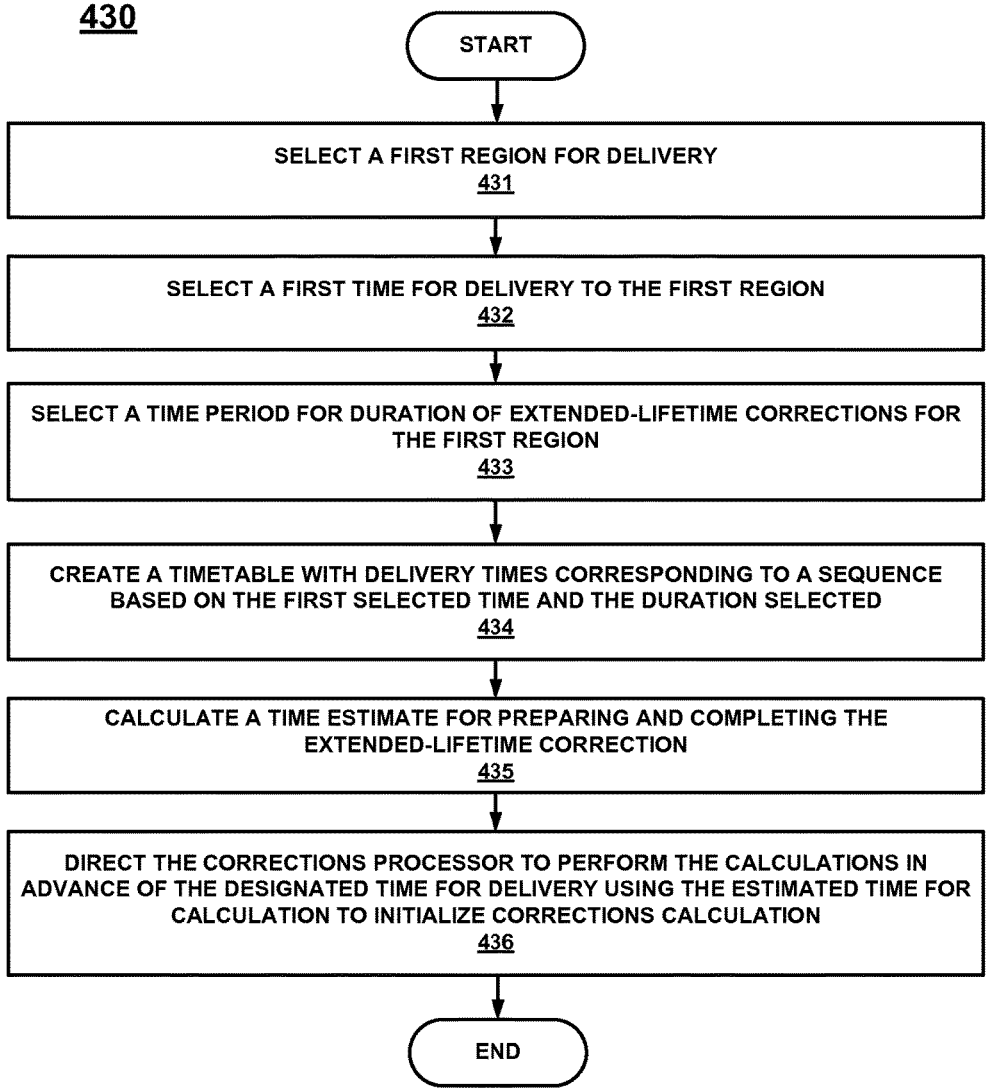
FIG. 4C is a flowchart of a method for utilizing a timetable controller input system in accordance with one embodiment.

FIG. 4C is a flowchart of a method 430 for utilizing a timetable controller input system in accordance with one embodiment. In operation 431 of FIG. 4C, a first region is selected for delivery of an extended-lifetime correction. In one embodiment, distribution timetable controller input system 123 accesses spreadsheet 500 of FIG. 5 and selects a first region for delivery of extended-lifetime correction 152. For example, after accessing spreadsheet 500, distribution timetable controller input system 123 selects the Sunnyvale reference station region for delivery of the first extended-lifetime correction 152.

In operation 432 of FIG. 4C, a first time for delivery of the extended-lifetime correction to the first region is selected. In one embodiment, distribution timetable controller input system 123 accesses timetable 600 of FIG. 6 and selects the field 607 to determine the first time for delivery of extended-lifetime correction 152 to the Sunnyvale reference station region. In the present example, the first time for delivery of extended-lifetime correction 152 to the Sunnyvale reference station region is scheduled to begin at the first minute after the hour.

In operation 433 of FIG. 4C, a time period for the duration of the extended-lifetime correction for the first region is selected. In one embodiment, distribution timetable controller input system 123 accesses timetable 600 to determine the duration (e.g., lifetime 603) of extended-lifetime correction 152. In the present example, the duration of extended-lifetime correction 152 is 5 minutes.

In operation 434 of FIG. 4C, a timetable is selected with delivery times corresponding to a sequence based on the first selected time and the selected duration. In FIG. 6, timetable 600 shows that during the 5 minute duration for which extended-lifetime correction 152 is usable in the Sunnyvale reference station region, additional extended-lifetime corrections 152 will be generated and sent to additional reference station regions by master reference station 120. After delivering these extended-lifetime corrections 152 to their corresponding reference station regions, distribution timetable controller input system 123 then accesses the field (e.g., 608) which defined the next time slot(s) for delivery of extended-lifetime corrections 152 to corresponding reference station regions. In the present example, the next extended-lifetime correction 152 to be delivered to the Sunnyvale reference station region is scheduled to be delivered beginning at the sixth minute after the hour. In other words, based upon the 5 minute duration for the lifetime of extended-lifetime correction 152, a new extended-lifetime correction 152 is scheduled to be delivered to the Sunnyvale reference station region 5 minutes after the delivery of the first extended-lifetime correction 152 is initiated.

In operation 435 of FIG. 4C, a time estimate for preparing and completing the extended-lifetime correction is calculated. In one embodiment, the amount of time needed for generating an extended-lifetime correction 152 for a selected reference station region, as well as the time needed to convey the extended-lifetime correction 152 to the selected reference station region, are calculated. This facilitates generating extended-lifetime correction 152 far enough in advance so that it can be conveyed to the selected region in accordance with timetable 600 which defines when the extended-lifetime correction 152 is to be delivered. In other words, master reference station 120 is configured to generate extended-lifetime correction 152 such that it is delivered to a selected reference station region in accordance with timetable 600. In one embodiment, master reference station 120 can be configured to monitor how long it takes to generate an extended-lifetime correction 152 for each reference station region assigned to it. Additionally, master reference station 120 can be configured to monitor the time required to deliver extended-lifetime correction 152 to a reference station region based upon the corresponding communication pathway used to convey extended-lifetime correction 152 to the reference station region.

In operation 436 of FIG. 4C, a corrections processor is directed to perform the calculations of an extended-lifetime correction in advance of the designated time for delivery using the estimated time for calculation to initialize corrections calculation. As a result of operation 435, master reference station 120 determines when to begin generating extended-lifetime correction 152 such that it can be delivered to its corresponding reference station region in accordance with timetable 600. As an example, timetable 600 of FIG. 6 shows a calculation time of 5 seconds to generate extended-lifetime correction 152 for the Sunnyvale reference station region. If it is determined that it takes 3 seconds to convey extended-lifetime correction 152 to the Sunnyvale reference station region via the selected communication pathway (e.g., via a cellular telephone network), then master reference station 120 will begin calculating extended-lifetime correction 152 at least 8 seconds prior to the time extended-lifetime correction 152 is scheduled to begin delivery to the Sunnyvale reference station region. Thus, in order to deliver the extended-lifetime correction 152 at the first minute after the hour, master reference station 120 will initiate generating extended-lifetime correction 152 at least 8 seconds prior to that time, or 52 seconds after the hour.

FIG. 7 is a comparison showing how many reference station regions can be served by master reference station 120 based upon the duration of extended-lifetime correction 152 (e.g., corrections lifetime) and the time it takes to deliver extended-lifetime correction 152 (e.g., the message length in seconds for extended-lifetime correction 152). For example, based upon a corrections lifetime of 60 seconds, and a delivery time of 5 seconds, master reference station 120 can serve 12 reference station regions before it begins generating a new sequence of extended-lifetime corrections 152 for the reference station regions it serves. Based upon a corrections lifetime of 600 seconds, and a delivery time of 2 seconds, master reference station 120 can serve 300 reference station regions before it begins generating a new sequence of extended-lifetime corrections 152 for the reference station regions it serves.

Example Terrestrial Radio Relay Broadcast Transmitter

Figure 8:
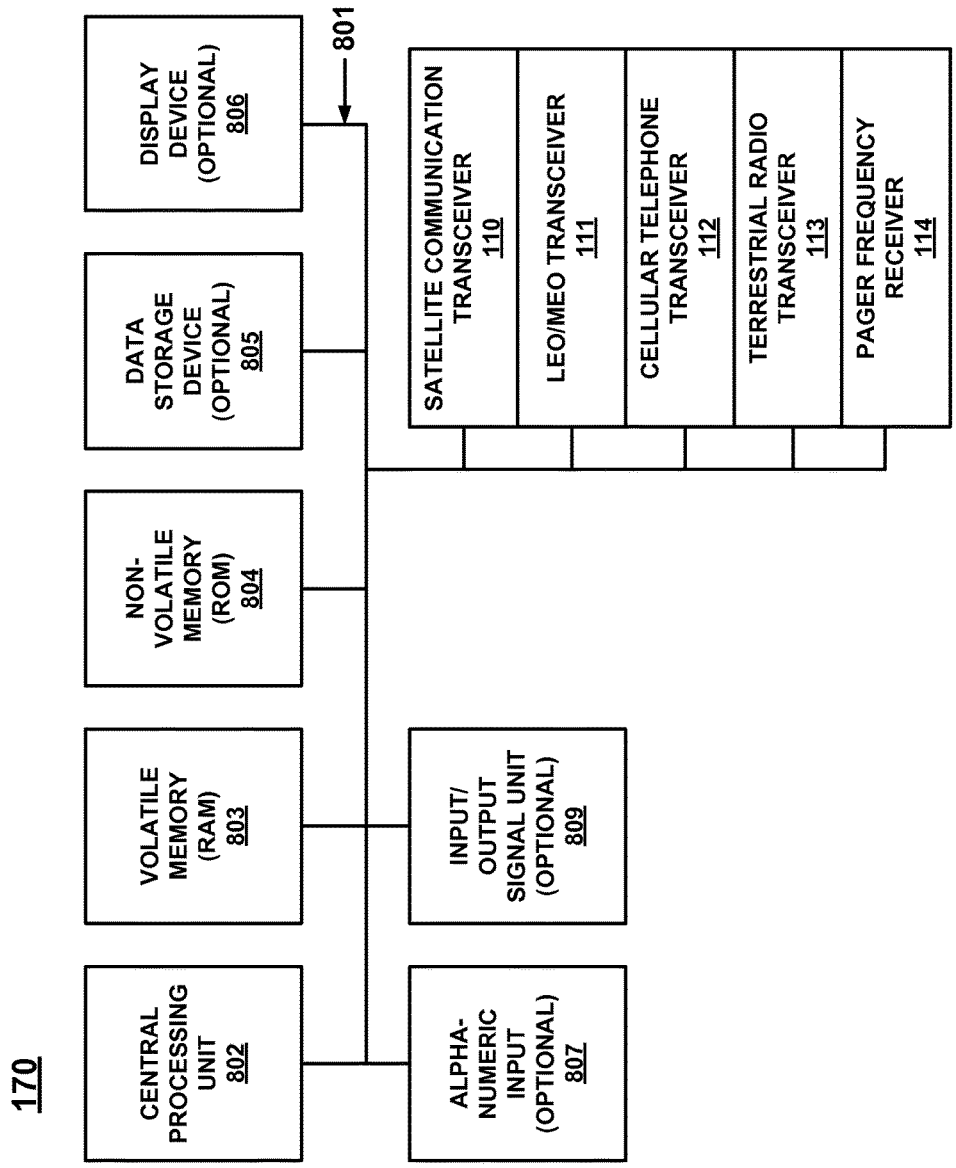
FIG. 8 is a block diagram of an example terrestrial radio relay broadcast transmitter in accordance with one embodiment.

With reference to FIG. 8, an example terrestrial radio relay broadcast transmitter 170 is shown in accordance with one embodiment. It is appreciated that terrestrial radio relay broadcast transmitter 170 of FIG. 8 is intended as an example and that embodiments can operate using a variety of the components discussed below.

In the present embodiment, terrestrial radio relay broadcast transmitter 170 includes an address/data bus 801 for conveying digital information between the various components, a central processor unit (CPU) 802 for processing the digital information and instructions, a volatile main memory 803 comprised of volatile random access memory (RAM) for storing the digital information and instructions, and a non-volatile read only memory (ROM) 804 for storing information and instructions of a more permanent nature. In addition, terrestrial radio relay broadcast transmitter 170 may also include a data storage device 805 (e.g., a magnetic, optical, floppy, or tape drive or the like) for storing vast amounts of data. It should be noted that the software program for performing operations associated with terrestrial radio relay broadcast transmitter 170 can be stored either in volatile memory 803, data storage device 805, or in another data storage device (not shown).

Devices which are optionally coupled to terrestrial radio relay broadcast transmitter 170 include a display device 806 for displaying information to a computer user and an alpha-numeric input device 807 (e.g., a keyboard), for inputting data, selections, updates, etc. Terrestrial radio relay broadcast transmitter 170 can also include mechanisms for emitting an audible signal and/or a cursor control device (not shown).

Returning still to FIG. 8, optional display device 806 of FIG. 8 may be a liquid crystal device, cathode ray tube, or other display device suitable for creating graphic images and alpha-numeric characters recognizable to a user. It will be appreciated that a cursor can be directed and/or activated via input from alpha-numeric input 807 using special keys and key sequence commands. Alternatively, the cursor may be directed and/or activated via input from a number of specially adapted cursor directing devices.

Furthermore, terrestrial radio relay broadcast transmitter 170 can include an input/output (I/O) signal unit (e.g., interface) 809 for interfacing with a peripheral device 810 (e.g., a computer network, modem, mass storage device, communication distribution network 130, etc.).

Also shown in FIG. 8 is a plurality of wireless communication transceivers. In various embodiments, terrestrial radio relay broadcast transmitter 170 comprises one or more of the wireless communication transceivers shown in FIG. 8 to receive extended-lifetime correction 152. In FIG. 8, rover station comprises a satellite communication transceiver 110, a LEO/MEO transceiver 111, a cellular telephone transceiver 112, a terrestrial radio transceiver 113, and a pager frequency receiver 114. It is appreciated that embodiments may use a variety of combinations of the wireless communication transceivers which are described in greater detail above with reference to FIG. 1A.

In one embodiment, terrestrial radio relay broadcast transmitter 170 receives extended-lifetime correction 152 via one or more of the wireless communication transceivers described above and re-transmits extended-lifetime correction 152 to rover station 105 using terrestrial radio transceiver 113. Alternatively, input/output signal unit 809 can receive extended-lifetime correction 152 via wired communication pathway such as wired communication link 166 shown in FIG. 1C. It is noted that terrestrial radio relay broadcast transmitter 170 can be configured to receive extended-lifetime correction 152 via any of the wireless transceivers described above, or input/output signal unit 809, and re-transmit extended-lifetime correction 152 via any combination of the wireless transceivers described above.

Example Rover Station

Figure 9:
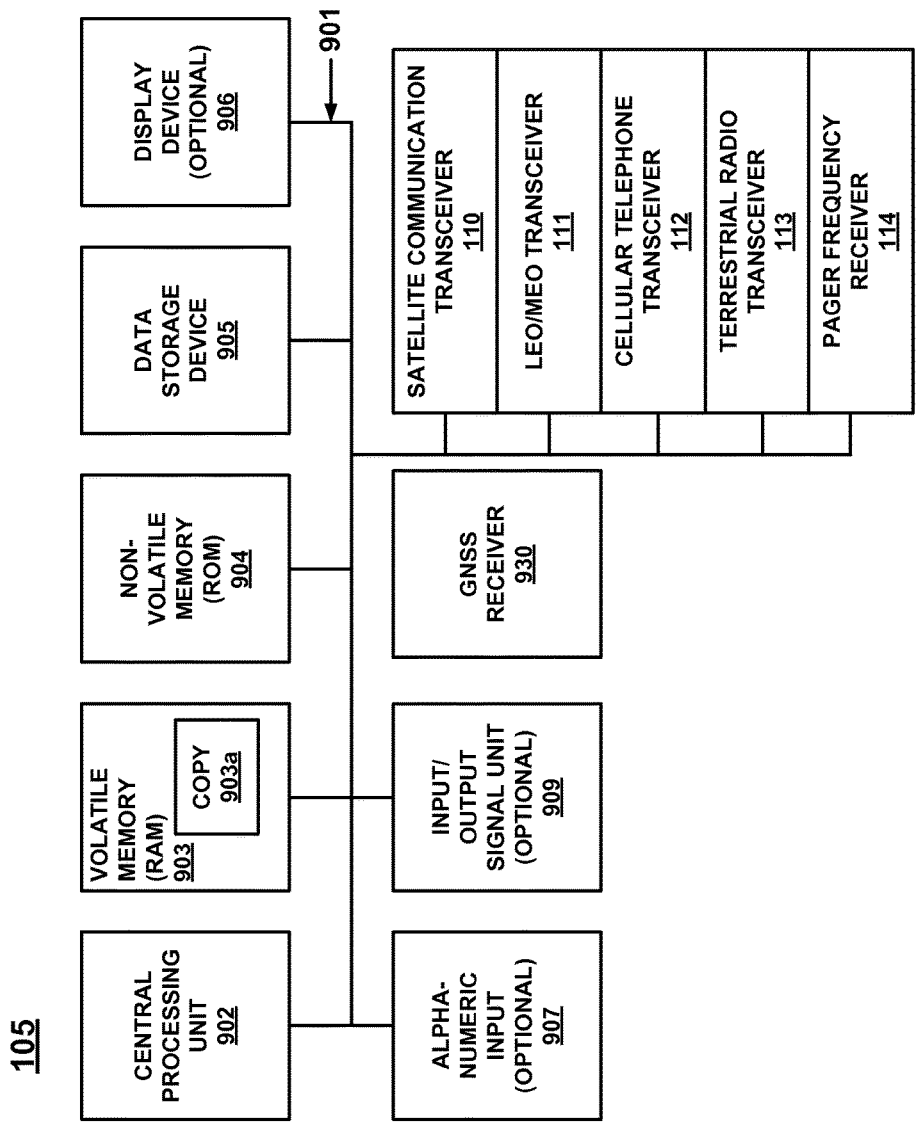
FIG. 9 is a block diagram on an example rover station in accordance with one embodiment.

FIG. 9 illustrates elements of a rover station 105 for determining a position on the basis of a plurality of positioning satellites in accordance with one embodiment. The rover station 105 may be employed as shown in FIG. 1, however, is not limited thereto.

It is appreciated that rover station 105 of FIG. 9 is intended as an example and that embodiments can operate within a number of different systems including, but not limited to, a mobile unit, a hand held device or a positioning unit installed in a vehicle, such as a tractor for agricultural applications, vehicles on a construction site, vehicles, ships, airplanes, or any other vessels, a surveying device, data collector, or the like.

In the present embodiment, rover station 105 includes an address/data bus 901 for conveying digital information between the various components, a central processor unit (CPU) 902 for processing the digital information and instructions, a volatile main memory 903 comprised of volatile random access memory (RAM) for storing the digital information and instructions, and a non-volatile read only memory (ROM) 904 for storing information and instructions of a more permanent nature. In addition, rover station 105 may also include a data storage device 905 (e.g., a magnetic, optical, floppy, or tape drive or the like) for storing vast amounts of data. It should be noted that the timetable 600 of FIG. 6 can be stored either in volatile memory 903, data storage device 905, or in another data storage device (not shown). Additionally, timetable 600 can be accessed via a wireless communication device (e.g., 110, 111, 112, 113, and/or 114) and/or input output signal unit (e.g., 909).

Devices which optionally comprise rover station 105 include a display device 906 for displaying information to a computer user and an alpha-numeric input device 907 e.g., a keyboard for inputting data, selections, updates, etc. Rover station 105 can also include mechanisms for emitting an audible signal and/or a cursor control device (not shown).

Returning still to FIG. 9, optional display device 906 of FIG. 9 may be a liquid crystal device, cathode ray tube, or other display device suitable for creating graphic images and alpha-numeric characters recognizable to a user. It will be appreciated that a cursor can be directed and/or activated via input from alpha-numeric input 907 using special keys and key sequence commands. Alternatively, the cursor may be directed and/or activated via input from a number of specially adapted cursor directing devices.

Furthermore, rover station 105 can include an input/output (I/O) signal unit (e.g., interface) 909 for interfacing with a peripheral device (not shown) e.g., a computer network, modem, mass storage device, etc. Accordingly, rover station 105 may be coupled in a network, such as a client/server environment, whereby a number of clients (e.g., personal computers, workstations, portable computers, minicomputers, terminals, etc.) are used to exchange data with rover station 105. One example of a typical I/O device as just described with reference to interface 909 is commercially available from Trimble Navigation Limited, as the TSC2 handheld survey or construction controller.

In FIG. 9, rover station 105 further comprises a GNSS receiver 930 for receiving satellite position signals 150 from positioning satellites 101. An example GNSS receiver 930 is discussed in greater detail below with reference to FIG. 10.

Also shown in FIG. 9 is a plurality of wireless communication transceivers. In various embodiments, rover station 105 comprises one or more of the wireless communication transceivers shown in FIG. 9 to receive extended-lifetime correction 152. In FIG. 9, rover station comprises a satellite communication transceiver 110, a LEO/MEO transceiver 111, a cellular telephone transceiver 112, a terrestrial radio transceiver 113, and a pager frequency receiver 114. It is appreciated that embodiments may use a variety of combinations of the wireless communication transceivers which are described in greater detail above with reference to FIG. 1A. Furthermore, while the present example specifically describes the use of wireless transceivers, embodiments may also use wireless communication receivers in some instances.

The rover station 105 performs a determination of a position of the rover station 105 on the basis of the positioning signals from the positioning satellites, such as the positioning signals 150 of FIG. 1A, and on the basis of extended-lifetime correction 152. The position determination is performed on the basis of a set or epoch of positioning signals 150 from the satellites 101, accompanied by corresponding correction data for the epoch of positioning signals. As the above discussed error sources are time variant, the correction data should, in view of the desired high accuracy, be used for the associated epoch of positioning signals. Typically, if the correction data is used for example at a later instance in time for a later received epoch positioning signals, the accuracy of the positioning determination deteriorates.

Rover station 105 is configured to perform a position determination in the absence of a continuous data stream of correction data. In the case of the unavailability of correction data associated with positioning signals received at a certain instance in time, i.e. a certain epoch of positioning signals, the rover station 105 uses error data 235 of extended-lifetime correction 152 (e.g. specifying satellite clock time drifts or time differences). For example, the error data 235 are configured such that the rover station 105 is enabled to determine the time errors at the needed instances in time. For example, the error data 235 may explicitly specify a precise clock at least one instance in time, clock errors at the instance in time or corrections of broadcast clocks in view of the precise satellite clock errors. In an alternative, the error information includes time deviations between two instances in time, so that the sum of all deviations between consecutive instances in time starting from a reference point in time with the absolute error known allows determination of the error at a current instance in time.

In one embodiment, rover station 105 performs a determination of a position of the rover station 105 on the basis of positioning signals from the positioning satellites 150 at the current instance in time, and the previously received extended-lifetime correction 152 (e.g., VRS correction 240 previously received at the previous instance in time, and at least on the basis of the error data 235 received at the previous instance in time, such as information on clock errors at the previous instance in time). It is noted that rover station 105 is not limited to using extended-lifetime corrections 152 alone. In one embodiment, rover station 105 can also use the conventional data stream of corrections to more precisely determine its geographic position.

More precisely, the rover station 105 uses GNSS receiver 930 to receive positioning signals for a first instance in time from each of a plurality of positioning satellites, such as the positioning satellites 101 of FIG. 1A. Additionally, the rover station 105 receives correction data from at least one reference station for the first instance in time and determines a position of the rover station 105 for the first instance in time based on the positioning signals 150 and the VRS corrections 240 received in extended-lifetime correction 152.

The rover station 105 is configured to receive and process error data 235 specifying a corresponding satellite clock drift for each of the satellite clocks of the plurality of positioning satellites. In the absence of current correction data, the GNSS receiver 930 determines the position of the rover station 105 for a second instance in time based on positioning signals 150 for the second instance in time, the stored correction data for the first instance in time (e.g., VRS corrections 240) and the error data 235 which are conveyed in extended-lifetime correction 152. It is noted that the determination of the position of rover station 105 may be performed by processor 902 in one embodiment.

Additionally, if the error data 235 received from the error data transmitter 230 also includes error data specifying orbit errors of the plurality of positioning satellites and/or information on a troposphere induced error, the rover station 105 is also configured for correcting the position determination on the basis of the additional error data 235.

The rover station 105 may apply any other error correction as used in the art, such as means to correct a relativistic time error introduced by the orbits corresponding relative velocities of the positioning satellites with regard to the rover station 105. Additionally, an error caused by the ionosphere may be removed based on measurements in different frequencies (the L1 and L2 frequency). As the error introduced by the ionosphere is frequency dependent, a measurement on the basis of two frequencies can be used to eliminate the corresponding ionosphere error at the rover station 105.

Central processing unit 902 is configured for processing computer executable instructions for performing the position determination on the basis of code sections stored in the memory. More precisely, volatile memory 903 may store code sections that, when loaded into the processing unit, make the processing unit execute a determination of a position of the rover station 105 for a first instance in time based on the positioning signals for the first instance in time and the VRS corrections 240 for the first instance in time, obtain for each of the satellite clocks error data specifying a satellite clock drift, and to determine the position of the rover station 105 for a second instance in time based on positioning signals for the second instance in time, the VRS corrections 240 for the first instance in time and the satellite clocks error data 235 conveyed in extended-lifetime correction 152. Alternatively, the above operations may at least be integrated as hardware circuitry, such as by ASICs.

As shown in FIG. 9, rover station 105 includes a copy 903a of timetable 600 which is described above with reference to FIG. 6. It is noted that a copy 903a of timetable 600 may be stored in a non-volatile memory location of rover station 105, with a removable data storage device, downloaded from, for example, a wireless Internet connection or wired data connection. In one embodiment, timetable 600 specifies at least one defined time interval in which rover station 105 receives extended-lifetime correction 152 from master reference station 120. It is further noted that an abstract of timetable 600 may be stored on rover station 105 which, for example, lists the times at which an extended-lifetime correction 152 is scheduled for delivery to the reference station region in which rover station 105 is located.

Example GNSS Receiver

Figure 10:
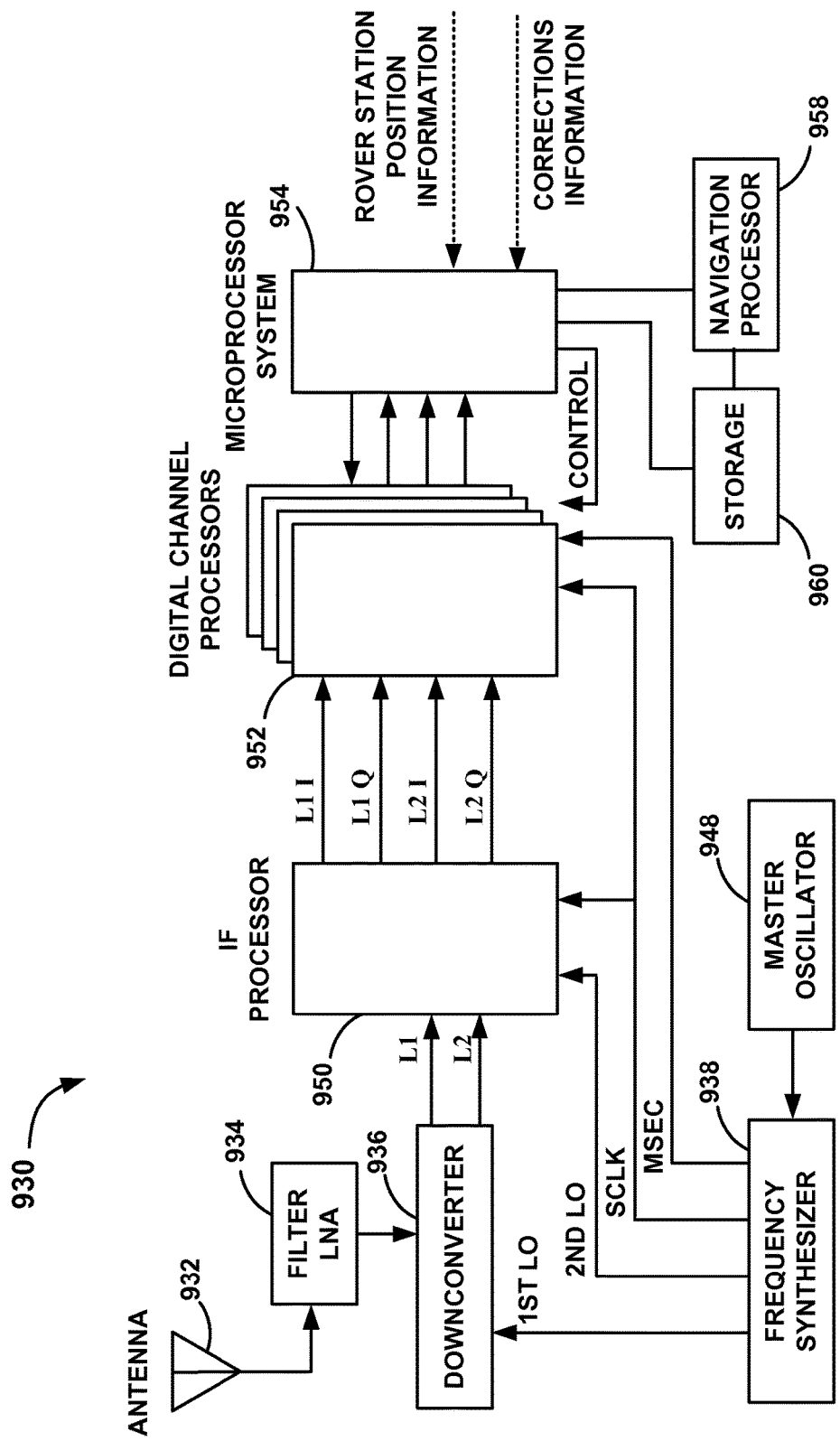
FIG. 10 is a block diagram of an example GNSS receiver which may be used in accordance with one embodiment

With reference now to FIG. 10, a block diagram is shown of an embodiment of an example GNSS receiver which may be used in accordance with various embodiments described herein. In particular, FIG. 10 illustrates a block diagram of a GNSS receiver in the form of a general purpose GPS receiver 1030 capable of demodulation of the L1 and/or L2 signal(s) received from one or more GPS satellites. A more detailed discussion of the function of a receiver such as GPS receiver 930 can be found in U.S. Pat. No. 5,621,426. U.S. Pat. No. 5,621,426, by Gary R. Lennen, is titled "Optimized processing of signals for enhanced cross-correlation in a satellite positioning system receiver," and includes a GPS receiver very similar to GPS receiver 930 of FIG. 10. In FIG. 10, received L1 and L2 signals are generated by at least one GPS satellite (e.g., 101 of FIG. 1). Each GPS satellite generates different signal L1 and L2 signals and they are processed by different digital channel processors 952 which operate in the same way as one another. FIG. 10 shows GPS signals (L1=1575.42 MHz, L2=1227.60 MHz) entering GPS receiver 930 through a dual frequency antenna 932. Antenna 932 may be a magnetically mountable model commercially available from Trimble Navigation of Sunnyvale, Calif. Master oscillator 948 provides the reference oscillator which drives all other clocks in the system. Frequency synthesizer 938 takes the output of master oscillator 948 and generates important clock and local oscillator frequencies used throughout the system. For example, in one embodiment frequency synthesizer 938 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 934 performs filtering and low noise amplification of both L1 and L2 signals. The noise figure of GPS receiver 930 is dictated by the performance of the filter/LNA combination. The downconvertor 936 mixes both L1 and L2 signals in frequency down to approximately 175 MHz and outputs the analogue L1 and L2 signals into an IF (intermediate frequency) processor 950. IF processor 950 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 952 inputs the digitally sampled L1 and L2 inphase and quadrature signals. All digital channel processors 952 are typically are identical by design and typically operate on identical input samples. Each digital channel processor 952 is designed to digitally track the L1 and L2 signals produced by one satellite by tracking code and carrier signals and to from code and carrier phase measurements in conjunction with the microprocessor system 954. One digital channel processor 952 is capable of tracking one satellite in both L1 and L2 channels. Microprocessor system 954 is a general purpose computing device (such as central processing unit 902 of FIG. 9) which facilitates tracking and measurements processes, providing pseudorange and carrier phase measurements for a navigation processor 958. In one embodiment, microprocessor system 954 provides signals to control the operation of one or more digital channel processors 952. Navigation processor 958 performs the higher level function of combining measurements in such a way as to produce position, velocity and time information for the differential and surveying functions. Storage 960 is coupled with navigation processor 958 and microprocessor system 954. It is appreciated that storage 960 may comprise a volatile or non-volatile storage such as a RAM or ROM, or some other computer readable memory device or media. In one rover receiver embodiment, navigation processor 958 performs one or more of the methods of position correction described herein. For example, in one rover receiver embodiment, navigation processor 958 utilizes a received extended-lifetime correction 152 to refine a position determined by GPS receiver 930.

In some embodiments, such as in rover receivers, microprocessor 954 and/or navigation processor 958 receive additional inputs for use in refining position information determined by GPS receiver 930. Additionally, in some embodiments, corrections information is received and utilized. Such corrections information can include differential GPS corrections, RTK corrections, signals used by the previously referenced Enge-Talbot method; and wide area augmentation system (WAAS) corrections.

Example Computer System Environment

With reference to FIG. 11, embodiments of the present invention are comprised of computer-readable and computer-executable instructions that reside, for example, in computer system 1100 which is used as a part of a general purpose computer network (not shown). It is appreciated that computer system 1100 of FIG. 11 is intended as an example and that embodiments can operate within a number of different computer systems including general-purpose computer systems, embedded computer systems, laptop computer systems, handheld computer systems, and standalone computer systems. More specifically, computer system 1100 can be used to implement all, or some of the components described above with reference to master reference station 120.

In the present embodiment, computer system 1100 includes an address/data bus 1101 for conveying digital information between the various components, a central processor unit (CPU) 1102 for processing the digital information and instructions, a volatile main memory 1103 comprised of volatile random access memory (RAM) for storing the digital information and instructions, and a non-volatile read only memory (ROM) 1104 for storing information and instructions of a more permanent nature. In addition, computer system 1100 may also include a data storage device 1105 (e.g., a magnetic, optical, floppy, or tape drive or the like) for storing vast amounts of data. It should be noted that the software program for performing operations associated with master reference station 120 can be stored either in volatile memory 1103, data storage device 1105, or in another data storage device (not shown).

Devices which are optionally coupled to computer system 1100 include a display device 1106 for displaying information to a computer user, an alpha-numeric input device 1107 (e.g., a keyboard), and a cursor control device 1108 (e.g., mouse, trackball, light pen, etc.) for inputting data, selections, updates, etc. Computer system 1100 can also include a mechanism for emitting an audible signal (not shown).

Returning still to FIG. 11, optional display device 1106 of FIG. 11 may be a liquid crystal device, cathode ray tube, or other display device suitable for creating graphic images and alpha-numeric characters recognizable to a user. Optional cursor control device 1108 allows the computer user to dynamically signal the two dimensional movement of a visible symbol (cursor) on a display screen of display device 1106. Many implementations of cursor control device 1108 are known in the art including a trackball, mouse, touch pad, joystick, or special keys on alpha-numeric input device 1107 capable of signaling movement of a given direction or manner displacement. Alternatively, it will be appreciated that a cursor can be directed and/or activated via input from alpha-numeric input device 1107 using special keys and key sequence commands. Alternatively, the cursor may be directed and/or activated via input from a number of specially adapted cursor directing devices.

Furthermore, computer system 1100 can include an input/output (I/O) signal unit (e.g., interface) 1109 for interfacing with a peripheral device 1110 (e.g., a computer network, modem, mass storage device, communication network 103, communication distribution network 130, etc.). Accordingly, computer system 1100 may be coupled in a network, such as a client/server environment, whereby a number of clients (e.g., personal computers, workstations, portable computers, minicomputers, terminals, etc.) are used to run processes for performing desired tasks.

Figure 12:
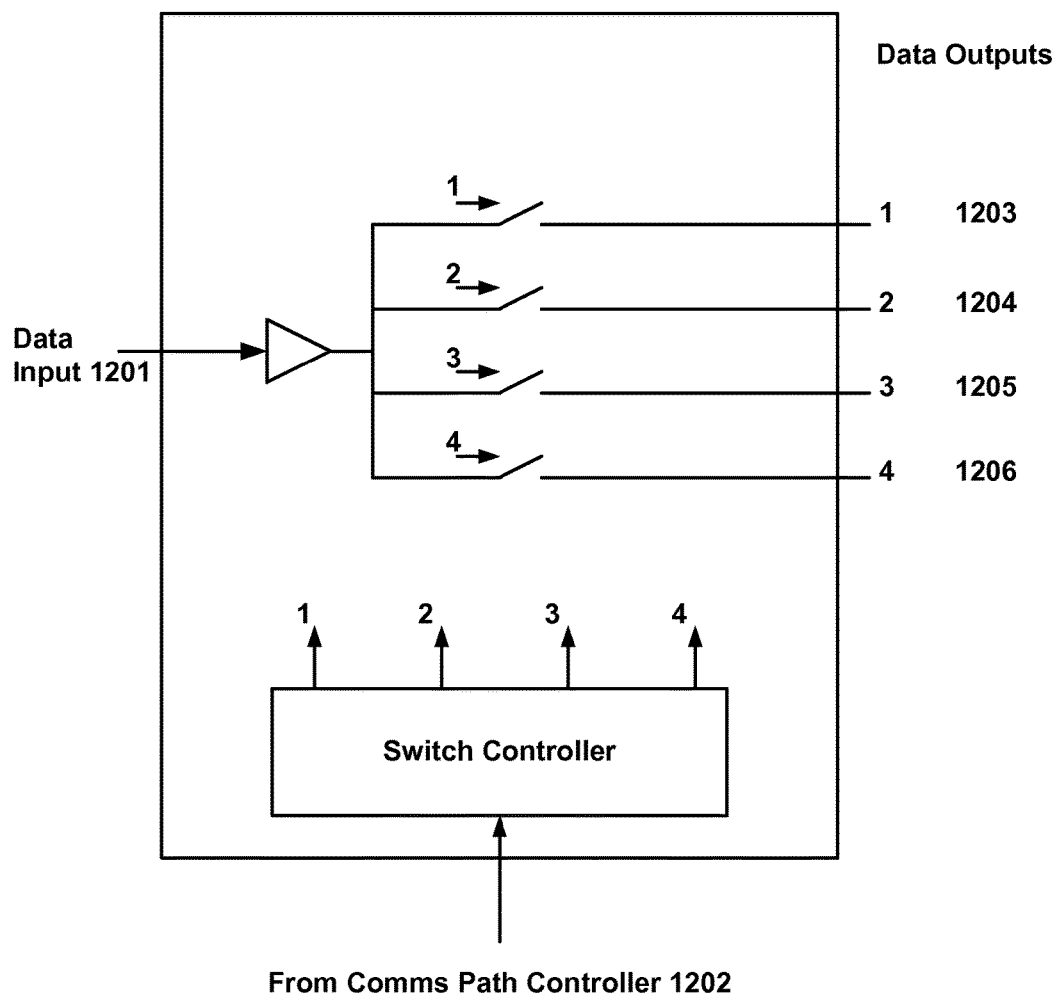
FIG. 12 is an example distribution controller in accordance with one embodiment.

FIG. 12 is an example distribution controller 127 in accordance with one embodiment. In FIG. 12, a data input 1201 is for receiving extended-lifetime correction 152 from message formatter 126. In response to instructions from communications path controller 125 received via input 1202, distribution controller 127 selectively couples master reference station 120 with communication distribution network 130. This is in response to communications path controller 125 accessing timetable 600 and determining which communication pathway is to be used to convey extended-lifetime correction 152 to a selected reference station region. As an example, if a geosynchronous communication satellite is to be used to convey extended-lifetime correction 152 to the Sunnyvale reference station region, communications path controller 125 can cause switch 1 to close. As a result, extended-lifetime correction 152 will be sent via data output 1203 to communication distribution network 130 to a geosynchronous communication satellite. If extended-lifetime correction 152 is to be conveyed to the Sunnyvale reference station region via a LEO/MEO communication satellite, communications path controller 125 can cause switch 1 to close. As a result, extended-lifetime correction 152 will be sent via data output 1204 to communication distribution network 130 and then to a LEO/MEO communication satellite. Similarly, extended-lifetime correction 152 is to be conveyed to the Sunnyvale reference station region via cellular telephone network, communications path controller 125 can cause switch 3 to close. As a result, extended-lifetime correction 152 will be sent via data output 1205 to communication distribution network 130 and to cellular network 133. Finally, if extended-lifetime correction 152 is to be conveyed to the Sunnyvale reference station region via a radio frequency broadcast, communications path controller 125 can cause switch 4 to close. As a result, extended-lifetime correction 152 will be sent via data output 1206 to communication distribution network 130 and then to a radio relay broadcast 134. It is noted that distribution controller 127 can comprise more or less data inputs/outputs than described in the discussion of FIG. 12. Furthermore, in one embodiment, all of the switches of distribution controller 127 can be closed to permit conveying extended-lifetime correction via all of the communication pathways with which it is communicatively coupled.

Figure 13:
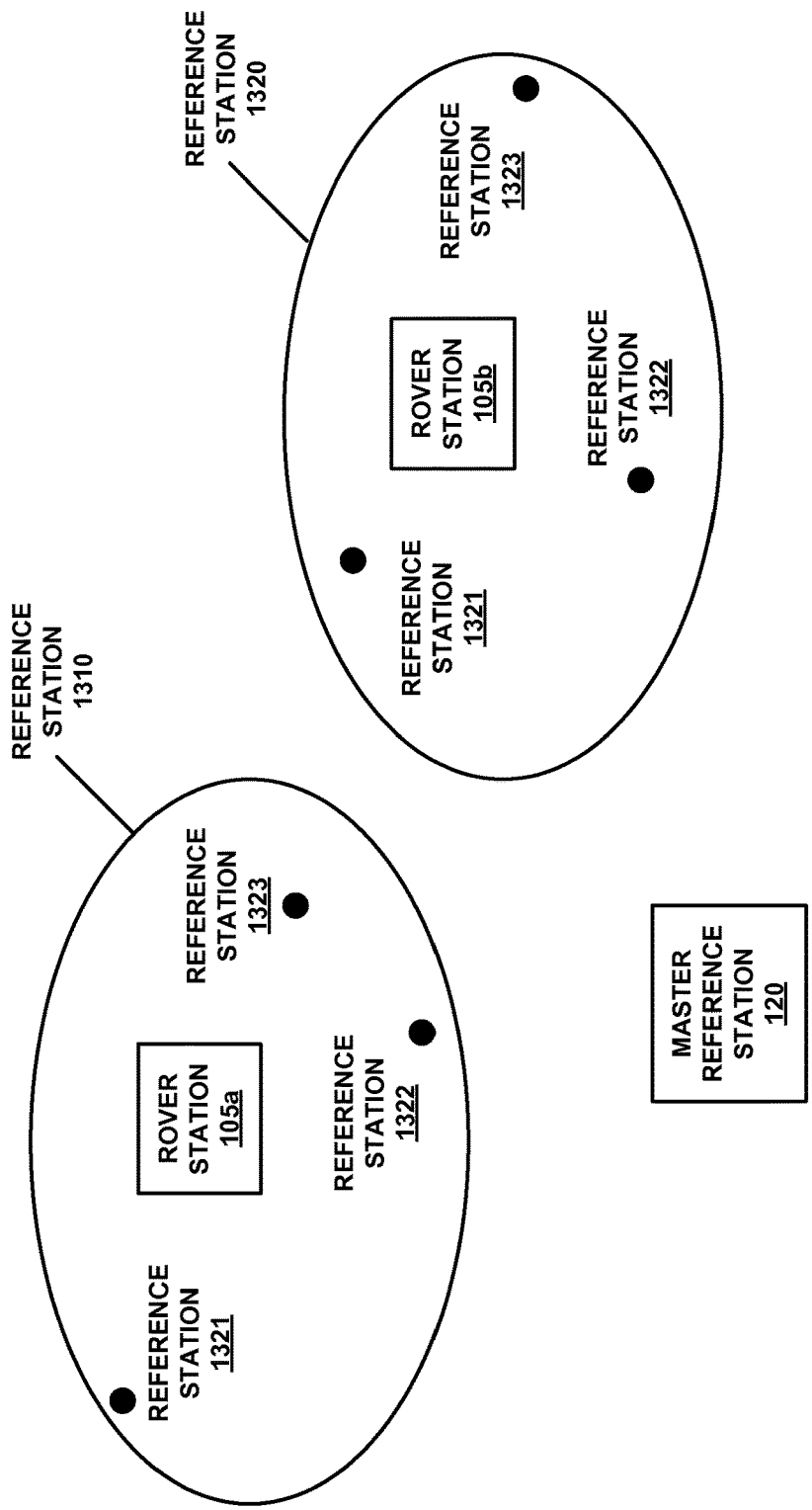
FIG. 13 shows a plurality of reference station regions in accordance with one embodiment.

FIG. 13 shows a plurality of reference station regions in accordance with one embodiment. In FIG. 13, master reference station 120 provides extended-lifetime corrections 152 to reference station region 1310 and reference station region 1320. For the purposes of illustration, it is assumed that spreadsheet 500 defines the reference stations shown in FIG. 13 which are used to collect and report observables which are used by master reference station 120 to generate extended-lifetime correction 152. In the example of FIG. 13, corrections region selection system 124 of master reference station 120 selects reference station region 1310 for receiving an extended-lifetime correction 152. In one embodiment, corrections region selection system 124 can also access timetable 600 of FIG. 6 to determine when to initiate generating an extended-lifetime correction 152 for reference station region 1310 in order to convey extended-lifetime correction 152 at the timeslot defined in timetable 600. Corrections region selection system 124 then identifies reference stations 1311, 1312, and 1313 as the reference stations which are used to report observables from reference station region 1310 to master reference station 120. Corrections processor 121 then uses the observables from one or more of the reference stations (e.g., 1311, 1312, and/or 1313) to generate VRS corrections 240. Corrections processor 121 also determines error data 235 which describes data on error sources which can diminish the precision of determining the position of a rover station within, or proximate to, reference station region 1310.

Distribution timetable controller input system 123 then accesses timetable 600 of FIG. 6 to determine the message format used for extended-lifetime corrections 152 sent to reference station region 1310. For the purpose of illustration, it will be assumed that extended-lifetime corrections 152 sent to reference station region 1310 use the CMR message format. Corrections processor 121 then sends extended-lifetime correction 152 to message formatter 126 which formats extended-lifetime correction 152 in the CMR message format. Communications path controller 125 also accesses timetable 600 and determines which communication pathway is used to convey extended-lifetime correction 152 to reference station region 1310. Extended-lifetime correction 152 is then sent via one of the communication pathways described above with reference to FIGS. 1A, 1B, and 1C as defined by timetable 600 by using distribution controller 127 to selectively couple extended-lifetime correction 152 with the appropriate nodes of communication distribution network 130. For the purposes of illustration, it will be assumed that extended-lifetime correction 152 intended for reference station region 1310 are conveyed via cellular network 133 to terrestrial radio relay broadcast transmitter 170 which then sends extended-lifetime correction 152 via a radio frequency broadcast which is received by terrestrial radio transceiver 113 of rover station 105a.

In reference station region 1310, rover station 105a performs an initial determination of its geographic position based upon received satellite navigation signals 150 from positioning satellites 101. In one embodiment, rover station 105a then determines the reference station region in which it is currently located. For example, in one embodiment, rover station 105a accesses a look-up table (not shown) which defines the coverage areas of reference station regions for receiving an extended-lifetime correction 152. In the present example, rover station 105a determines that it is currently located in reference station region 1310. In one embodiment, rover station 105a receives extended-lifetime correction(s) by continuously monitoring the communication pathway it is configured to use to receive extended-lifetime correction 152. In one embodiment, this may also include receiving extended-lifetime corrections which are intended for reference station regions besides the one in which rover station 105a is currently located. However, because rover station 105a uses a stored copy 903a if timetable 600, rover station 105a will only use the extended-lifetime correction 152 which is intended for reference station region 1310. In other words, rover station 105a will disregard extended-lifetime corrections which are received at times other than those specified for reference station region 1310. In another embodiment, rover station 105a is configured to power down its communication equipment, other than GNSS receiver 930, to conserve battery power.

In one embodiment, rover station 105a uses the VRS corrections 240, in addition to the positioning signals received from positioning satellites 101, to determine a corrected geographic position. This can comprise using the VRS corrections 240 in conjunction with concurrently received positioning signals to determine the corrected geographic position of rover station 105a.

After receiving extended-lifetime correction 152 at its scheduled time slot, rover station 105a will again disregard extended-lifetime corrections received until the next time slot scheduled for reference station region 1310. In the interim, rover station 105a can determine additional corrected geographic position(s) based upon subsequently received satellite navigation signals from positioning satellites 101, VRS correction 240 from the received extended-lifetime correction 152, and error data 235 from extended-lifetime correction 152. Rover station 105a will continue using the VRS correction 240 and error data 235 from extended-lifetime correction 152 until the next scheduled extended-lifetime correction 152 is received.

Meanwhile, master reference station 120 has determined that reference station region 1320 is scheduled to receive the next extended-lifetime correction 152. Corrections region selection system 124 again determines which reference station region (e.g., 1320) is due to receive the next extended-lifetime correction 152 and identifies the reference stations (e.g., 1321, 1322, and/or 1323) from reference station region 1320 from which to receive observables to generate an extended-lifetime correction 152 for reference station region 1320. Corrections processor 121 then uses the observables from the reference station(s) identified by corrections region selection system 124 to generate an extended-lifetime correction 152 for reference station region 1320.

Distribution timetable controller input system 123 identifies the message format used for extended-lifetime corrections 152 for the reference station region 1320 and message formatter 126 formats the extended-lifetime correction 152 intended for reference station region 1320. Communications path controller 125 then determines the communication pathway used to convey extended-lifetime correction 152 to reference station region 1320 and distribution controller 127 sends extended-lifetime correction 152 to the appropriate nodes of communication distribution network 130 to convey extended-lifetime correction 152 via the selected communication pathway. For the purpose of illustration, it will be assumed that extended-lifetime correction 152 is conveyed to the reference station region 1320 using a geostationary communication satellite. In other words, a communication satellite 132 broadcasts extended-lifetime correction 152 which is received by satellite communication transceiver 110.

Rover station 105b has performed an initial position fix and has determined that it is currently located in reference station region 1320. Using a stored copy 903a of timetable 600, rover station 105b determines the time slot for receiving extended-lifetime corrections intended for the reference station region 1320 and disregards extended-lifetime corrections received at other times than its designated time slots. Rover station 105b then utilizes extended-lifetime correction 152 to determine corrected geographic positions as described above.

After generating extended-lifetime corrections for all of the reference station regions listed in timetable 600, master reference station 120 then begins the cycle again and generates a new extended-lifetime correction 152 for reference station region 1310.

Figure 14:
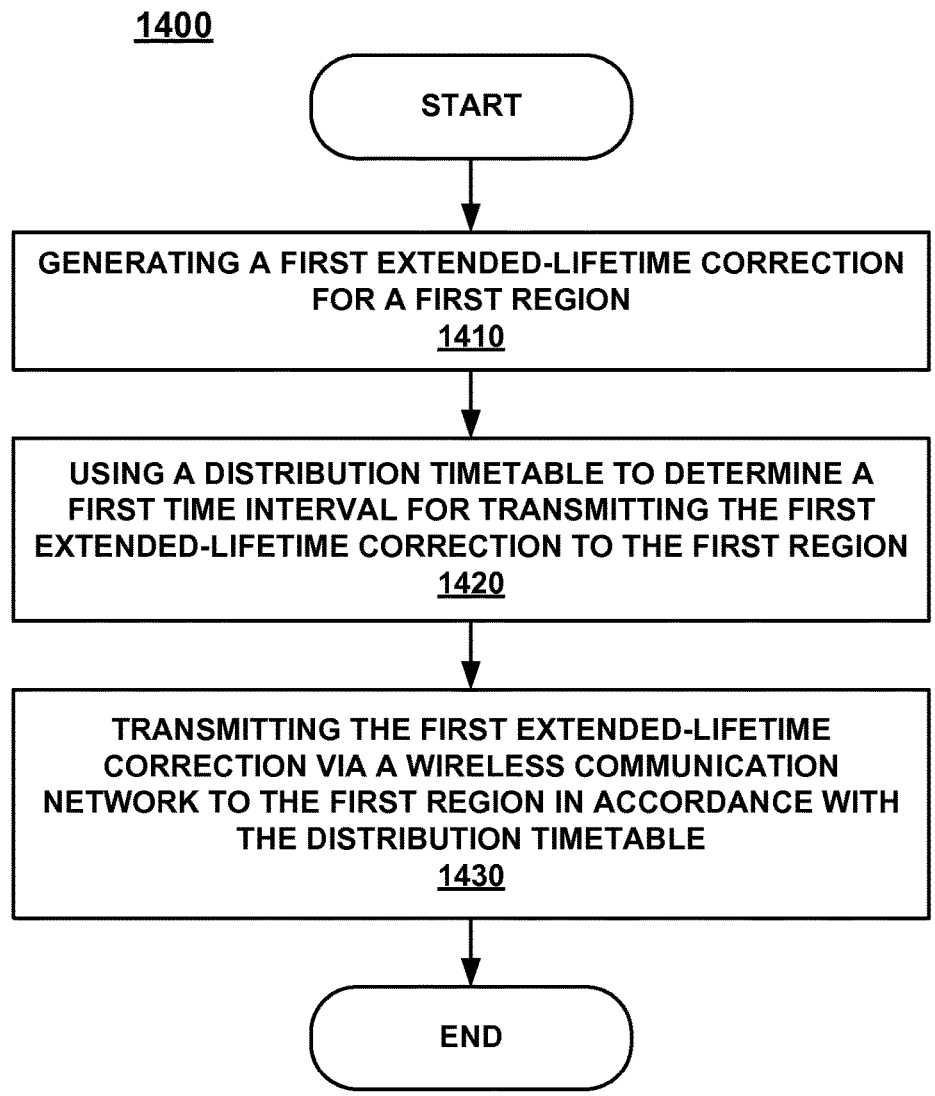
FIG. 14 is a flowchart of a method for delivery of location-dependent time-specific corrections in accordance with one embodiment.

FIG. 14 is a flowchart 1400 of a method for delivery of location-dependent time-specific corrections in accordance with one embodiment. In operation 1410 of FIG. 14, a first extended-lifetime correction for a first region is generated. As described above, master reference station 120 is configured to select a reference station region using spreadsheet 500 of FIG. 5 and for generating an extended-lifetime correction 152 for that region based upon GNSS observables which are conveyed to corrections processor 121. In one embodiment, corrections processor 121 generates VRS corrections 240 as well as error data 235 which describes data on error sources which can diminish the precision of determining the position of a rover station within, or proximate to, the selected region. Furthermore, the error data 235 facilitates determining a corrected geographic position of the rover station in the absence of a continuous data stream of VRS corrections.

In operation 1420 of FIG. 14, a distribution timetable is used to determine a first time interval for transmitting the first extended-lifetime correction to the first region. In one embodiment, master reference station 120 accesses timetable 600 of FIG. 6 which defines the time it takes to transmit extended-lifetime correction 152 for a given region. Additionally, timetable 600 defines the time at which transmission of extended-lifetime correction to the selected region is initiated. Thus, timetable 600 defines a time interval for delivery of extended-lifetime correction 152 to the selected region.

In operation 1430 of FIG. 14, the first extended-lifetime correction is transmitted via a wireless communication network to the first region in accordance with the distribution timetable. In one embodiment, master reference station 120 begins generating extended-lifetime correction 152 such that it can be delivered to the selected region in accordance with timetable 600. This can include, but is not limited to accounting for the time it takes to process GNSS observables from at least one reference station in the reference station region for which master reference station 120 is generating an extended-lifetime correction 152. This can also include accounting for the time it takes to convey extended-lifetime correction 152 from master reference station 120 to the selected region using the communication pathway defined in timetable 600.

FIG. 15 is a flowchart 1500 of a method for delivery of location-dependent time-specific corrections in accordance with one embodiment. In operation 1510 of FIG. 15, a copy of a distribution timetable is stored within a rover station in a first region. As described above, in one embodiment rover station 105 uses a stored copy 903a of timetable 600. It is again noted that rover station 105 can be outside of the boundaries of a reference station region as defined by the locations of reference stations associated with the reference station region. In other words, if the reference stations of a given reference station region define a polygonal region, rover station 105 can be located outside of the boundaries of the polygonal region and still receive a correction from master reference station 120.

In operation 1520 of FIG. 15, the rover station uses the distribution timetable to determine a time interval for receiving a correction which is intended for the first region and which is configured to be usable for a period greater than one second. In one embodiment, stored copy 903a is used by rover station 105 to determine the time interval at which a correction is received which is intended for the reference station region in which rover station 105 is currently located. For example, referring again to FIG. 6, the first time interval for receiving an extended-lifetime correction 152 for the Sunnyvale reference station region begins at the first minute after the hour and lasts for the duration of the 5 second transmission time. The next time interval for receiving an extended-lifetime correction 152 occurs at the sixth minute after the hour and again lasts for the duration of the 5 second transmission time.

In operation 1530 of FIG. 15, the rover station uses the correction to determine a first corrected geographic position in the first region. As discussed above, rover station 105 uses the extended-lifetime correction 152 which is intended for the reference station region in which it is currently located to determine a corrected geographic position. In one embodiment, the corrected geographic position is derived using received GNSS positioning signals 150, as well as VRS corrections 240 sent by master reference station 120. In one embodiment, rover station 105 can also determine a corrected geographic position at a second instance in time using GNSS positioning signals received at a second instance in time, the VRS corrections 240 received earlier, and error data 235 which describes data on error sources which can diminish the precision of determining the position of rover station 105 within the reference stain region in which it is currently located.

Figure 16:
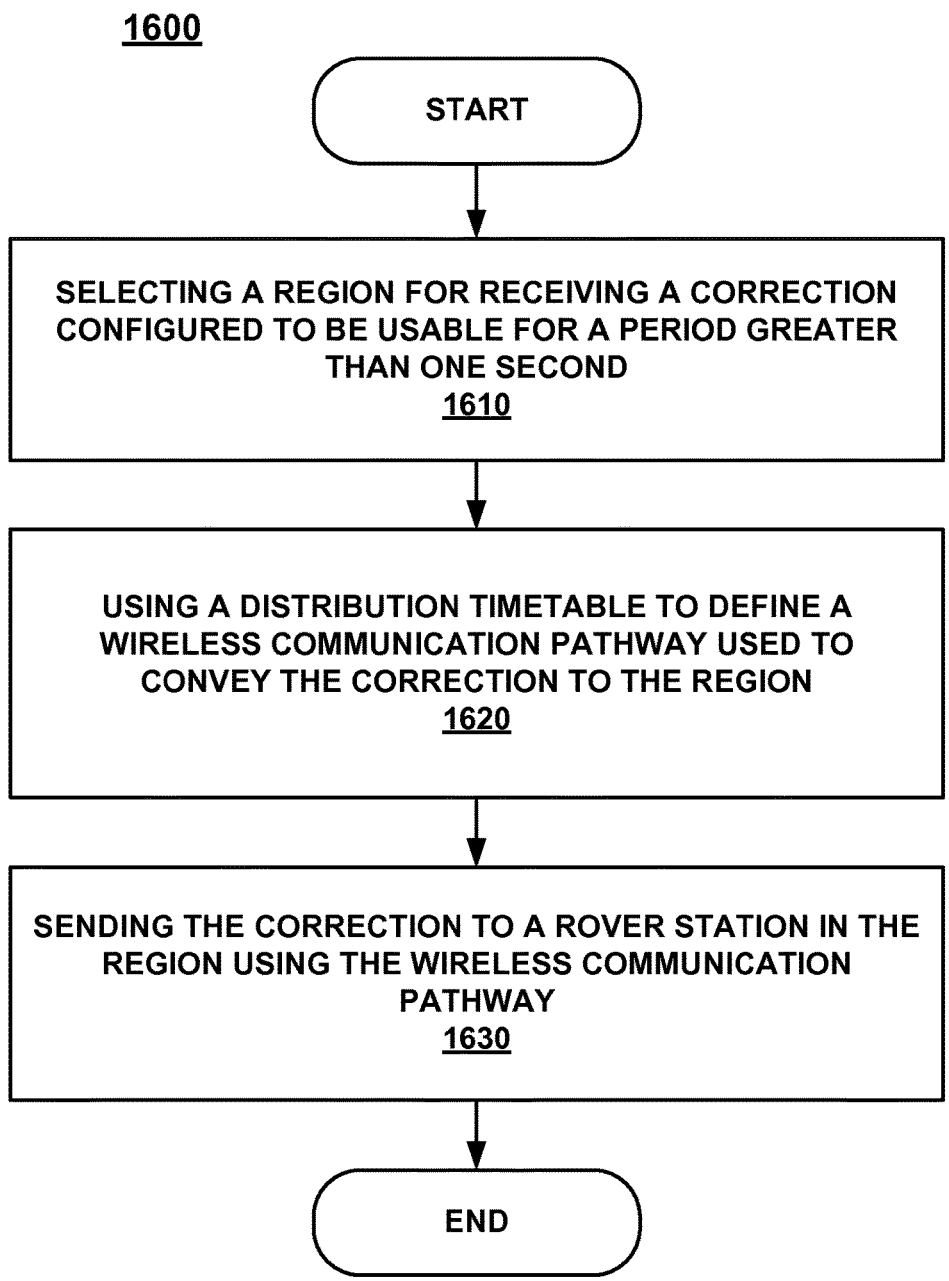
FIG. 16 is a flowchart of a method for delivering a correction in accordance with one embodiment.

FIG. 16 is a flowchart 1600 of a method for delivery of location-dependent time-specific corrections in accordance with one embodiment. In operation 1610 of FIG. 16, a region for receiving a correction configured to be usable for a period greater than one second is selected. In one embodiment, master reference station 120 uses spreadsheet 500 to select a reference station region for which an extended-lifetime correction 152 is to be generated. While the present discussion will refer to extended-lifetime correction 152, it is noted that embodiments can be used to deliver other corrections to rover station 105 which are configured to be usable for a period of greater than one second.

In operation 1620 of FIG. 16, a distribution timetable is used to define a wireless communication pathway used to convey the correction to the region. As discussed above, communications path controller 125 accesses timetable 600 which defines a wireless communication pathway used to convey extended-lifetime correction 152 to the selected region. Again, a default communication pathway can be set for all reference station regions. Alternatively, each reference station region can utilize a different communication pathway. For example, if the infrastructure is not in place to use cellular communication networks in a given reference station region, a communication pathway can be selected in which extended-lifetime correction 152 is conveyed to rover station 105 using a satellite communication network. Alternatively, if it is too costly to use a satellite communication network, a terrestrial radio relay broadcast can be used to convey extended-lifetime correction 152 to a selected region.

In operation 1630 of FIG. 16, the correction is sent to a rover station in the region using the wireless communication pathway. Referring again to FIG. 6, for the Sunnyvale reference station region a cellular communication network is selected as the communication pathway used to convey extended-lifetime correction 152. Referring again to FIG. 1A, cellular network 133 would then be used to convey extended-lifetime correction 152 to rover station 105 using cellular telephone transceiver 112.

Figure 17:
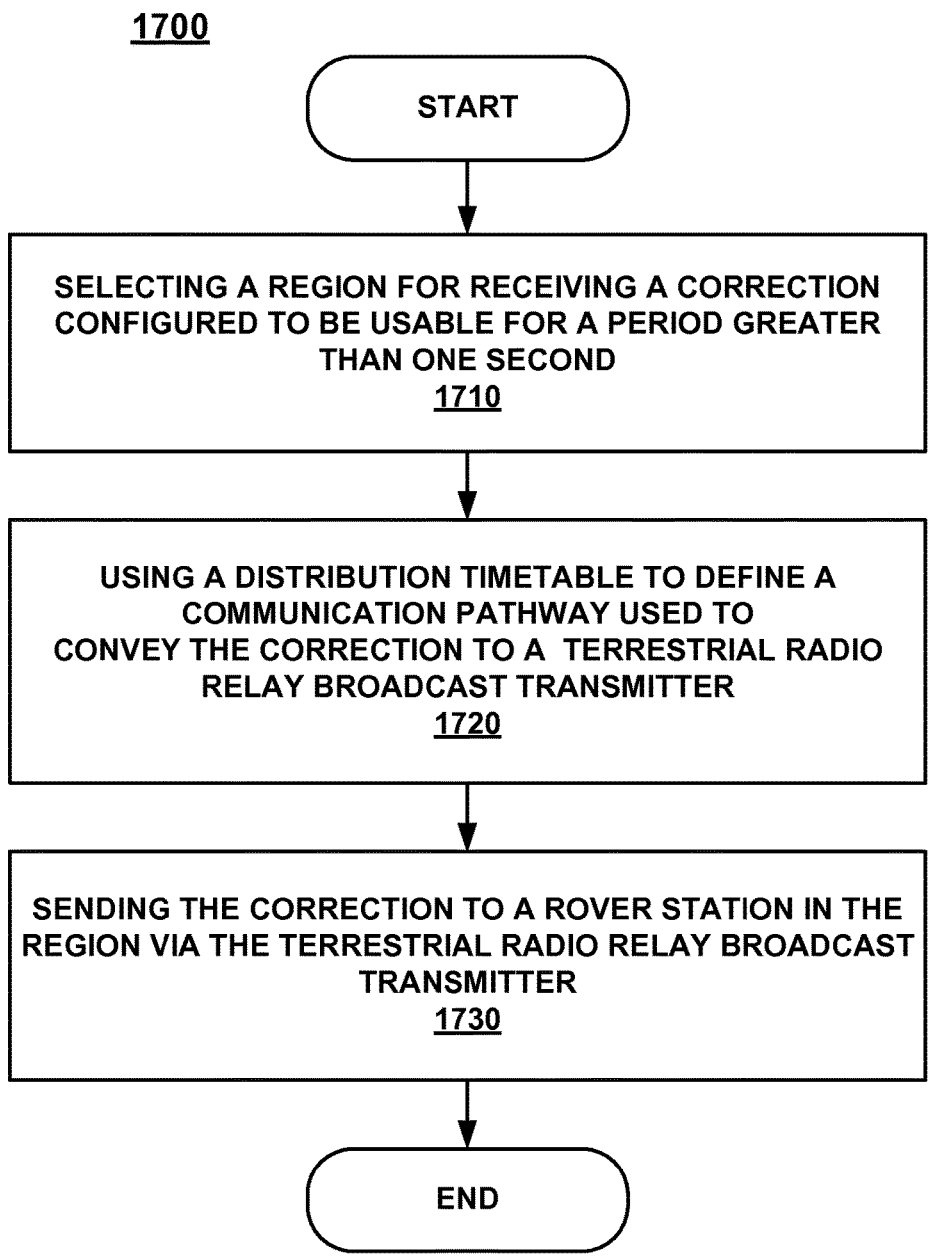
FIG. 17 is a flowchart of a method for delivering a correction in accordance with one embodiment.

FIG. 17 is a flowchart 1700 of a method for delivery of location-dependent time-specific corrections in accordance with one embodiment. In operation 1710 of FIG. 17, a region for receiving a correction configured to be usable for a period greater than one second is selected. In one embodiment, master reference station 120 uses spreadsheet 500 to select a reference station region for which an extended-lifetime correction 152 is to be generated. While the present discussion will refer to extended-lifetime correction 152, it is noted that embodiments can be used to deliver other corrections to rover station 105 which are configured to be usable for a period of greater than one second.

In operation 1720 of FIG. 17, a distribution timetable is used to define a communication pathway used to convey the correction to a terrestrial radio relay broadcast transmitter. Many rover stations are currently in use which are equipped with a radio receiver/transceiver for receiving VRS corrections. Due to the cost of upgrading or replacing these rover stations, some users would prefer to utilize existing infrastructures which convey VRS corrections using terrestrial radio relay broadcast transmitters. Thus, in one embodiment, timetable 600 can be used to define using a terrestrial radio relay broadcast transmitter 170 to convey extended-lifetime correction 152 to rover station 105.

In operation 1730 of FIG. 17, the correction is sent to a rover station in the region via the terrestrial radio relay broadcast transmitter. As an example, timetable 600 shows that the Redding, Calif. reference station region uses a terrestrial radio relay broadcast transmitter (e.g., 170 of FIG. 1B) to convey extended-lifetime correction 152. As shown in FIG. 1B, a variety of communication pathways can be used to convey extended-lifetime correction 152 to terrestrial radio relay broadcast transmitter 170 which then re-broadcasts extended-lifetime correction 152 to rover station 105 via terrestrial radio transceiver 113. It is noted that embodiments of operator input adjustment system 122 can be used to define which communication pathway is used to convey extended-lifetime correction to terrestrial radio relay broadcast transmitter 170, or to wireless Internet server 180.

Figure 18:
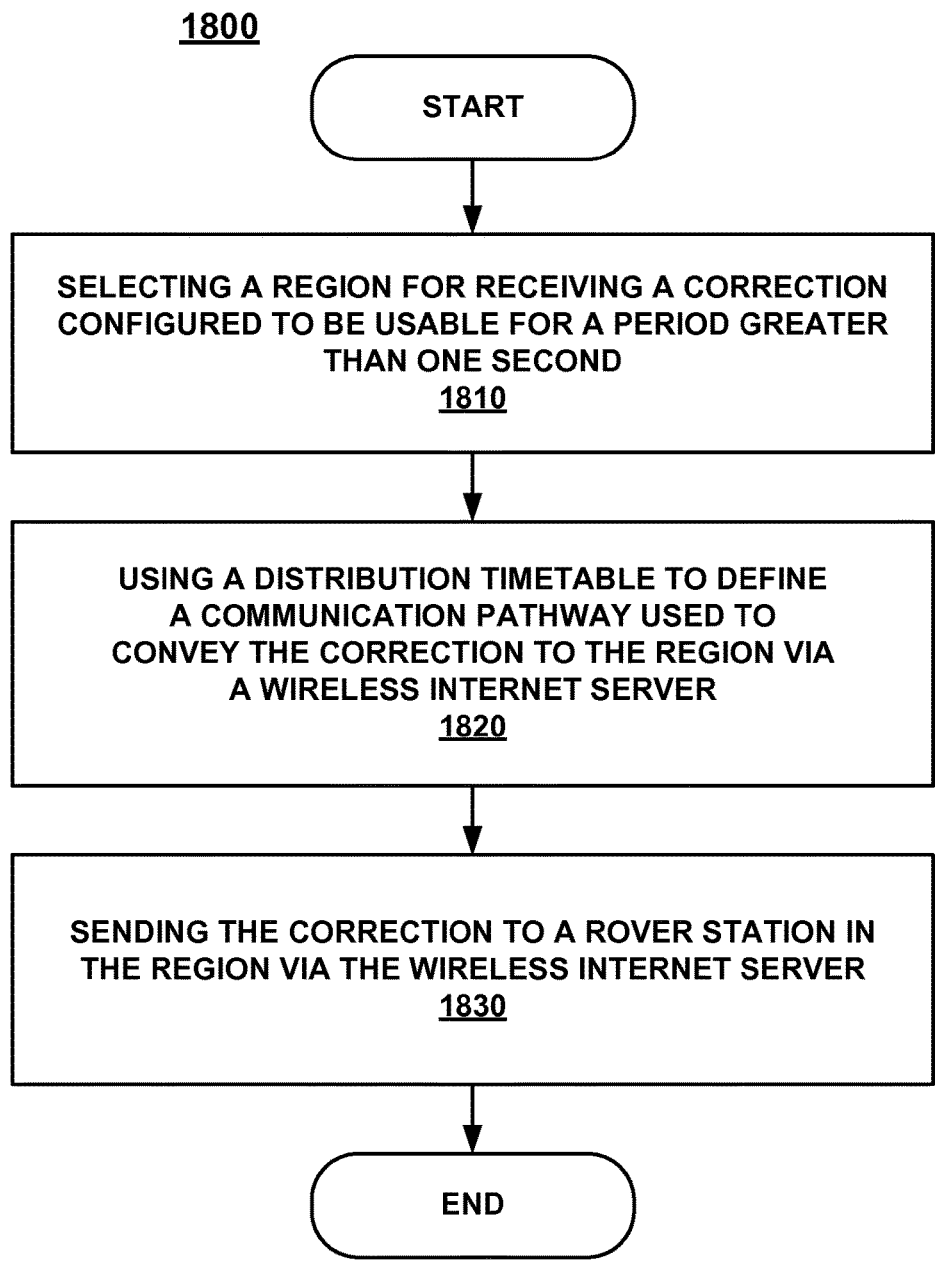
FIG. 18 is a flowchart of a method for delivering a correction in accordance with one embodiment.

FIG. 18 is a flowchart 1800 of a method for delivery of location-dependent time-specific corrections in accordance with one embodiment. In operation 1810 of FIG. 18, a region is selected for receiving a correction configured to be usable for a period greater than one second. In one embodiment, master reference station 120 uses spreadsheet 500 to select a reference station region for which an extended-lifetime correction 152 is to be generated. While the present discussion will refer to extended-lifetime correction 152, it is noted that embodiments can be used to deliver other corrections to rover station 105 which are configured to be usable for a period of greater than one second.

In operation 1820 of FIG. 18, a distribution timetable is used to define a communication pathway used to convey the correction to the region via a wireless Internet server. In one embodiment, extended-lifetime correction 152 can be conveyed to rover station 105 via wireless Internet server 180. As described above with reference to FIG. 1C, wireless Internet server 180 is configured to implement packet-switched communications with rover station 105 in one embodiment. It is noted that while the present example describes the use of a wireless Internet server 180, other embodiments may utilize other packet-switched communication methods to convey extended-lifetime correction 152 to rover station 105.

In operation 1830 of FIG. 18, the correction is sent to a rover station in the region via the wireless Internet server. In one embodiment, the delivery of extended-lifetime correction 152 via wireless Internet server 180 is dependent upon which communication devices are used by rover station 105. For example, if rover station 105 is configured with cellular telephone transceiver 112, extended-lifetime correction 152 will be sent via cellular network 133. Alternatively, if rover station 105 is not configured with cellular telephone transceiver 112, extended-lifetime correction 152 can be sent via wireless network 136.

Embodiments of the present technology are thus described. While the present technology has been described in particular embodiments, it should be appreciated that the present technology should not be construed as limited by such embodiments, but rather construed according to the following claims.

What is claimed is:

1. A method for delivery of location-dependent time-specific corrections to positioning signals, said method comprising:
   generating a first extended-lifetime correction for a first region, wherein the first extended-lifetime correction comprises virtual reference station correction data usable for a period greater than one minute and less than twenty minutes, the virtual reference station correction data generated based on positioning signals received from a plurality of global navigation satellite systems (GNSS) reference receivers;
   using a pre-defined distribution timetable to determine a first time and a first time interval for transmitting said first extended-lifetime correction to said first region; and
   transmitting said first extended-lifetime correction via a wireless communication network to said first region at the first time, and waiting to transmit a next first extended-lifetime correction to the first region until the first time interval has elapsed, wherein the first time interval is greater than one minute and less than twenty minutes.

2. The method as recited in claim 1 wherein said generating said first extended-lifetime correction further comprises:
   generating a first instance of virtual reference station correction data for a location in said first region at a first instance in time and wherein said first instance of virtual reference station correction data is applied to a first geographic position to determine a first corrected geographic position in said first region at said first instance in time;
   generating a first instance of error data descriptive of a plurality of positioning signals at said first instance in time and wherein said first instance of error data is used to determine a second corrected geographic position in said first region at a second instance in time within the first time interval from the first time based upon said first instance of virtual reference station correction data and a second instance of data from said plurality of positioning signals; and
   conveying said first instance of virtual reference station correction data and said first instance of error data as said extended-lifetime correction.

3. The method as recited in claim 2 further comprising:
   conveying the error data descriptive of said plurality of positioning signals selected from the group consisting of: a quantification of satellite clock error for the first instance in time, a quantification of atmosphere induced error for the first instance in time, and a quantification of satellite orbit error for the first instance in time.

4. The method as recited in claim 1 further comprising:
   generating a second extended-lifetime correction for a second region;
   accessing said pre-defined distribution timetable which specifies a second time and a second time interval for transmitting said second extended-lifetime correction to said second region; and
   transmitting said second extended-lifetime correction to said second region via said wireless communication network at the second time, and waiting to transmit a next second extended-lifetime correction to the second region until the second time interval has elapsed, wherein the second time interval is greater than one minute and less than twenty minutes.

5. The method as recited in claim 4 further comprising:
   selecting said wireless communication network from the group consisting of: a geosynchronous satellite communication network, a Low Earth Orbit/Medium Earth Orbit (LEO/MEO) satellite communication network, a cellular telephone communication network, a pager frequency wireless communication network, a terrestrial radio broadcast network, and a wireless Internet server network.

6. The method as recited in claim 5 further comprising:
accessing said pre-defined distribution timetable to determine which of a plurality of wireless communication networks is to be used to convey said first extended-lifetime correction to said first region.

7. The method as recited in claim 4 further comprising:
storing a copy of said pre-defined distribution timetable on a rover station; and
using said stored copy of said pre-defined distribution timetable to cause a rover station in said first region to use said first extended-lifetime correction received during said first defined time interval to derive a first corrected geographic position.

8. The method as recited in claim 7 further comprising:
adding a third region to said pre-defined distribution timetable; and
generating a message via said wireless communication network which is configured to cause said rover station to update said stored copy of said pre-defined distribution timetable.

9. The method as recited in claim 1 further comprising:
selecting said first region;
receiving positioning satellite signal data from at least one Global Navigation Satellite System (GNSS) reference station which is associated with said first region; and
using the positioning satellite signal data from said at least one GNSS reference station to derive said first extended-lifetime correction.

10. A method for delivery of location-dependent time-specific corrections, said method comprising:
storing a copy of a pre-defined distribution timetable within a rover station in a first region;
said rover station using said pre-defined distribution timetable to determine a first time and a first time interval for receiving an extended-lifetime correction which is intended for said first region and which is configured to be usable for a period greater than one minute and less than twenty minutes, wherein the extended-lifetime correction comprises virtual reference station correction data to positioning signals and is generated based on positioning signals received from a plurality of global navigation satellite systems (GNSS) reference receivers; and
said rover station using said extended-lifetime correction to determine a first corrected geographic position in said first region within the first time interval from the first time, wherein the first time interval is greater than one minute and less than twenty minutes.

11. The method as recited in claim 10 wherein said using said extended-lifetime correction further comprises:
said rover station using a first instance of virtual reference station correction data for said first region at a first instance in time to determine said first corrected geographic position in said first region at said first instance in time; and
said rover station using a first instance of error data to determine a second corrected geographic position in said first region at a second instance in time within the first time interval from the first time.

12. The method as recited in claim 11 wherein determining said second corrected geographic position further comprises:
determining said second corrected geographic position in said first region using a plurality of positioning signals received by said rover station at a second instance in time, said first instance of virtual reference station correction data, and said first instance of error data.

13. The method as recited in claim 11 said using said first instance of error data further comprises:
using error data descriptive of said plurality of positioning signals selected from the group consisting of a quantification of satellite clock error for the first instance in time, a quantification of atmosphere induced error for the first instance in time, and a quantification of satellite orbit error for the first instance in time.

14. The method as recited in claim 10 further comprising:
receiving said extended-lifetime correction via a wireless communication network.

15. The method as recited in claim 14 further comprising:
utilizing a wireless communication network selected from the group consisting of: a geosynchronous satellite communication network, a Low Earth Orbit/Medium Earth Orbit (LEO/MEO) satellite communication network, a cellular telephone communication network, a pager frequency wireless communication network, a terrestrial radio broadcast network, and a wireless Internet server network.

16. The method as recited in claim 10 further comprising:
said rover station determining a first geographic position based upon a plurality of received positioning satellite signals,
said rover station determining that said first geographic position is assigned to said first region; and
said rover station using said pre-defined distribution timetable to determine said time.

17. A rover station for determining a position, said rover station comprising:
a positioning signal receiver configured to receive positioning signals from each of a plurality of positioning satellites;
at least one wireless communication device configured to receive an extended-lifetime correction intended for a region to which said rover station is proximate via a wireless communication network, wherein the extended-lifetime correction comprises virtual reference station correction data to the positioning signals usable for a period greater than one minute and less than twenty minutes, the virtual reference station correction data generated based on positioning signals received from a plurality of global navigation satellite systems (GNSS) reference receivers; and
a processor configured to access a pre-defined distribution timetable which defines a first time and a first time interval for receiving said extended-lifetime correction which is intended for said region, wherein the first time interval is greater than one minute and less than twenty minutes.

18. The rover station of claim 17 further comprising:
a positioning unit is configured to determine a first position of said rover station for a first instance in time based on the positioning signals for the first instance in time and is configured to determine a corrected geographic position based upon said positioning signals and said extended-lifetime correction, the first instance in time being within the first time interval from the first time.

19. The rover station of claim 18 wherein said positioning unit is further configured to determine a second position of said rover station for a second instance in time based upon received positioning signals for the second instance in time and said extended-lifetime correction, the second instance in time being within the first time interval from the first time.

20. The rover station of claim 18 wherein said positioning unit is configured to derive a correction to the positioning signals for the first instance in time from said extended-lifetime correction and to derive error data descriptive of said positioning signals for the first instance in time from said extended-lifetime correction.

21. The rover station of claim 20 wherein said positioning unit is configured to derive error data descriptive of said positioning signals for the first instance in time selected from the group consisting of a quantification of satellite clock error for the first instance in time, a quantification of atmosphere induced error for the first instance in time, and a quantification of satellite orbit error for the first instance in time.

22. The rover station of claim 18 wherein said positioning unit is further configured to:
  determine said region in which said rover station is disposed based upon said first position of said rover station for said first instance in time;
  access a pre-defined distribution timetable which specifies said first time and said first time interval for receiving said extended-lifetime correction based upon said region; and
  receive said extended-lifetime correction at said first time via a wireless communication network.

23. The rover station of claim 22 wherein said positioning unit is further configured to determine a corrected position based upon said received positioning signals for the first instance in time and said extended-lifetime correction.

24. The rover station of claim 23 wherein said rover station is configured to update said pre-defined distribution timetable based upon an update message from a master reference station.

25. A system for delivery of location-dependent time-specific corrections comprising:
  a master reference station comprising:
    a distribution timetable controller input system for selectively accessing a pre-defined distribution timetable and identifying a region for delivery of an extended-lifetime correction at a defined first time within a first time interval;
    a corrections region selection system configured to identify at least one Global Navigation Satellite System (GNSS) reference station which is associated with said region;
    a corrections processor configured to access data from said at least one GNSS reference station and to generate a virtual reference station correction for said region for a first instance in time within the first time interval from the first time, wherein the virtual reference station correction is usable for a period greater than one minute and less than twenty minutes and is generated based upon positioning signals from each of a plurality of positioning satellites;
    an error generator configured to generate an instance of error data descriptive of the positioning signals for the first instance in time; and
    a communicative coupling with a wireless communication network which conveys said pre-defined distribution timetable; and
  a rover station configured to:
    access said pre-defined distribution timetable;
    receive said extended-lifetime correction at the first time via said wireless communication network, wherein said extended-lifetime correction comprises said virtual reference station correction and said instance of error data; and
    determine a first geographic position for the first instance in time within the first time interval from the first time based upon the positioning signals from each of said plurality of positioning satellites and said extended-lifetime correction, wherein the first time interval is greater than one minute and less than twenty minutes.

26. The system of claim 25 wherein said instance of error data is selected from the group consisting of a quantification of satellite clock error for the first instance in time, a quantification of atmosphere induced error for the first instance in time, and a quantification of satellite orbit error for the first instance in time.

27. The system of claim 25 wherein said rover station is further configured to:
  determine that said rover station is located in said region at the first instance in time;
  access a copy of said pre-defined distribution timetable which specifies said first time and said first time interval for receiving said extended-lifetime correction based upon said rover station being located in said region; and
  utilizing said extended-lifetime correction received at said first time to generate a corrected position of said rover station.

28. The system of claim 27 wherein said rover station is configured to determine said corrected position based upon said received positioning signals for the first instance in time and said extended-lifetime correction.

29. The system of claim 27 wherein said rover station is configured to determine a second position in said region based upon said correction for the first instance in time, received positioning signals for a second instance of time, and said instance of error data conveyed in said extended lifetime correction.

30. The system of claim 25 wherein said extended-lifetime correction is conveyed to said rover station using a pathway wireless communication network selected from the group consisting of: a geosynchronous satellite communication network, a Low Earth Orbit/Medium Earth Orbit (LEO/MEO) satellite communication network, a cellular telephone communication network, a pager frequency wireless communication network, a terrestrial radio broadcast network, and a wireless Internet server network.

31. The system of claim 25 further comprising:
  a second master reference station configured to convey a second extended-lifetime correction for said region for a second defined time.

32. The system of claim 25 further comprising:
  a communications path controller configured to access said pre-defined distribution timetable and to initiate selectively coupling said master reference station with said wireless communication network based upon identifying said region to which said extended-lifetime correction is to be sent.

33. The system of claim 25 further comprising:
  a communications network master controller for selectively coupling a plurality of said master reference stations with said wireless communication network.

* * * * *